(12) United States Patent
Furukawa et al.

(10) Patent No.: US 7,693,187 B2
(45) Date of Patent: Apr. 6, 2010

(54) INTEGRATED INFORMATION COMMUNICATION SYSTEM USING INTERNET PROTOCOL

(75) Inventors: Hisao Furukawa, Kawagoe (JP); Shoji Miyaguchi, Ichikawa (JP)

(73) Assignees: Miyaguchi Research Co., Ltd., Chiba (JP); The Distribution Systems Research Institute, Tokyo (JP)

( * ) Notice: Subject to any disclaimer, the term of this patent is extended or adjusted under 35 U.S.C. 154(b) by 731 days.

(21) Appl. No.: 11/448,734

(22) Filed: Jun. 8, 2006

(65) Prior Publication Data

US 2006/0230182 A1    Oct. 12, 2006

Related U.S. Application Data

(62) Division of application No. 09/657,457, filed on Sep. 7, 2000, now Pat. No. 7,149,815, which is a division of application No. 08/962,563, filed on Oct. 31, 1997, now Pat. No. 6,145,011.

(30) Foreign Application Priority Data

Dec. 6, 1996    (JP)    ............................... 1996-326736

(51) Int. Cl.
*H04L 12/50*    (2006.01)
(52) U.S. Cl. ....................... 370/475; 370/389; 370/392; 370/471; 370/472
(58) Field of Classification Search ................. 370/471, 370/389, 392, 393, 395.53, 472
See application file for complete search history.

(56) References Cited

U.S. PATENT DOCUMENTS 5,060,228 A    10/1991    Tsutsui et al.

5,208,811 A *    5/1993    Kashio et al. ............... 370/401

(Continued)

FOREIGN PATENT DOCUMENTS

EP    0269978    6/1988

(Continued)

OTHER PUBLICATIONS

Junichi Murayama, "A Proposal of a Wide Area Router System", The Institute of Electronics, Information and Communication Engineers, Technical Report of IEICE IN95-66 (Oct. 1995), pp. 1-9.

(Continued)

*Primary Examiner*—Ricky Ngo
*Assistant Examiner*—Dewanda Samuel
(74) *Attorney, Agent, or Firm*—Wenderoth, Lind & Ponack, L.L.P.

(57) ABSTRACT

The integrated information communication system is comprised of an access control apparatus for connecting a plurality of computer communication networks or information communication equipment to each, and a relay device for networking the aforementioned access control apparatus. The system has functions for performing routing by transferring information by a unified address system and by changing address at the access control apparatus, and is configured such that the aforementioned plurality of computer communication networks or information communication equipment can perform communications in an interactive manner. The integrated information communication system ensures communication speed, communication quality, communication trouble countermeasures in a unified manner, without using dedicated lines or the Internet, wherein security and reliability in communication is ensured without change of a private address system.

10 Claims, 83 Drawing Sheets

U.S. PATENT DOCUMENTS

| | | | |
|---|---|---|---|
| 5,251,205 A | | 10/1993 | Callon et al. |
| 5,251,207 A | | 10/1993 | Abensour et al. |
| 5,367,635 A | | 11/1994 | Bauer et al. |
| 5,432,907 A | | 7/1995 | Picazo et al. |
| 5,490,141 A | | 2/1996 | Lai et al. |
| 5,493,564 A | | 2/1996 | Mullan |
| 5,586,260 A | * | 12/1996 | Hu .............................. 726/12 |
| 5,604,737 A | | 2/1997 | Iwami et al. |
| 5,732,071 A | * | 3/1998 | Saito et al. .................. 370/255 |
| 5,737,333 A | * | 4/1998 | Civanlar et al. ............. 370/352 |
| 5,774,656 A | * | 6/1998 | Hattori et al. ............... 709/223 |
| 5,856,974 A | * | 1/1999 | Gervais et al. .............. 370/392 |
| 5,931,911 A | | 8/1999 | Remy et al. |
| 5,999,974 A | * | 12/1999 | Ratcliff et al. .............. 709/224 |
| 6,035,105 A | * | 3/2000 | McCloghrie et al. ........ 709/236 |
| 6,298,120 B1 | | 10/2001 | Civaniar et al. |
| 6,609,153 B1 | * | 8/2003 | Salkewicz ................... 709/223 |
| 6,965,599 B1 | * | 11/2005 | Sakurai et al. .............. 370/392 |

FOREIGN PATENT DOCUMENTS

| | | |
|---|---|---|
| EP | 0281785 | 9/1988 |
| EP | 0606079 | 7/1994 |
| JP | 64-23646 | 1/1989 |
| JP | 5-14438 | 1/1993 |
| JP | 7-170288 | 7/1995 |
| JP | 8-272754 | 10/1996 |
| JP | 9-233112 | 9/1997 |
| WO | 96/06493 | 2/1996 |
| WO | 96/08099 | 3/1996 |
| WO | 97/28628 | 8/1997 |
| WO | 97/39560 | 10/1997 |
| WO | 98/12860 | 3/1998 |
| WO | 98/13986 | 4/1998 |

OTHER PUBLICATIONS

"Countdown to the New Millennium", Featuring a Mini-Theme on: Personal Communications Services (PCS), IEEE Global Telecommunications Conference, Globecom '91, Phoenix, Arizona. Dec. 2-5, 1991, pp. i-xxxv.

Michal Szwarc, "Virtual Private Data Network Service in the Wide Area Networks", NYNEX Science & Technology, Globecom '91, pp. 1033-1037.

C. Rigney et al., "Remote Authentication Dial in User Service (RADIUS)", Apr. 17, 1997, pp. 1-8.

Jenkins L, "Packet Switching and Frame Relay In A Broadband Network", Electrical Communication, Be, Alcatel. Brussels, Apr. 1, 1996, pp. 138-143.

Vickers, R., et al., "The Role Of SDH And ATM In Broadband Access Networks", Proceedings of the Global Telecommunications Conference, Dec. 2, 1991, pp. 212-216.

Gelman, A.D., et al., "An Architecture for Interactive Applications", Proceedings of the International Conference on Communications, May 23, 1993, pp. 848-852.

Hoelzle, J., et al., "ATM-Teilnehmernetze Fuer Integrierte Breitband-Kommunikation", NTZ Nachrichtentechnische Zeitschrift, Nov. 1, 1990, pp. 802-804, 806, 808, 809.

Walters, S.M., et al., "Broadband Virtual Private Networks and Their Evolution", Proceedings of the International Switching Symposium, Oct. 25, 1992, pp. 86-90.

Combarel, L., et al., "Satellite Integration Into Broadband Networks", Proceedings of the International Switching Symposium, Apr. 23, 1995, pp. 92-96.

Stevenson, D., et al., "Design of a Key Agile Cryptographic System for 0C-12C Rate ATM", Proceedings of the Symposium on Network and Distributed System Security, Feb. 16, 1995.

* cited by examiner

| Transmitting IC Network Add. | Sender ICS User Add. (Intra) | Sender ICS User Add. (Inter) | Receiver ICS User Add. | Receiving ICS Network Add. | Request ID | Speed |
|---|---|---|---|---|---|---|
| 7711 | 0012 | 2212 | 1156 | 8822 | 2 | 64K |
|  |  |  | 0034 | 9922 | 1 |  |
|  |  |  |  |  |  |  |
|  |  |  |  |  |  |  |
| 7712 |  |  |  |  |  |  |
| ---- | ---- | ---- | ---- | ---- | ---- | ---- |

FIG.16

| Transmitting ICS Network Add. | Sender ICS User Add. | Receiver ICS User Add. | Receiving ICS Network Add. | Request ID | |
|---|---|---|---|---|---|
| 8822 | 1156 | 2212 | 7711 | 2 | |
| ------ | ------ | ------ | ------ | ------ | ------ |

FIG.17

| Transmitting ICS Network Add. | Sender ICS User Add. | Sender ICS User Add. (Inter) | Receiver ICS User Add. | Receiving ICS Network Add. | Request ID | |
|---|---|---|---|---|---|---|
| 7711 | | | | 9921 | 3 | |
| 7712 | | | | 6611 | 3 | |
| | | | | 8822 | 3 | |
| -------- | -------- | -------- | -------- | -------- | -------- | -------- |

FIG.21

| Transmitting ICS Network Add. | Sender ICS User Add. | Sender ICS User Add. (Inter) | Receiver ICS User Add. | Receiving ICS Network Add. | Request ID | |
|---|---|---|---|---|---|---|
| | | | 2000 | 7721 | 4 | |
| | | | | | | |
| | | | | | | |
| | | | | | | |
| | | | | | | |
| | | | | | | |

FIG.24

| Item of Question | Type | Answer Contents | Network Address for Other ICS Network Server |
|---|---|---|---|
| Q1 | 1 | A1 | |
| Q2 | 2 | | 8844 |
| Q3 | 1 | A3 | |
| -------- | -------- | -------- | -------- |

FIG.25

| Transmitting ICS Network Add. | Sender ICS User Add. | Sender ICS User Add. (Inter) | Receiver ICS User Add. | Receiving ICS Network Add. | Request ID | |
|---|---|---|---|---|---|---|
| | | | | | | ------ |
| 7711 | 0012 | | | | | ------ |
| 7711 | | 2013 | | | | ------ |
| | | 2014 | | | | ------ |
| 7712 | | 1234 | | | | ------ |
| ------ | ------ | ------ | ------ | ------ | ------ | ------ |

FIG.28

| ICS Network Add. | ICS User Add. | Information on Add. |
|---|---|---|
| 7711 | 2013 | |
| 7711 | 2014 | |
| 7712 | 1234 | |
| 7713 | 4500 | |
| -------- | -------- | -------- |

FIG.29

| Transmitting ICS Network Add. | Sender ICS User Add. | Sender ICS User Add. (Inter) | Receiver ICS User Add. | Receiving ICS Network Add. | Request ID | ..... |
|---|---|---|---|---|---|---|
| | | | 1000 | 7741 | 4 | |
| | | | | | | |
| | | | | | | |
| | | | | | | |
| | | | | | | |
| | | | | | | |

FIG.32

| ICS Name | Type | ICS User Add. | Network Add. of Another ICS Name Server | ...... |
|---|---|---|---|---|
| USR#1.ACS#1.DIS#1 VAN#1.JP.AS | 1 | 2014 | | |
| USR#2.ACS#2.DIS#2 VAN#2.JP.AS | 2 | | 8866 | |
| ACS#···(Another ICS Name Server) | 2 | | | |
| VAN#···(Another ICS Name Server) | 2 | | | |
| US···(Another ICS Name Server) | 2 | | | |
| ...... | ...... | ...... | ...... | ...... |

FIG.33

| Transmitt-ing ICS Network Add. | Sender ICS User Add. | Receiving ICS Network Add. | Receiver ICS User Add. | Network Charging Condition | | Information Charging Condition | |
|---|---|---|---|---|---|---|---|
| | | | | Condit-ion | Unit Price | Condit-ion | Unit Price |
| 7711 | 0012 | 8822 | 1156 | 1 | 1 | 0 | |
| 7711 | 0012 | 8822 | 1157 | 0 | | 0 | |
| 7711 | 0012 | 8822 | 1158 | 2 | 1 | 0 | |
| ------ | ------ | ------ | ------ | ------ | ------ | ------ | ------ |

FIG.37

Definition Table for Fixed Charges

| Transmitting ICS Network Add. | Sender ICS User Add. | Receiving ICS Network Add. | Receiver ICS User Add. | Charge Definition Field | |
|---|---|---|---|---|---|
| | | | | Bearing | Unit Price |
| 7711 | 0012 | 7711 | 0012 | 0 | 1 |

FIG.38

| Transmitting ICS Network Add. | Receiving Phone No., Receiver ISDN No., IPX Add. | Transmitter Phone No., ISDN No., IPX Add. | Receiving ICS Network Add. | Request ID | ---- |
|---|---|---|---|---|---|
| 7721 | 06-5555-9876 | 06-5555-1234 | 5521 | 5 | |
| 7722 | 06-5555-2222 | 06-5555-1111 | 5522 | 6 | |
| 7723 | | | 5523 | 7 | |
| 7724 | | | 5524 | 8 | |
| 7725 | 8801 | 9911 | 5525 | 9 | |
| ---- | ---- | ---- | ---- | ---- | ---- |

| Transmitting ICS Network Add. | Sender ICS User Add. (Intra) | Sender ICS User Add. (Inter) | Receiver ICS Network Add. | Receiving ICS Network Add. | Request ID | Speed Class | Priority |
|---|---|---|---|---|---|---|---|
| 7711 | | 2500 | 3600 | 5522 | 2 | 3 | 3 |
| 7723 | | 2600 | | 5523 | 3 | 4 | 5 |
| 7724 | 0012 | | 3660 | 5526 | 1 | 3 | 1 |
| | | | 2000 | 7821 | 4 | 1 | 3 |
| ----- | ----- | ----- | ----- | ----- | ----- | ----- | ----- |

FIG.65

| Communication Speed (bps) | 64K | 128K | 384K | 1.5M | 50M | 100M | 500M |
|---|---|---|---|---|---|---|---|
| Speed Class | 1 | 2 | 3 | 4 | 5 | 6 | 7 |

FIG.66

| Transmitting ICS Network Add. | Sender ICS User Add. (Intra) | Sender ICS User Add. | Receiver ICS User Add. | Receiving ICS Network Add. | ID | Speed Class | Priority | Signa -ture | Signature Trans- mission | Signa -ture Recep -tion | Encry -ption Class |
|---|---|---|---|---|---|---|---|---|---|---|---|
| 7721 |  | 2500 | 3600 | 5522 | 2 | 3 | 3 | 1 | YES | NO | 1 |
| 7722 |  |  |  | 5523 | 3 | 4 | 3 | 1 | YES | NO | 0 |
| 7725 | 0012 | 2600 | 2900 | 8526 | 1 | 3 | 3 | 1 | YES | NO | 0 |
|  |  |  | 2000 | 9821 | 4 | 1 | 3 | 1 | NO | YES | 0 |
| 7727 |  | 2510 | 3610 | 8530 | 2 | 3 | 3 | 1 | NO | YES | 0 |
| 7728 |  | 2800 | 3700 | 8526 | 2 | 3 | 3 | 0 | YES | NO | 0 |
|  |  |  | 2001 | 9822 | 4 | 1 | 3 | 1 | NO | NO | 0 |

FIG.72

| Transmitt-ing ICS Network Add. | Sender ICS User Add. (Intra) | Sender ICS User Add. (Inter) | Receiver ICS User Add. | Receiving ICS Network Add. | Requ-est ID | Speed Class | Priori-ty | Signa-ture | Signa-ture Trans-miss-ion | Signa-ture Recei-pt | Accou-nt Class | Encry-ption Class | Open-zone Class |
|---|---|---|---|---|---|---|---|---|---|---|---|---|---|
|  |  |  | 2100 | 8100 | 4 | 3 | 3 | 1 | NO | YES | 1 | 0 | 1 |
| 7777 | 1111 | 3333 | 3800 | 7600 | 2 | 3 | 3 | 1 | YES | NO | 4 | 1 | 0 |
| 7777 | 1111 | 3333 | 4200 | 8210 | 2 | 3 | 3 | 1 | YES | NO | 4 | 1 | 0 |
| 7780 |  |  |  | 8400 | 3 | 3 | 3 | 0 | NO | NO | 2 | 0 | 0 |

FIG.77

| Item No. | Transmitting ICS User Add. | Sender ICS User Add. (Intra) | Sender ICS User Add. (Inter) | Request ID | Speed Class | Priority | Signature | Signature Transmission | Signature Receipt | Account Class | Encryption Class | Open-zone Class | Dynamic Alteration Class |
|---|---|---|---|---|---|---|---|---|---|---|---|---|---|
| 1 | 7777 | 1111 | 3333 | 2 | 3 | 3 | 1 | YES | NO | 4 | 1 | 0 | 6 |
| 2 | 7901 | 1122 | | 1 | 3 | 3 | 0 | NO | NO | 4 | 0 | 0 | 5 |

FIG.78

| ICS Network Address | ICS User Address (Intra) | ICS User Address (Inter) | Address Related Information |
|---|---|---|---|
| 7777 | 1111 | 3333 | Communication Band, Account, Electronic Signature, Encryption, Open-Zone, Dynamic Alteration, User ID, Payment Method, etc. |
| 7600 | | 3800 | ditto |

FIG.79

| ICS Name | Type | ICS User Address (Inter-Corp.) | ICS Network Address of Other ICS Name |
|---|---|---|---|
| USR#1.ACS#1. DIS#1.VAN#1. JP.AS | 1 | 3333 | |
| ........ACS#3. DIS#3.VAN#3. JP.AS | 2 | | 8930 |

FIG.80

| Transmitting ICS Network Add. | Request ID | Speed Class | Priority | Signature | Signature Transmiss-ion | Signature Receipt | Account Class | Encryption Class |
|---|---|---|---|---|---|---|---|---|
| 7777 | 4 | 3 | 3 | 1 | NO | YES | 1 | 0 |
| 7777 | 2 | 3 | 3 | 1 | YES | NO | 4 | 1 |
| 7777 | 2 | 3 | 3 | 1 | YES | NO | 4 | 1 |
| 7780 | 3 | 3 | 3 | 0 | NO | NO | 3 | 0 |
| 7789 | 1 | 2 | 2 | 0 | NO | NO | 3 | 0 |
| 7810 | 2 | 2 | 3 | 0 | NO | NO | 3 | 0 |
| 7901 | 2 | 2 | 2 | 0 | NO | NO | 2 | 0 |
| 7910 | 1 | 2 | 3 | 1 | NO | YES | 2 | 0 |

FIG.82

| Transmitting ICS Network Add. | Sender ICS User Add. (Intra) | Sender ICS User Add. (Inter) | Receiver ICS User Add. | Receiving ICS Network Add. | Request ID | Speed Class | Priority | Open-zone Class |
|---|---|---|---|---|---|---|---|---|
| 7777 | 1111 | | 2100 | 8100 | 4 | 3 | 3 | 1 |
| 7777 | 1111 | 3333 | 3800 | 7600 | 2 | 3 | 3 | 0 |
| 7777 | 1111 | 3333 | 4200 | 8210 | 2 | 3 | 3 | 0 |
| 7780 | | | | 8400 | 3 | 3 | 3 | 0 |
| 7780 | 0012 | | 0035 | 8504 | 1 | 2 | 2 | 0 |

INTEGRATED INFORMATION COMMUNICATION SYSTEM USING INTERNET PROTOCOL

This application is a divisional of U.S. application Ser. No. 09/657,457, filed Sep. 7, 2000 now U.S. Pat. No. 7,149,815, which is a divisional of U.S. application Ser. No. 08/962,563, filed Oct. 31, 1997, now U.S. Pat. No. 6,145,011.

BACKGROUND OF THE INVENTION

1. Field of the Invention

The present invention relates to an integrated information communications system integrally connecting information communication equipments or information communication systems such as and/or for personal computer, LAN (Local Area Network), telephone (including portable telephone), FAX (Facsimile), CATV (Cable Television), Internet and the like, not only via dedicated lines, but also via ISDN (Integrated Services Digital Network), FR (Frame Relay), ATM (Asynchronous Transfer Mode), IPX (Integrated Packet Exchange), satellite, wireless and public lines. Here, the integrated information communication equipment performs communication provided with an address (for the information or the communication) for distinguishing the integrated information communication equipments with other equipments. Particularly, the present invention relates to an integrated information communication system which integrates data transfer services based on connection-less networks (e.g., IP (Internet Protocol) technology used RFC791 or RFC1883) and improves the overall economics of the information communication system by employing a unified address system, and ensuring security to realize an interactive communication between connected terminals or systems.

2. Description of the Prior Art

In accordance with a development of computer and information communication technology, computer communication networks have in recent years come to be widely used in universities, research institutes, government organizations and intra-corporation/inter-corporation situations. LANs are used for intra-corporation communication networks, and in the event that the geographic locale is on a national basis, the form thereof becomes such as shown in FIG. 1. In the example described in FIG. 1, each local LAN uses a common protocol, with each being connected by dedicated lines. Here, e.g., corporation X has LAN-X1, LAN-X2 and LAN-X3 as LANs, corporation Y has LAN-Y1, LAN-Y2 and LAN-Y3 as LANs, and both corporations X and Y use communication address systems ADX and ADY for respectively performing computer communications. Since it is necessary to lay a separate dedicated line for each corporation with such a LAN network, system architecture becomes costly, and in the event that connection is to be made to a LAN network of another corporation, interfacing must be matched such as the communication address system, making inter-connection very difficult and very costly.

On the other hand, the Internet has recently become widespread as a global-scale computer communication network. On the Internet, networks are connected using a router of a provider, a communication protocol called TCP (Transmission Control Protocol)/IP (Internet Protocol) is employed, dedicated lines or FR networks are used for connecting remote areas, and Ethernets which are 10 Mbps LANs or FDDIs (Fiber Distributed Data Interface) which are 100 Mbps LANs are used as communication paths within structures. FIG. 2 shows an example of an Internet connection, in which the routers in the providers maintain mutual connection by exchanging routing-table connection information. Each router is connected to a plurality of networks, and judgment is made based on the routing-table regarding to which router connected to which provider's network received data should go next. Thus, on the Internet, the IP address attached to each IP frame (IP datagram) is checked, the judgment is made to which router the IP frame should be sent, and that the IP frame is sent accordingly. Thus, the IP frames are transferred one after another and delivered to a destination computer, by means of all routers performing the above-described operation.

FIG. 3 illustrates the information contents of the RFC791 of the IP frame used by the Internet, divided into a control field and a data field. FIG. 4 illustrates the information contents of a similar RFC1883, also divided into a control field and a data field. In either figure, the parentheses ( ) indicate the number of bits.

However, with the Internet, since the system is such that the communication path is not administrated in an integrated manner, one cannot tell whether the other party with which communication is being made is the authorized party, and there are problems regarding security in that information may be eavesdropped. Also, in reality, IP addresses within many LANs are being separately decided by the LAN users, so there is the necessity to replace the IP address of the LAN user to the IP address for the Internet when connecting the LAN to the Internet. Also, communication quality such as communication speeds and communication error rates for the trunk lines making up the Internet communication path differ from one line to another for each LAN, and are practically non-uniform. For example, there are problems such as an attempt to send a 10 Mbps TV signal for video-conferencing not achieving the desired communication speed. Therefore, the Internet cannot be in peace used for the communication of the country and the research institute which especially require the reliability or for the business of the company. Further, there is no administrator for performing maintenance of the network such as in the case of failure, of for integrating the overall network for future planning for the network and so forth. Also, with LAN networks and the Internet, the terminals are personal computers (computers), and it has been difficult to user telephones, FAX, CATV and so on in an integrated manner therein.

SUMMARY OF THE INVENTION

The present invention has been made in accordance with the above-described situations, and it is an object of the present invention to provide an integrated information communication system capable of containing a plurality of VANs (Value Added Networks) which perform data/information transfer by using IP frame of which security and reliability in communications has been ensured, by means of not using dedicated lines or the Internet so as to improve economic considerations of the information communication system architecture, and ensuring communication speeds, communication quality and communication trouble countermeasures in a unified manner. Also, it is another object of the present invention to provide an integrated information communication system which uses a single information transfer which is not dependent on the type of service, such as sound, image (motion and still), text, etc., so as to inter-connect services which have conventionally been provided separately, such as total communication services, analog/digital telephone line services, Internet provider services, FAX services, computer data exchange services, CATV services and so forth. Further, it is another object of the present invention to provide an integrated information communication system which enables inter-corporation communication with very little change to the computer communication address systems which have been independently and separately created within each separate corporation (including universities, research institutes, government organizations, etc.).

The present invention relates to an integrated information communication system, and the above objects of the present invention are realized as follows: the present invention is configured by providing an access control apparatus for connecting a plurality of computer communication networks or information communication equipments to each, and a relay device for networking the aforementioned access control apparatus, the system having functions for performing routing by transferring the information by a unified address system, and is configured such that the aforementioned plurality of computer communication networks or information communication equipments can perform communications in an interactive manner.

In FIG. 1 which is given as an example of a conventional arrangement, the range of dedicated lines used for intra-corporation and inter-corporation communications is indicated by solid lines, and this is replaced with the equivalent of a computer communication network according to IP technology as a common communication network indicated by broken lines.

The above-described objects of the present invention are achieved by an ICS (Information Communication System) user frame having a unique ICS user address system ADX being converted into an ICS network frame having an address system ADS, based on the administration of a conversion table provided within an access control apparatus, and by being arranged such that in the case that transmission is made over at least one VAN contained therein following rules of the aforementioned address system ADS, and the destination other access control apparatus is reached, conversion is made to the aforementioned ICS user address system ADX based on the administration of the aforementioned conversion table, and another external information communication apparatus is reached. Also, the above-described objects of the present invention are achieved by an ICS user frame having a unique ICS user address system ADX being converted into an ICS network frame corresponding with a reception ICS network address registered beforehand to the conversion table in accordance with a user logic communication line, rather than using an ICS user address within the aforementioned ICS user frame based on the administration of a conversion table provided within the access control apparatus, and by being arranged such that in the case that transmission of the aforementioned ICS network frame is made to another access control device via at least one VAN following rules of the ICS address system ADS, the transfer destination of the aforementioned ICS network frame being either 1 or N, this is returned to the aforementioned ICS network frame based on the administration of a conversion table provided within the aforementioned access control apparatus, and another external information communication apparatus is reached.

BRIEF DESCRIPTION OF THE DRAWINGS

In the accompanying drawings:

FIG. 16 is a diagram to show an example of the conversion table in the access control apparatus;

FIG. 17 is a diagram to show an example of the temporary conversion table in the access control apparatus;

FIG. 21 is a diagram to show an example of the conversion table in the access control apparatus;

FIG. 24 is a diagram to show an example of the conversion table in the access control apparatus;

FIG. 25 is a diagram to show an example of the table in the ICS network database;

FIG. 28 is a diagram to show an example of the conversion table in the access control apparatus;

FIG. 29 is a diagram to show an example of the correspondence table in the ICS address administration server;

FIG. 32 is a diagram to show an example of the conversion table in the access control apparatus;

FIG. 33 is a diagram to show an example of the ICS name conversion table in the ICS name server;

FIG. 37 is a diagram to show an example of the conversion table in the access control apparatus;

FIG. 38 is a diagram to show an example of the fixed charging definition table in the accounting server;

FIG. 52 is a diagram to show an example of the conversion table in the access control apparatus;

FIG. 65 is a diagram to show an example of the conversion table in the access control apparatus;

FIG. 66 is a diagram illustrating an example of the table to define the relation between the communication speed and the speed class;

FIG. 72 is a diagram to show an example of the conversion table in the access control apparatus;

FIG. 77 is a diagram to show an example of the conversion table in the access control apparatus;

FIG. 78 is a diagram to show an example of the conversion table original in the ICS conversion table server;

FIG. 79 is a diagram to show an example of the correspondence table in the ICS address administration server;

FIG. 80 is a diagram to show an example of the ICS name convertion table in the ICS name server;

FIG. 82 is a diagram to show an example of the intensive conversion table in the intensive access control apparatus;

FIG. 83 is a diagram to show an example of the simple conversion table in the simple access control apparatus and FIG. 84 is a flowchart to show an operation of the nineteenth embodiment.

DESCRIPTION OF THE PREFERRED EMBODIMENTS

Figure 5:
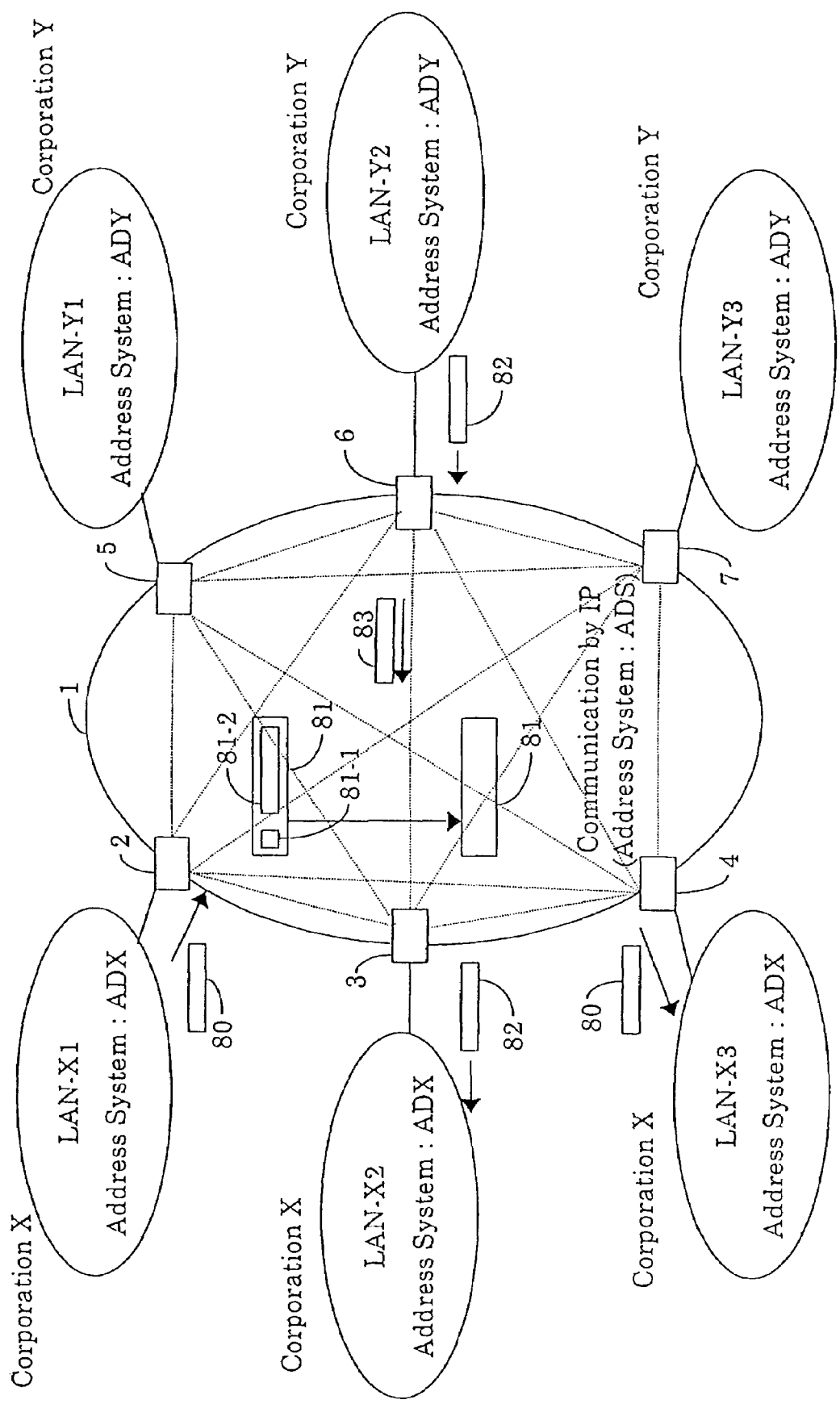
FIG. 5 is a block diagram systematically illustrating the basic principle of the present invention.

FIG. 5 systematically illustrates the basic principle of the present invention, wherein an integrated information communication system (hereafter referred to as "ICS") 1 according to the present invention has self-appointed address providing rules as a computer information/communication address. i.e., the system has a unique address system ADS, and has access control apparatuses (2 through 7 in the present example) which serve as access points for connecting a plurality of computer communication networks or information communication equipment, e.g., a great number of LANs (in the present example, corporation X's LAN-X1, LAN-X2 and LAN-X3, and corporation Y's LAN-Y1, LAN-Y2 and LAN-Y3). Here, the corporation X's LAN-X1, LAN-X2 and LAN-X3 have the same address system ADX, and the corporation Y's LAN-Y1, LAN-Y2 and LAN-Y3 have the same address system ADY. The access control apparatuses 2, 3 and 4 have conversion tables for administrating mutual conversion between the address system ADS and the address system ADX. The access control apparatuses 5, 6 and 7 have conversion tables for administrating mutual conversion between the address system ADS and the address system ADY. The computer communication data (ICS frame) within the ICS 1 uses addresses according to the address system ADS of the ICS 1, and performs the communication according to IP frame which is used on the Internet.

Now, description will be made regarding the operation in the case of communication within a single corporation. The computer communication data (ICS frame) 80 transmitted from the LAN-X1 of a corporation X is provided with addressing following the address system ADX, but is subjected to address conversion following the address system ADS under administration of the conversion table of the access control apparatus within ICS 1, and becomes ICS frame 81. This is then sent within the ICS 1 under the rules of the address system ADS, and upon reaching the destination access control apparatus 4. is restored to the computer communication data 80 of the address system ADX under the administration of the conversion table thereof, and is sent to the LAN-X3 within the same corporation X. Here, the ICS frame being sent and received within the ICS 1 is referred to as an "ICS network frame", and the ICS frame being sent and received outside of the ICS 1 is referred to as an "ICS user frame". The form of the ICS user frame is stipulated by a form defined by RFC791 or RFC1883 as a rule used in the Internet, but dealing with ICS frames which do not follow the above rule will be described later in conjunction with description of another embodiment.

The ICS network frame 81 is comprised of a network control field 81-1 and a network data field 81-2, with the network control field 81-1 storing the addresses (address system ADS) of the access control apparatuses 2 and 4 therein. The ICS user frame is either used as the network data field 81-2 with no change to the data value thereof, or is subjected to data format conversion under the stipulations determined within the ICS 1 and is used as network data field 81-2. An example of the data format conversion stipulations might be conversion to ciphertext or data compression, and the access control apparatus 2 may be provided with ciphering means, deciphering means for returning the ciphertext to the original plain-text (ICS user frame), data compression means, and data decompression means for returning the compressed data to the original data. In the access control apparatus 2, the ICS user frame 80 is used as the ICS network frame 81-2, and the operation of adding the network control field 81-1 to the ICS network frame 81-2 is referred to as "ICS encapsulation". Also, in the access control apparatus 4, the operation of removing the network control field 81-1 from the ICS network frame 81 is referred to as "ICS reverse encapsulation".

Now, description will be made regarding the operation in the case of communication between different corporations. The computer communication data (ICS user frame) 82 transmitted from the LAN-Y2 of a corporation Y is provided with addressing following the address system ADY, but is subjected to address conversion following the address system ADS under administration of the conversion table of the access control apparatus 6 within ICS 1, and becomes ICS frame 83. This is then sent within the ICS 1 in accordance with the rules of the address system ADS, and upon reaching the destination access control apparatus 3, is converted to the computer communication data 82 of the address system ADX under the administration of the conversion table thereof, and is sent to the LAN-X2 within the corporation X. While address lengths of 32 bits and 128 bits are used in the present invention, the present invention is by no means restricted to these. Even if the length of the address is changed to such other than 32-bit or 128-bit, this does not change the principle of address conversion which is the principle idea of the present invention.

Thus, according to the present invention, both intra-corporation and inter-corporation computer communications are enabled by unified address administration by the ICS 1. Generally used user terminals for computer communications are incorporated within the LAN within the structure of the user, and incorporated within the VAN (Value Added Network) via access lines, and user data frames are sent which have differing data formats and differing address system for each type of service. For example, an IP address is used for Internet services, a telephone number/ISDN number (E.164 address) for telephone services, and an X.121 address is used for X.25 packet services. Conversely, according to the ICS 1 of the present invention, address conversion (referred to as "ICS address conversion") is performed with the conversion table of the access control apparatus based on the inputted ICS user frame, thus realizing sending of information frames of data of varied structures unified under a single data format and address system, i.e., converted to ICS frames.

Figure 6:
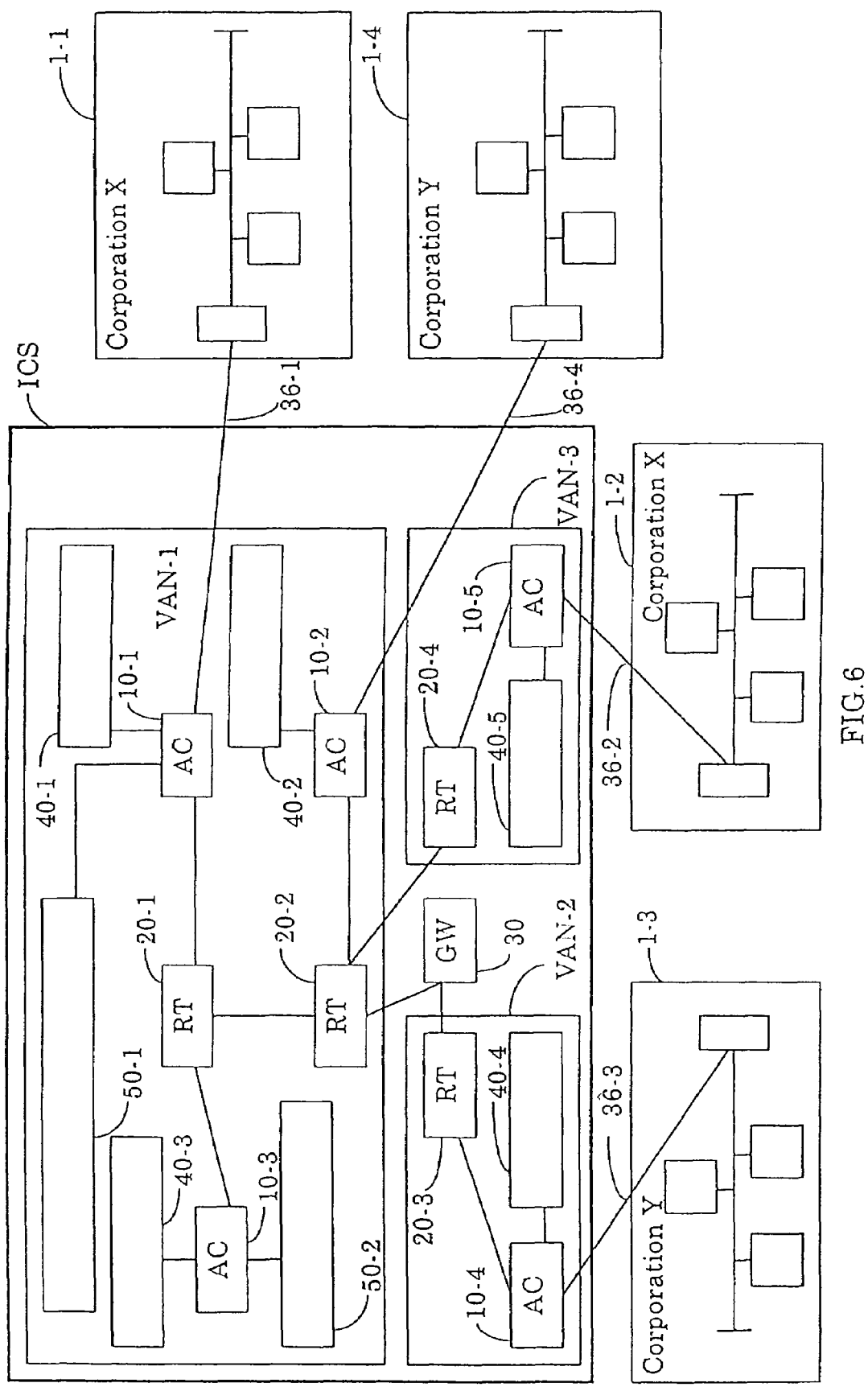
FIG. 6 is a block diagram to show an example of a network wherein an ICS according to the present invention is constructed of a plurality of VANs.
Figure 7:
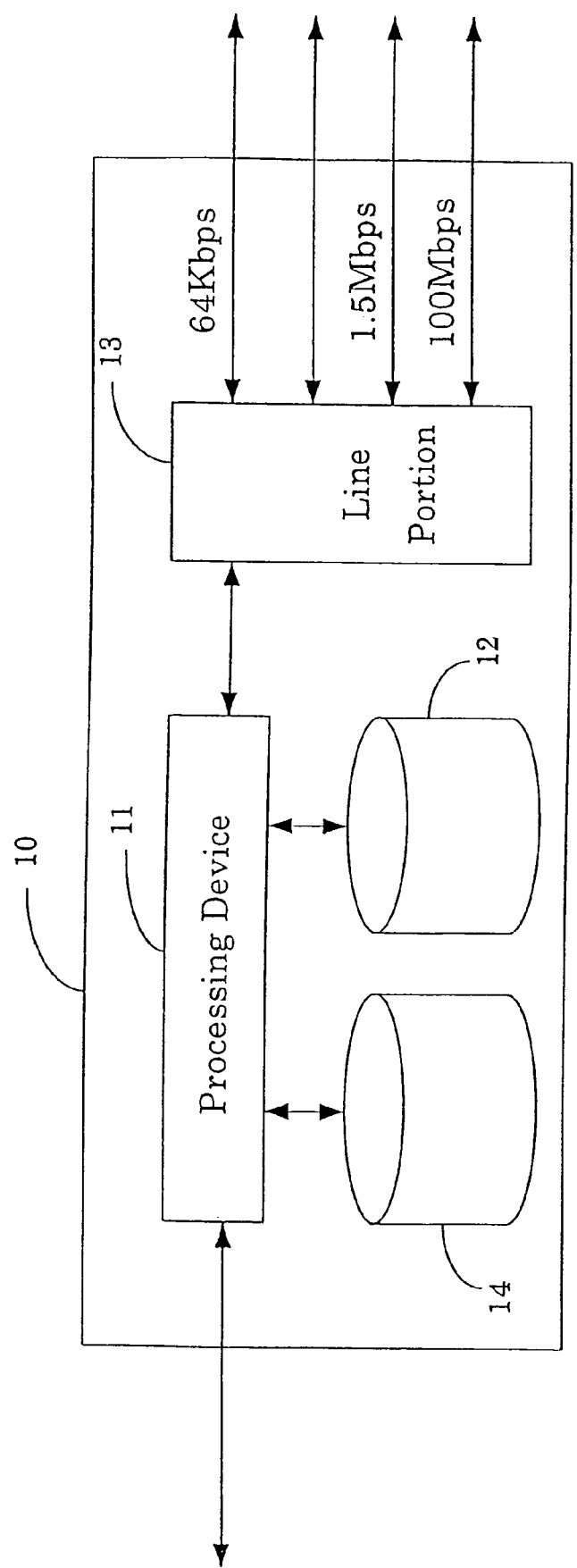
FIG. 7 is a block diagram to show an example of configuring the access control apparatus.
Figure 8:
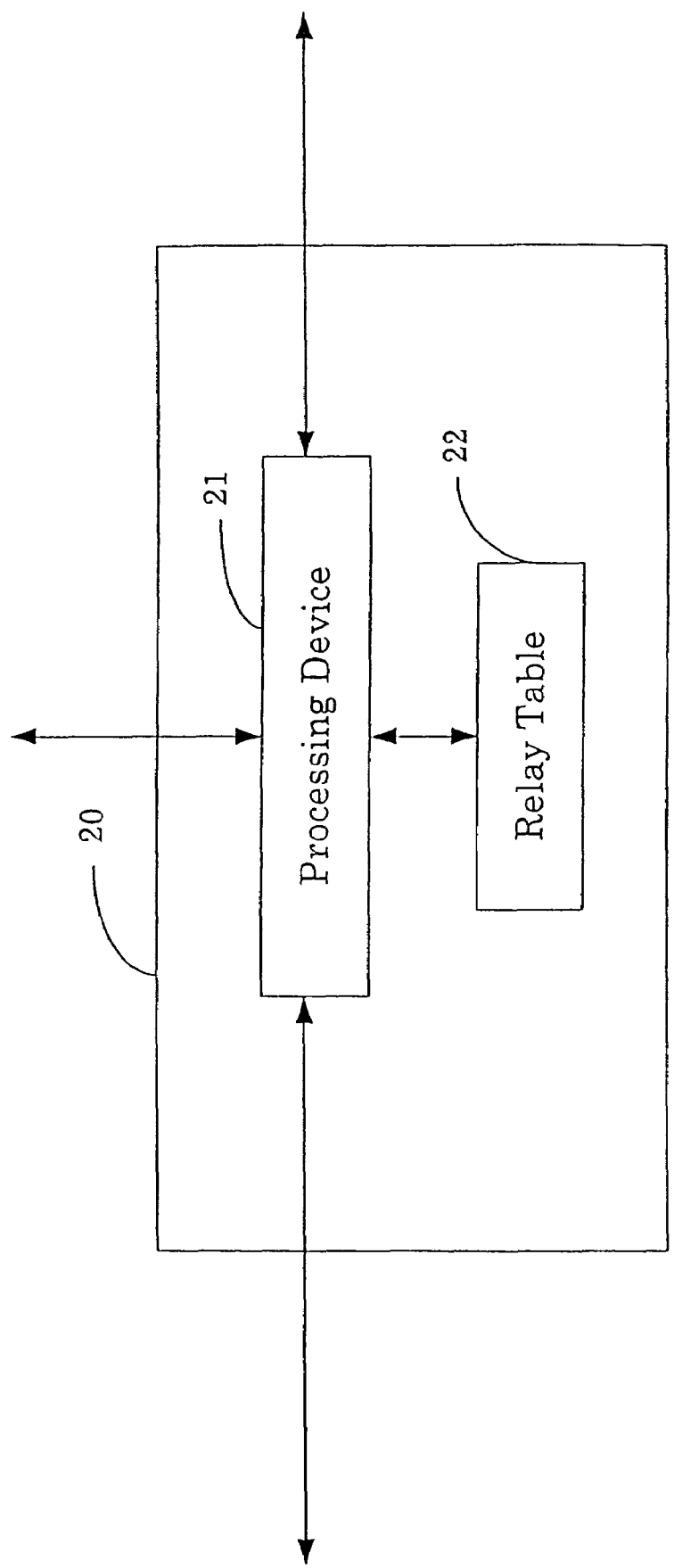
FIG. 8 is a block diagram to show an example of configuring the relay apparatus.
Figure 9:
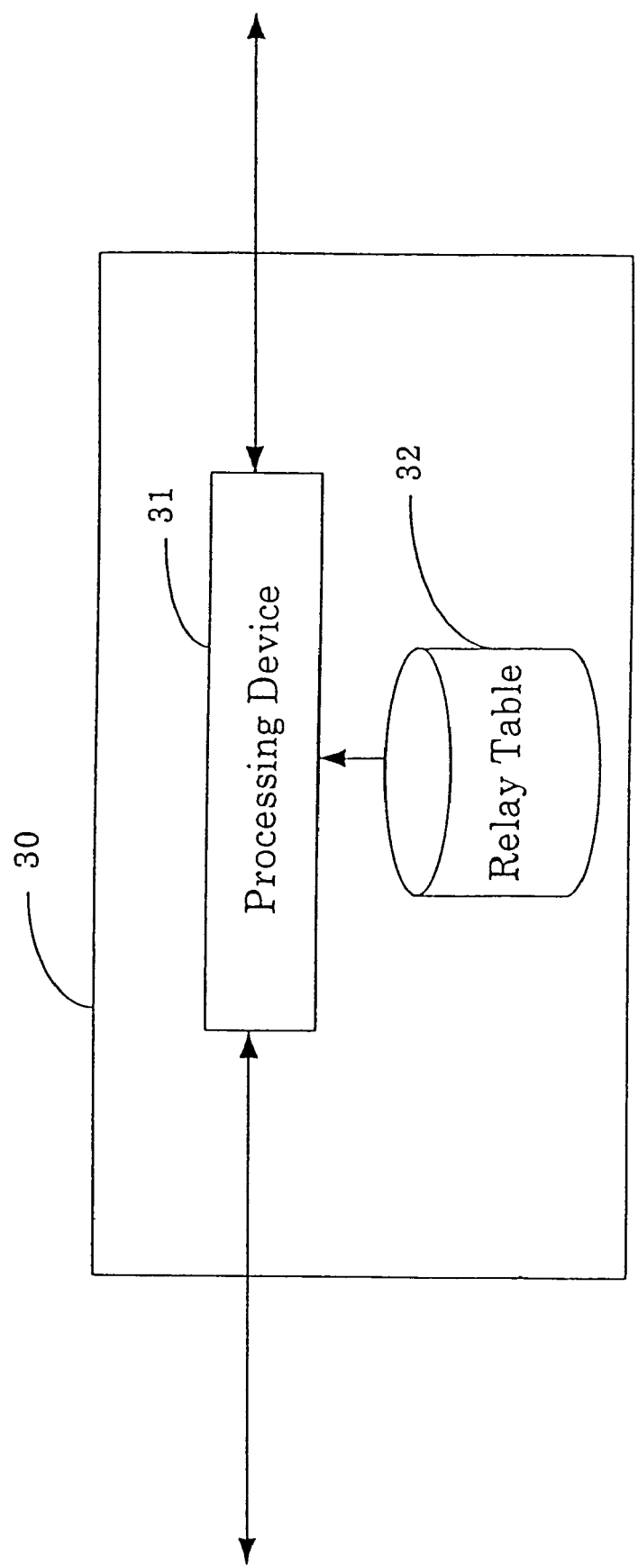
FIG. 9 is a block diagram to show an example of configuring the inter-VAN gateway.

FIG. 6 schematically illustrates an example wherein the ICS 1 of the present invention is comprised of a plurality of VANs (VAN-1, VAN-2, VAN-3), with each VAN being administered by a VAN operator. An ICS 1 user applies to the VAN operator for a user communication line, and the VAN operator decides an ICS address, an ICS network address and the like for the user and registers these informations with a circuit type in a conversion table 12 within the access control apparatus 10 such as shown in FIG. 7. The ICS 1 has as access points serving as external connection elements with the LANs (or terminals thereof) of the corporations X and Y the access control apparatuses 10-1, 10-2, 10-3, 10-4 and 10-5, and further has relay apparatuses 20-1, 20-2, 20-3 and 20-4, and also ICS network servers 40-1, 40-2, 40-3, 40-4 and 40-5, as well as ICS address administration servers 50-1 and 50-2. A relay apparatus 20 such as shown in FIG. 8 is provided to the communication path within each of the VANs, and an inter-VAN gateway 30 such as illustrated in FIG. 9 is provided as a connection element of the VAN-2 and the VAN-3. The LANs 1-1, 1-2, 1-3 and 1-4 shown in FIG. 6 are respectively connected to the access control apparatuses 10-1, 10-5, 10-4 and 10-2, via the user communication lines 36-1, 36-2, 36-3 and 36-4.

The access control apparatus 10 (10-1, 10-2, 10-3, 10-4 and 10-5) are devices containing the user communication lines from the user (corporations X and Y) to the ICS 1, and as shown in FIG. 7, is comprised of a processing device 11 comprised of a CPU and so on, a conversion table 12 serving as a database for performing address conversion and the like, a line portion 13 of an input/output interface, and a temporary conversion table 14. Also, the relay apparatus 20 has a transferring function of an ICS network frame and a routing function of path designating, and as shown in FIG. 8 has a processing device 21 comprised of a CPU and so on and a relay table 22, the relay table 22 being used for determining the communication destination when the ICS network frame is transferred within the ICS 1. The inter-VAN gateway 30 has a processing device 31 comprised of a CPU and so on and a relay table 32 for determining where to send the ICS network frames between the VANs, as shown in FIG. 9.

Figure 10:
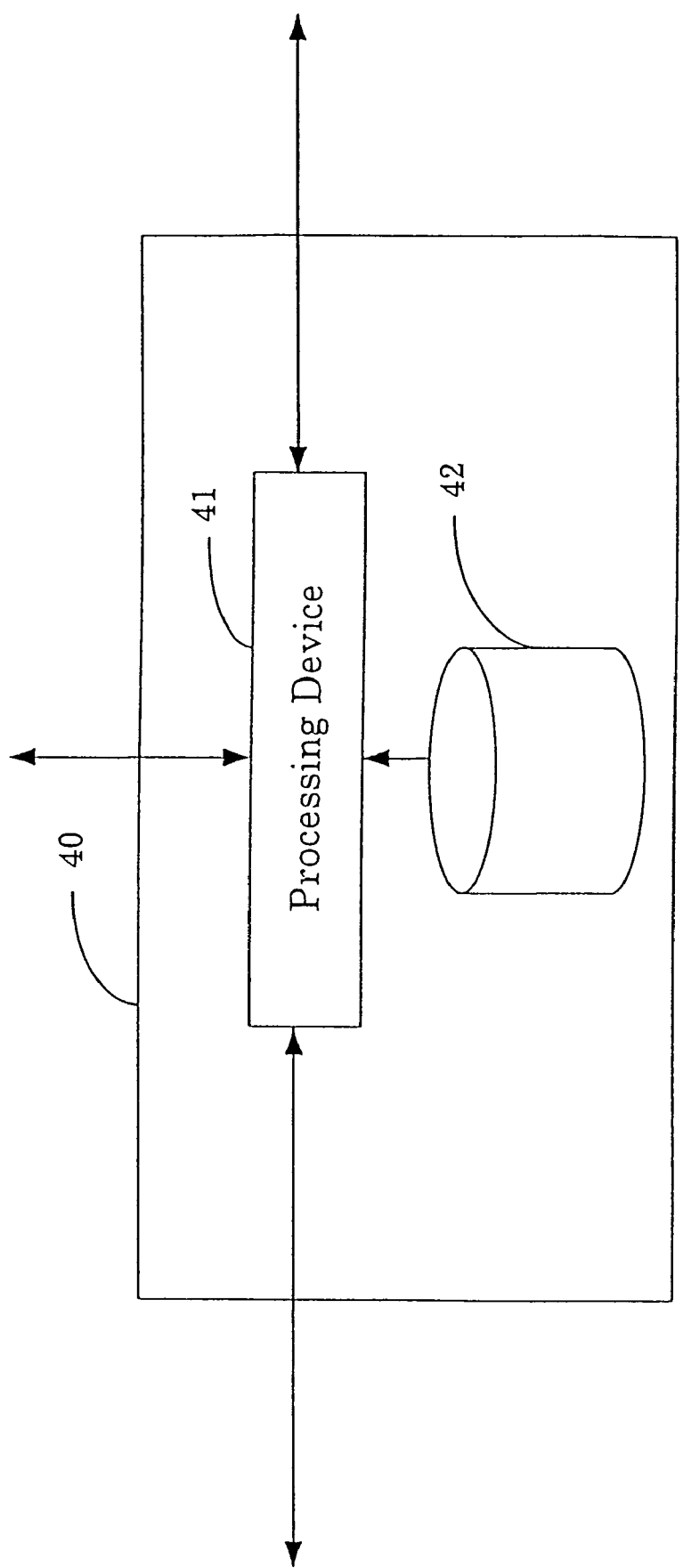
FIG. 10 is a block diagram to show an example of configuring the ICS network server.

As shown in FIG. 10, the ICS network server 40 is comprised of a processing device 41 and an ICS network database 42, the usage of the ICS network database 42 being various. Examples of the usage include: user-specific data (such as the name or address of the user) corresponding with the ICS user address, data not corresponding with the ICS user address, such as data indicating the state of communication trouble within the VAN, or data not directly related to the VAN, such as an electronic library which maintains and discloses digital documents, public keys for a public encryption system using encryption technology employed in verifying the authenticity of the transmitter and receiver, and maintaining data such as public key proof data or secret keys for a secret encryption system. The processing device 41 refers to the ICS network database 42, and obtains corresponding data and transmits the data to the access control apparatus 10. Further, not only does the ICS network database 42 operate in stand-alone manner, but also is capable of communicating with other ICS network servers and obtaining data therefrom, by means of transmitting and receiving the ICS network frames based on IP communication technology. Within the ICS, the ICS network server is the only component provided with a single ICS network address.

According to the present invention, the address used to identify computers, terminals and the like used within the ICS network frame is referred to as an "ICS network address", and the address used to identify computers, terminals and the like used within the ICS user frame is referred to as an "ICS user address". The ICS network address is used only within the ICS, one or both of the two types being used; 32-bit length and/or 128-bit length. Similarly, the ICS user address also uses one or both of the two types; 32-bit length and/or 128-bit length. The ICS logic terminal within the access control apparatus 10, the relay apparatus 20, the inter-VAN gateway 30 and the ICS network server are arranged so as to be provided each with an ICS network address so as to be uniquely identified. Also, the ICS user address is formed of a VAN upper code and a VAN internal code. With the length of the VAN upper code being represented as C1 bits and the length of the VAN internal code being represented as C2 bits, the ICS user address is used such that the total of C1+C2 equals either 32 bits or 128 bits.

In the present invention, no particular method for deciding the VAN upper code and the VAN internal code is stipulated, but in the case of C1+C2=32 bits, the following example can be given for a method for deciding such:

VAN upper code=district administration code (4 bits) ||country code (4 bits)||VAN code (8 bits)

VAN internal code=VAN district code (4 bits)||VAN access point code (8 bits)||user logic code (4 bits)

Figure 11:
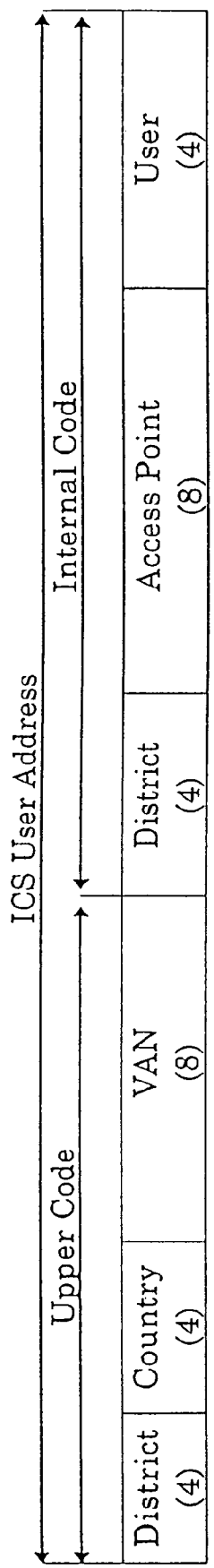
FIG. 11 is an array diagram illustrating an example of the ICS user address used in the present invention.

FIG. 11 makes description thereof using an example of an ICS user address. Here, the symbol "a||b" indicates linkage of data "a" and "b", i.e., data obtained by means of arrayed data "a" and "b" in this order. The ICS network address can be provided with locality in the same manner as with the user network address. i.e., ICS network address=district administration code||country code VAN code||VAN district code||user logic communications line code Thus, the relay apparatus can efficiently find the transfer destination by means of deciding the transferring destination with consideration to the district. The address can be determined in the same way in the case of C1+C2=128 bits, as well. Incidentally, with the present invention, the ICS frame can be constructed as described later, as long as C1+C2=32 bits or C1+C2=128 bits is kept, regardless of how the field sections for the VAN upper code and the VAN internal code are made, or the length of each of the sections. Also, when deciding the VAN upper code and the VAN internal code, part of these codes may be made to be unique to the user. That is, the user can make a user-specific address system. The address values of a 32 bit expression value are from address 0 to address ($2^{32}-1$), the present invention is carried out by providing an address decided uniquely to the user within the range of address $10\times2^{24}$ to address ($10\times2^{24}+2^{24}-1$), or address ($172\times2^{24}+16\times2^{16}$) to address ($172\times2^{24}+32\times2^{16}-1$) or address ($192\times2^{24}+168\times2^{16}$) to address ($192\times2^{24}+169\times2^{16}-1$).

Figure 12:
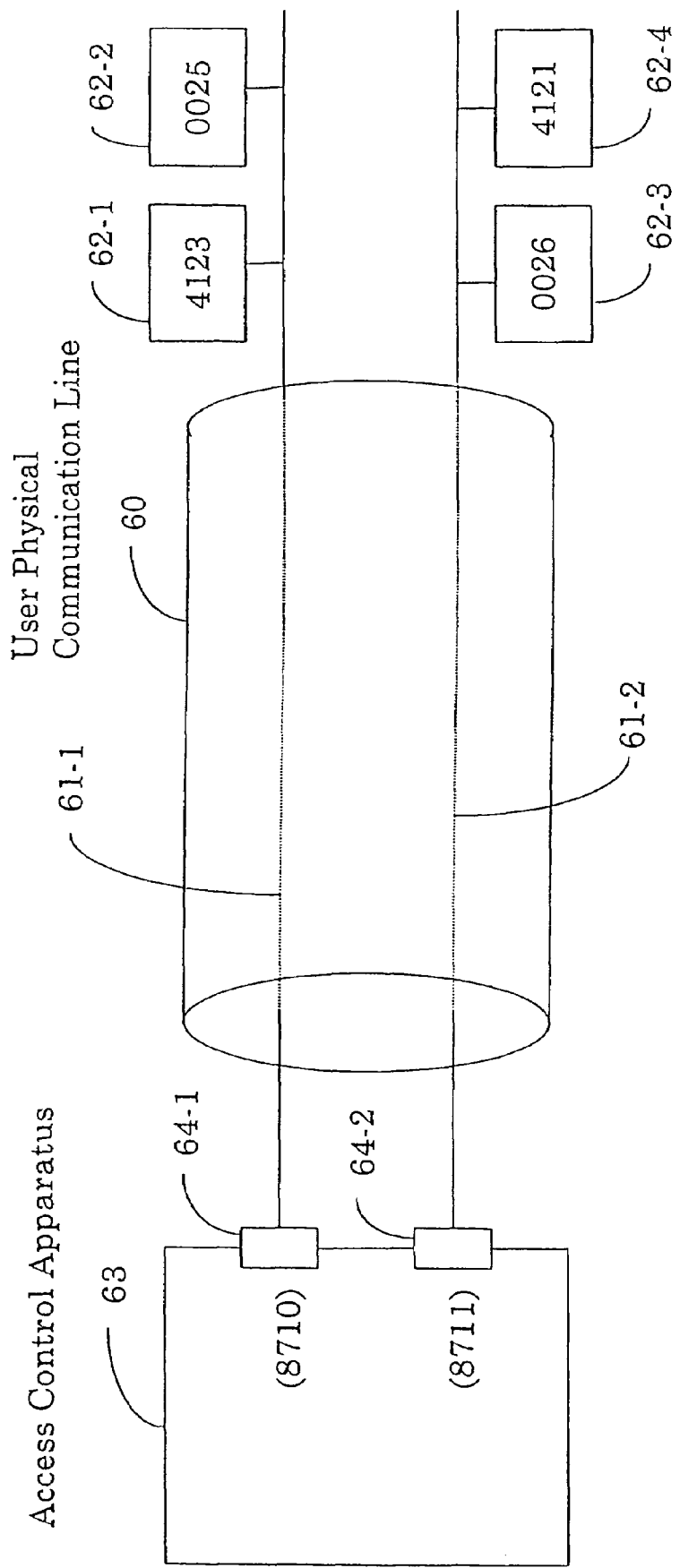
FIG. 12 is a wiring diagram illustrating the connection relation between the ICS logic terminals and the user communication lines.

A physical communication line can be separated into a plurality of communication lines and used, this being realized in conventional art as a multiplex communication method by frame relay (FR), for example. According to the present invention, the user's communication line is separated into a user physical communication line and one or more user logic communication lines. FIG. 12 illustrates an example of this aspect, wherein a user physical communication line 60 is separated into two user logic communication lines 61-1 and 61-2. Also, separated computer communication apparatuses 62-1, 62-2, 62-3 and 62-4 are each connected to respective user logic communication lines, and the ICS user addresses "4123, 0025, 0026, 4124" are assigned to each of the computer communication apparatuses 62-1 through 62-4. The user physical communication line 60 is connected to the access control apparatus 63, and the point of contact between the two is called "ICS logic terminal". The ICS logic terminal is provided with an only ICS network address within the ICS. In the example shown in FIG. 12, the user logic communication lines 61-1 and 61-2 are connected to the access control apparatus 63, and ICS network addresses "8710" and "8711" are assigned to the ICS logic terminals 64-1 and 64-2 of the contact points, respectively.

As described above, the ICS network server 40 is also provided with an only ICS network address, so that the ICS network address can determine that the ICS logic terminal or the ICS network server is the only one within the ICS. The ICS network server is capable of exchanging information with other ICS network servers by means of transmitting and receiving the ICS network frames provided with each other's ICS network addresses, using IP communication technology. This function is referred to as a "ICS network server communication function". The access control apparatus is also provided with an only ICS network address within the ICS, and is capable of exchanging information with other ICS servers by means of a communication function of the ICS network server. The ICS network server communication function can be realized by TCP or UDP (User Datagram Protocol) of a conventional technology.

Figure 13:
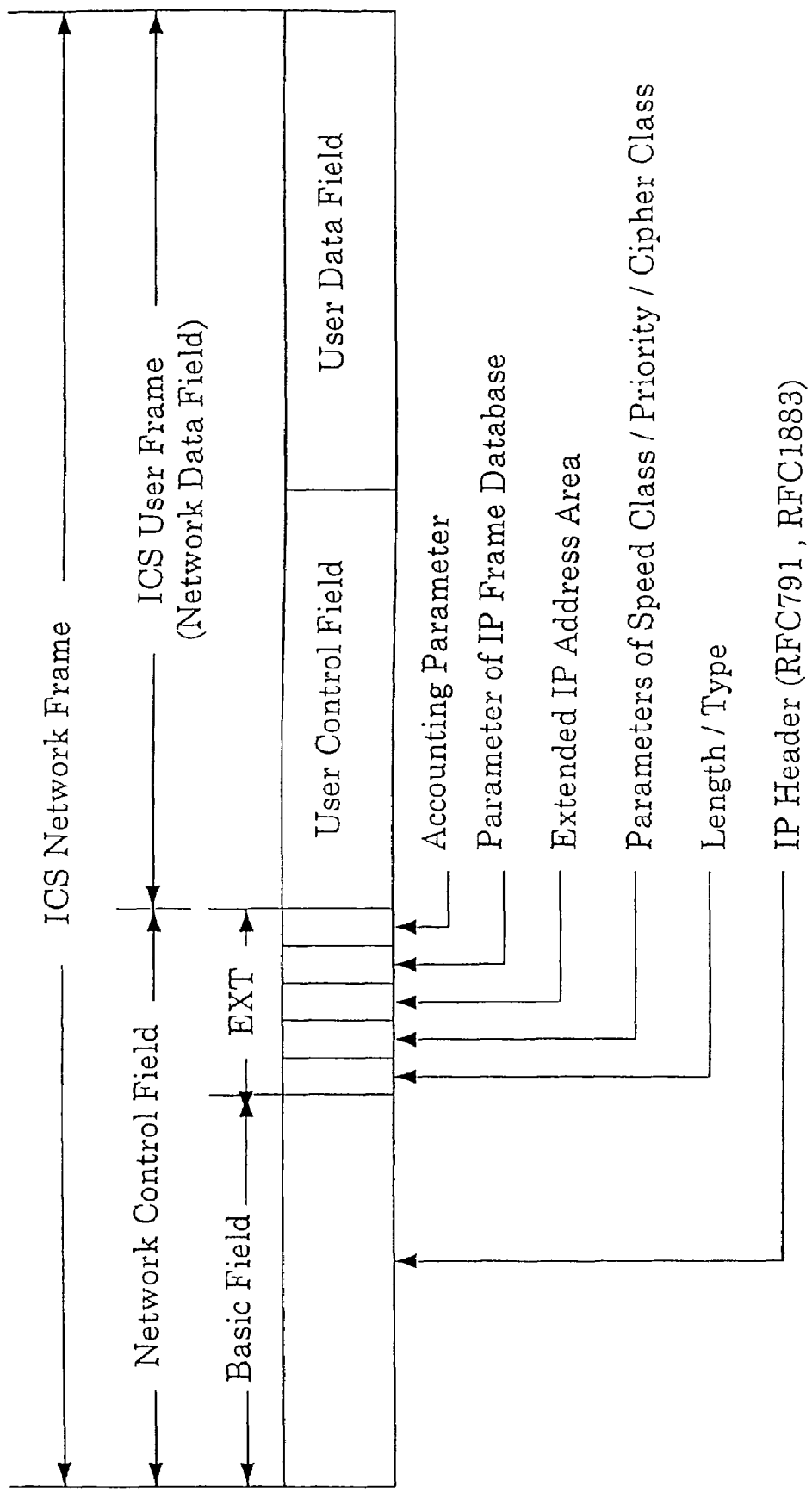
FIG. 13 is a diagram illustrating the relation between the ICS user frame and the ICS network frame which are used in the present invention.

There are two types of the ICS frames in the present invention, as described above, the ICS network frame which is transmitted and received within the ICS, and the ICS user frame which is transmitted and received outside of the ICS. Each ICS network frame is comprised of a control field and a network data field (ICS user frame), and, as shown in FIG. 13, the network control field is comprised of a basic field and an expansion field, and the network data field is comprised of a user control field and user data field, so as to allow usage by ICS encapsulation or ICS reverse encapsulation. That is, when the ICS user frame enters the ICS from the access control apparatus, the ICS user frame becomes a data field of the ICS network frame, and the control field (network control field) of the ICS network frame is added thereto (ICS encapsulation). The expansion field in the network control field is used for the cipher or the like. In a case that the cipher is useless, the expansion field is not used.

Figure 1:
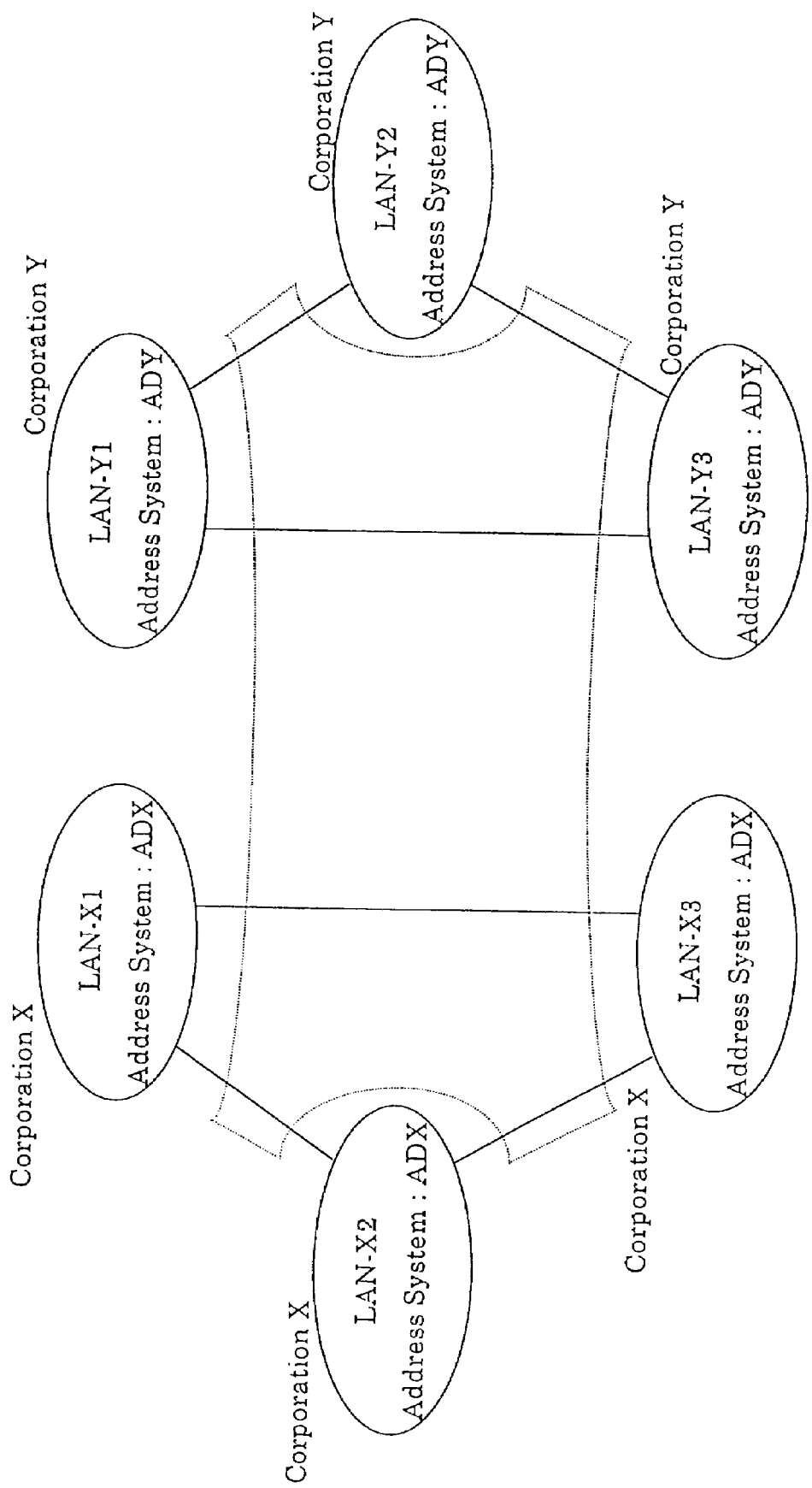
FIG. 1 is a block diagram for describing conventional LAN networks.
Figure 2:
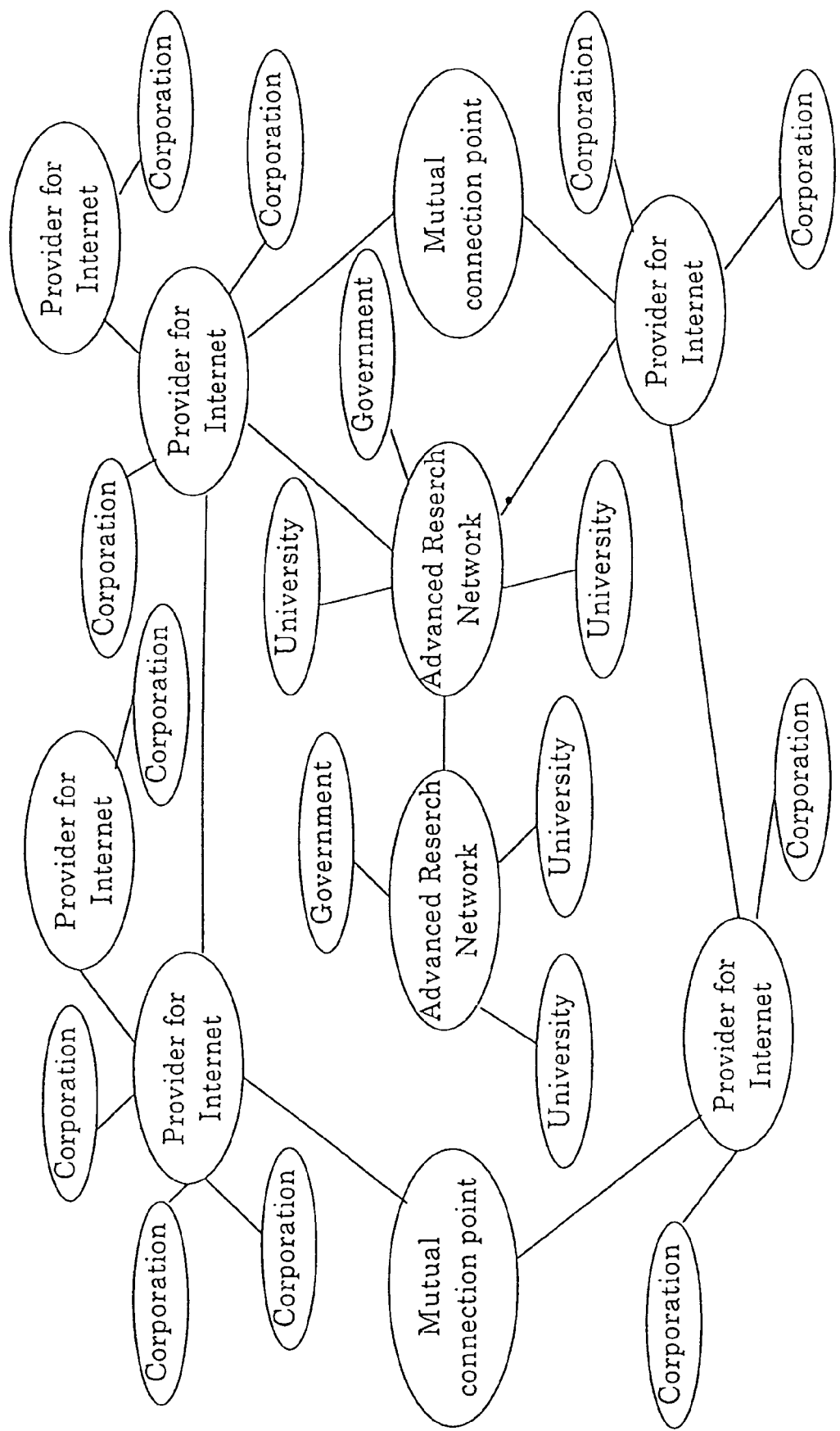
FIG. 2 is a diagram illustrating an example of a form of the Internet.
Figure 3:
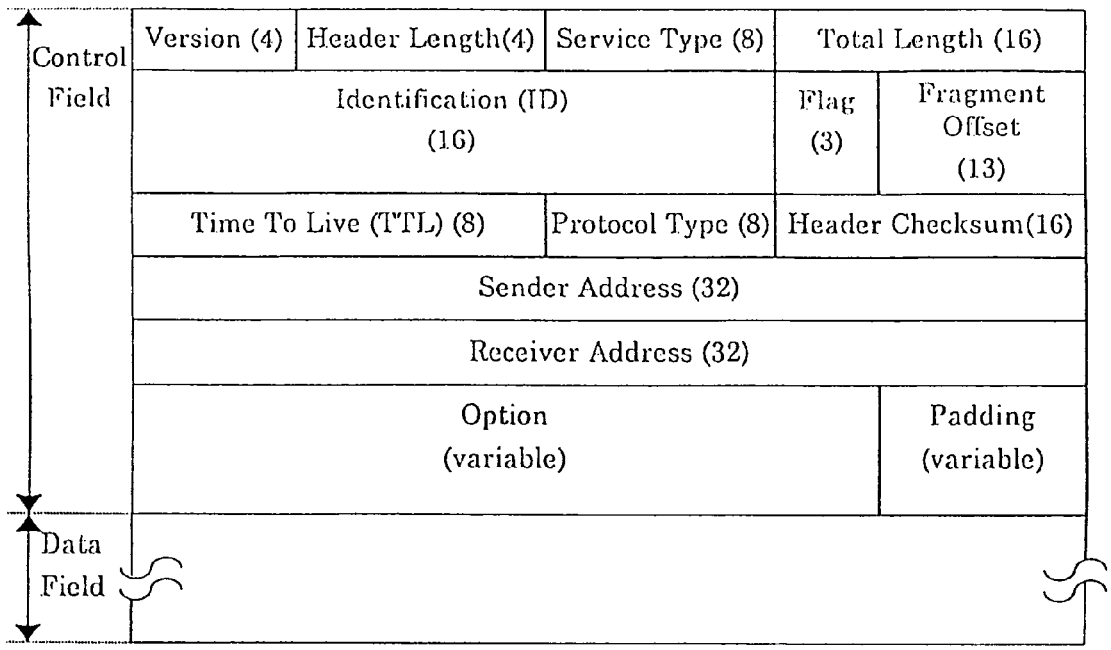
FIG. 3 is a diagram illustrating an IP frame according to RFC791 stipulations.
Figure 4:
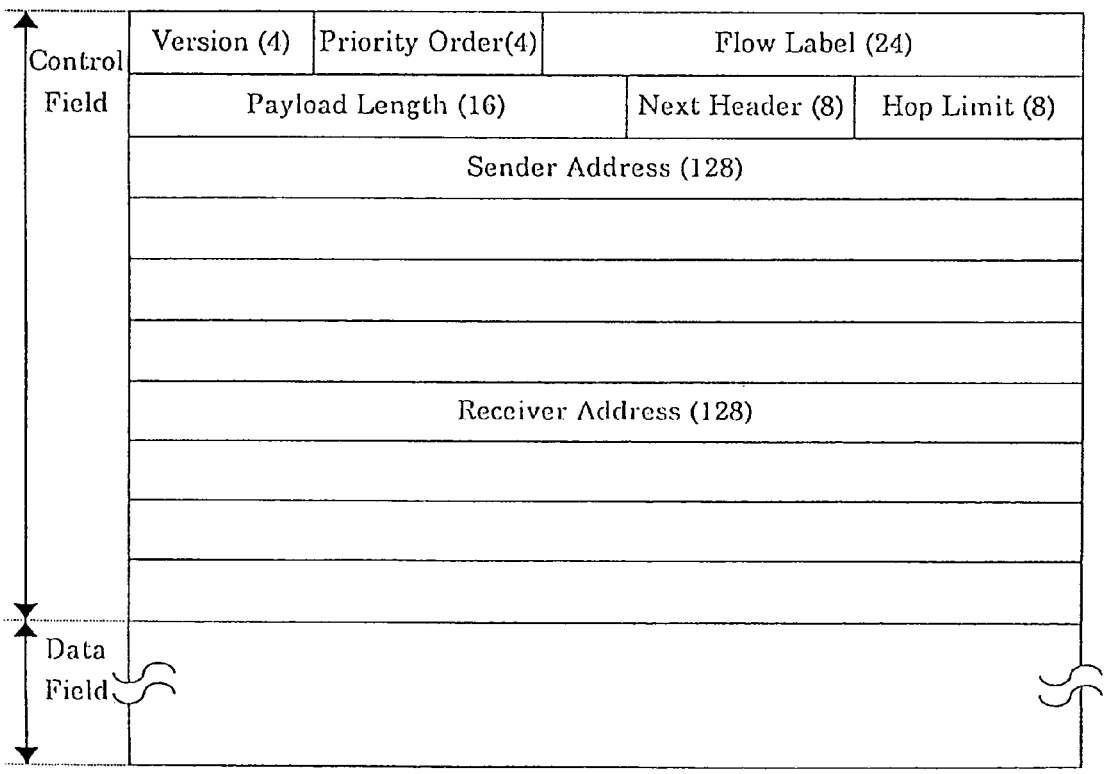
FIG. 4 is a diagram illustrating an IP frame according to RFC1883 stipulations.

Inside the network control field of the ICS frame is placed an area for storing the transmitter's address and intended receiver's address. There are two types of the ICS frames, those with a 32-bit address length and those with a 128-bit address length, and a frame format with 32-bit address length being employed according to the RFC791 stipulations shown in FIG. 3, for example. In the event that 32 bits is insufficient for the ICS network address, for example, in the event that a 64-bit address is to be used, following the RFC791 stipulations, the lacking 32 bits (64 bits–32 bits) are written into an option field or the expansion field in the network control field of the ICS network frame control field, thus making the network address usable at 64 bits. Now, supplemental description will be made regarding the aforementioned user-specific address. In the event that a great number of users have a private address (a type of ICS user address) in the section between an address ($10 \times 2^{24}$) and an address ($10 \times 2^{24} + 2^{24} - 1$) for example, in the case that the length of the ICS user address is 32 bits, the 32 bits is insufficient for the ICS network address, since the ICS network address is assigned corresponding to the ICS user address, and 64 bits is required, for example. In this case, as described above, the lacking 32 bits are written into the option field of the ICS network frame control field, thus making the network address usable at 64 bits. The fact that communication between the same user (called "intra-corporation communications") is possible using a private address will be described in the first embodiment. Also, in the event that the address length is 128 bits, the present embodiment is carried out under the frame format according to the RFC1883 stipulations such as shown in FIG. 4, for example. The originating address area within the network control field and the address stored in the destination address area are made to be ICS network addresses, each respectively being the transmitting ICS network address and the receiving ICS network address. Further, the originating address area within the user control field and the address stored in the destination address area are made to be ICS user addresses, each respectively being the sending ICS user address and the receiving ICS user address.

Incidentally, there is no need to following the RFC791 or RFC1883 stipulations for the ICS frame format in carrying out the present invention; the present invention can be carried out as long as the frame format is such that uses addresses of 32 bits or 128 bits in length. Generally, the ICS receives the ICS user frame stipulated by RFC791 or RFC1883, but other frame formats can be handles within the ICS network by converting to ICS user frame with a conversion means (or changing portion).

Embodiment-1

Basic ICS, Intra-Corporation Communication and Inter-Corporation Communication

Figure 14:
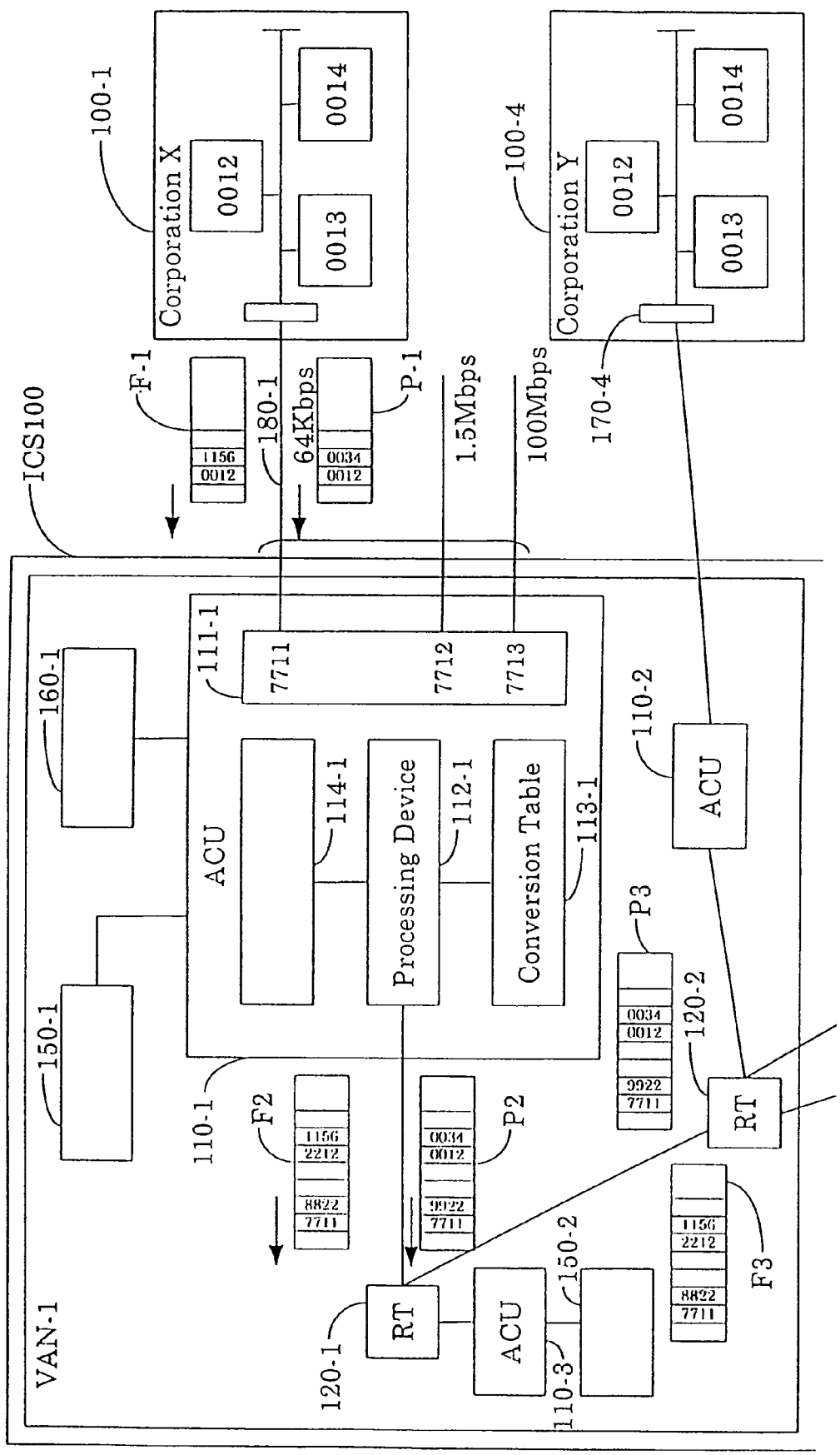
FIG. 14 is a portion of a constructional block diagram to show a first embodiment (intra-corporation communication, inter-corporation communication) according to the present invention.
Figure 15:
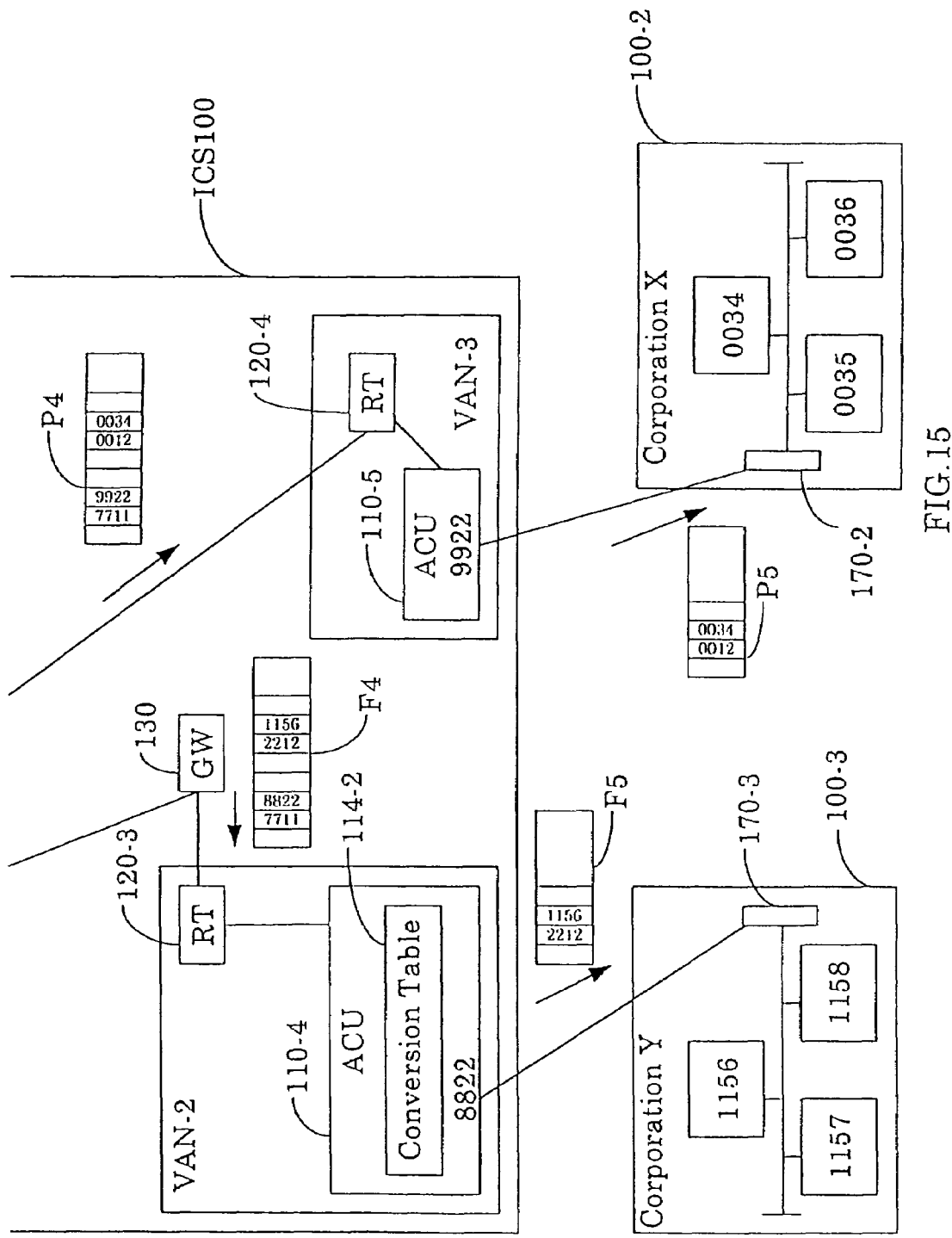
FIG. 15 is a portion of a constructional block diagram to show a first embodiment (intra-corporation communication, inter-corporation communication) according to the present invention.

A first embodiment of the present invention will be described with reference to FIGS. 14 and 15, regarding a basic communication wherein the transfer destination within the ICS is determined from the receiver ICS user address, based on administration by a conversion table. In the figures, 170-1, 170-2, 170-3 and 170-4 respectively denote gateways provided within the LANs 100-1, 100-2, 100-3 and 100-4, and the ICS frames can pass through these gateways 170-1 through 170-4. FIG. 16 shows an example of a conversion table 113-1 in the access control apparatus 111-1 and FIG. 17 does the same of a temporary conversion table 114-2 in the access control apparatus 110-4.

First, description will be made regarding communication between a terminal which is connected to a LAN 100-1 of the corporation X which has a unique address system ADX, and a terminal which is connected to a LAN 100-2 of the same corporation X. That is, this is a communication between a terminal which has an ICS user address "0012" on the LAN 100-1 and a terminal which has an ICS user address "0034" on the LAN 100-2. This communication is a typical communication made between terminals which have set addresses based on a unique address system within a single corporation (ADX in this example), the communication being made via the ICS 100 in an interactive manner. This type of communication is referred to as intra-corporation communication service (or intra-corporation communication). Next, description will be made regarding a communication between a terminal which is connected to a LAN 100-1 of the corporation X which has a unique address system ADX and a terminal which is connected to a LAN 100-3 of the corporation Y which has a unique address system ADY. That is, this is a communication between a terminal which has an ICS user address "0012" on the LAN 100-1 and a terminal which has an ICS user address "1156" on the LAN 100-3. This communication is a typical communication made between terminals which have different address systems within different corporations, the communication being made using an ICS address system which can be shared between the two. This type of communication is referred to as inter-corporation communication service (or inter-corporation communication).

<<Common Preparation>>

In describing the present embodiment, the address format and so forth is determined as described below, but the specific numeric values and formats are all but an example, and the present invention is by no means limited to these. The ICS network address is represented by a 4-digit number, and the sender ICS user address and the receiver ICS user address are both represented by a 4-digit number. Of the sender ICS user address and the receiver ICS user address, addresses of which the upper two digits are not "00" are used as an inter-corporation communication address, and this inter-corporation communication address is an only value within the ICS 100. Of the sender ICS user address and the receiver ICS user address, addresses of which the upper two digits are "00" are used as an intra-corporation communication address, and this intra-corporation communication address may be duplicate of other intra-corporation communication address within the ICS 100. Also, the conversion table 113-1 in FIG. 16 provided to the access control apparatus 110-1 contains the following: transmitting ICS network addresses, receiving ICS network addresses, sender ICS network addresses, receiver ICS network addresses, request identification (ID), speed segments and so forth. The request identification registered to the conversion table 113-1 is such that, e.g., "1" represents the intra-corporation communication service, "2" represents the inter-corporation communication service, and "3" represents a virtual dedicated line connection (which will be described hereinafter). The speed segment is the line speed that the communication from the ICS network address requires, including throughput (e.g., the number of ICS frames sent within a predetermined time).

<<Preparation for Intra-corporation Communication>>

The users of the LAN 100-1 and the LAN 100-2 specify the terminals and apply to the VAN operator in order that the intra-corporation communication of the terminals connected to the LANs can perform the communication via the VAN-1 and VAN-3. The VAN operator responds to the application and sets the aforementioned ICS network address, ICS user address, requested identification, etc. to the conversion tables of the access control apparatuses 110-1 and 110-5 connected to the LAN 100-1 and LAN 100-2, and further writes and holds them in the ICS address administration server 150-1.

The items to be set for the VAN-1 are as follows. The ICS network address is decided by the ICS logic terminal of the access control apparatus 110-1 to which the LAN 100-1 is connected, with the ICS network address of the ICS logic terminal in this case being set as "7711". The intra-corporation communication address of the terminal connected to the LAN 100-1 from which the application was made is set as "0012", and this is used as the sender ICS user address. The intra-corporation communication address used by the terminal of the above address is set as "2212", and this is used as the sender ICS user address. Next, the intra-corporation communication address of the terminal connected to the LAN 100-2 from which the application was made is decided by the ICS logic terminal of the access control apparatus 110-5 to which the LAN 100-2 is connected, in this case the ICS network address being set as "9922", and this is used as the receiving ICS network address. Further, the ICS user address used by the terminal connected to the LAN 100-2 is set as "0034", and this is used as the receiver ICS user address. The number "1" is set as the request identification, indicating the intra-corporation communication service that was applied for, and the above is registered to the conversion table 113-1 in FIG. 16.

The items to be set for the VAN-3 are as follows. Values necessary for reverse communication (communication from the LAN 100-2 to the LAN-1) are set to the conversion table of the access control apparatus 110-5 connecting the LAN 100-2 from which application was made. That is, data is set reverse to the transmitting ICS network address and the receiving ICS network address, and at the same time, data is set reverse to the sender ICS user address and the receiver ICS user address. The ICS network address of the LAN 100-2 is set as "9922", and this is used as the transmitting ICS network address. The address "0034" is set as the sender ICS user address for the intra-corporation ICS user address of the terminal connected to the LAN 100-2, and the ICS user address "0012" of the terminal of the other party is used as the receiver ICS user address. Also, the ICS user address "7711" of the LAN 100-1 is used as the receiving ICS network address and the value "1" is set as the request identification, indicating the intra-corporation communication services. The above is written to the conversion table in the access control apparatus 110-5 and registered.

<<Operation of Intra-corporation Communication>>

The terminal having an ICS user address "0012" sends an ICS user frame P1 to the receiver "0034". This ICS user frame P1 has set as the sender ICS user address "0012", and as the receiver ICS user address has set "0034".

Figure 18:
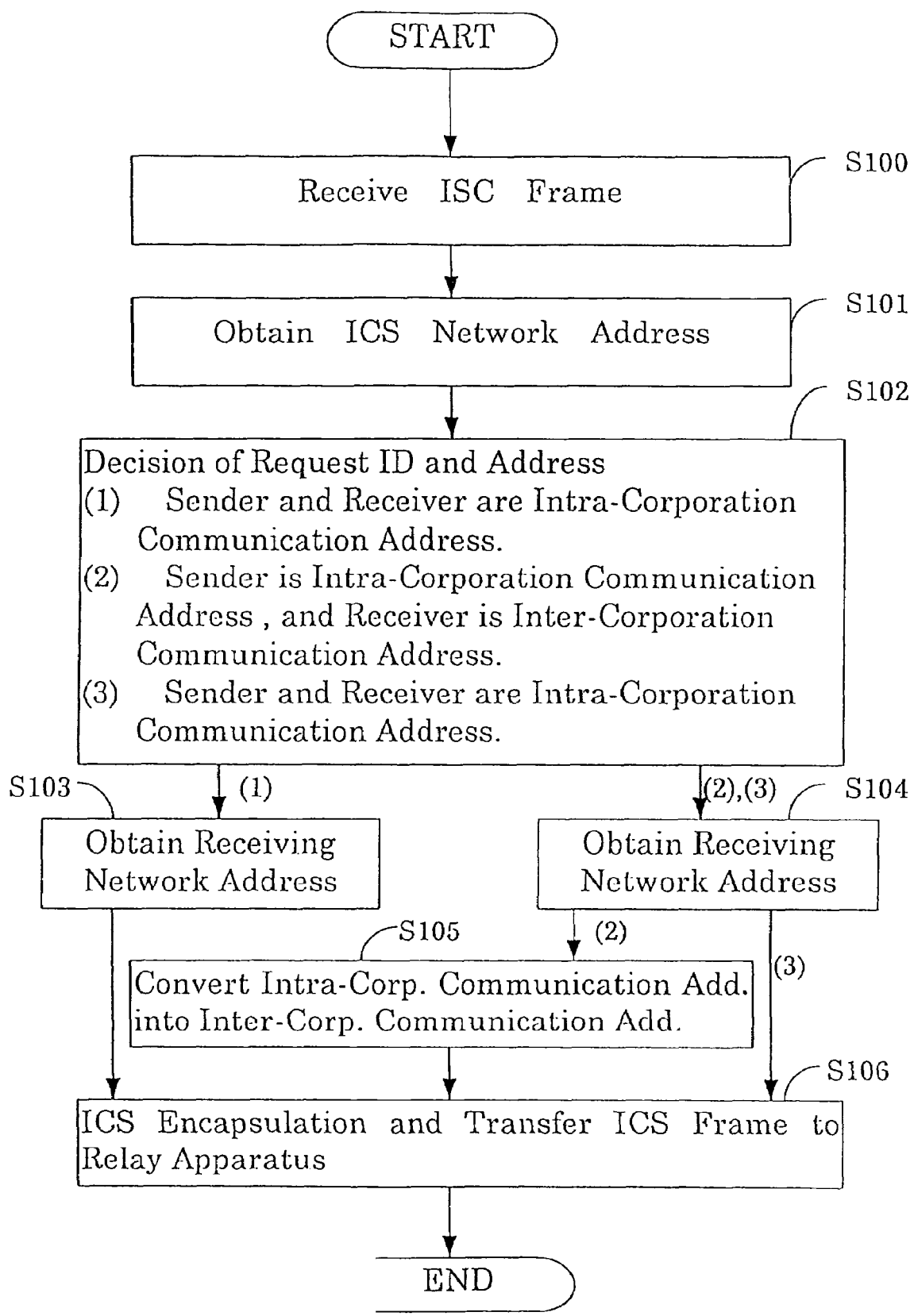
FIG. 18 is a flowchart to show an example of operation of the access control apparatus.

The operation will be explained with reference to FIG. 18. The ICS user frame P1 is sent to the access control apparatus 110-1 via the logic communication line 180-1. The access control apparatus 110-1 refers to the conversion table 113-1 of FIG. 16 from the transmitting ICS network address "7711" (Steps S100 and S101) and the receiver ICS user address "0034" of the received ICS user frame, it knows that the communication is the intra-corporation communication due to the value "1" of the request identification (Step S102). The access control apparatus 110-1 obtains that the receiving ICS network address corresponding to the receiver ICS user address "0034" is "9922", and then it is ICS-encapsulized (Step S106). The above procedures illustrated in a flowchart are as shown in FIG. 18, with the intra-corporation being flow (1) therein. The sender ICS user address may be used to specify the transmitted original of the ICS frame.

The access control apparatus 110-1 sends the ICS network frame P2 to the relay apparatus 120-1 by the ICS encapsulation. Since the network address of the network control field is ensured of its uniqueness within the ICS, there is no conflict with other ICS frames. The ICS network frame P2 passes through the relay apparatus 120-1 and 120-2 based on the receiving ICS network address, and reaches the access control apparatus 110-5 of the VAN-3. The access control apparatus 110-5 removes the network control field from the ICS network frame P4 and performs the ICS reverse encapsulation, and re-creates an ICS user frame P5 which is the same as the ICS user frame P1 from the network data field of the ICS frame, and sends it to the LAN 100-2. The ICS user frame is routed through the LAN 100-2, and is transferred to the terminal which has the ICS user address "0034".

<<Preparation for Inter-corporation Communication>>

As an example of performing the inter-corporation communication, a communication between a terminal which has an ICS user address "0012" and is connected to a LAN 100-1 under the address system ADX, and a terminal which has an ICS user address "1156" and is connected to a LAN 100-3 under the address system ADY, will be described. The users of the LANs 100-1 and 100-3 specify the terminal to the VAN each is connected to so as to be able to perform the communication via VAN-1 and VAN-2, and make application to the VAN operator. The VAN operator sets the necessary items in the conversion table of the access control apparatus which is connected to the LANs 100-1 and 100-3, in accordance with the application.

The items to be set regarding the VAN-1 are as follows. The ICS network address of the LAN 100-1 is made to be "7711", the intra-corporation communication address held by the terminal connected to the LAN 100-1 from which there was application is made to be "0012", and this is made to be the sender ICS user address. The inter-corporation communication address provided to the terminal of the above ICS user address is made to be "2212", and this is made to be the sender ICS user address (inter-corporation). The ICS network address is determined by the ICS logic terminal of the access control apparatus 110-4 connected to the ICS network address of the LAN 100-3 from which there was application, the ICS network address here being "8822", and this is made to be the receiving ICS network address. Also, the ICS user address of a terminal connected to the LAN 100-3 is made to be "1156", and this is made to be the receiver ICS user address. Further, number "2" is set as the request identification, indicating the inter-corporation communication service that was applied for, and the above is registered to the conversion table 113-1.

The items to be set regarding the VAN-2 are as follows. As a conversion table for the access control apparatus 110-4 to which the LAN 100-3 is connected, a temporary conversion table 114-2 which holds reverse data for a certain time, e.g., 24 hours, is set. That is, regarding the ICS network address "8822" to which is connected the LAN 100-3 which uses the inter-corporation communication service, the following are provided within the access control apparatus 110-4: a temporary conversion table 114-2 which includes a transmitting ICS network address, sender ICS user address, receiver ICS user address, receiving ICS network address, request identification and so forth. The setting of the temporary conversion table will be explained hereinafter.

<<Operation of Inter-corporation Communication>>

The terminal having an ICS user address "0012" transmits the ICS user frame F1 in which the sender ICS user address "0012" and the receiver ICS user address "1156" are set. The ICS user frame F1 is transferred to the access control apparatus 110-1 via the user logic communications line 180-1.

The access control apparatus 110-1 refers to the conversion table 113-1 from the transmitting ICS network address "7711" (Steps S100 and S101) and the receiver ICS user address "1156", it knows that the request identification is "2", that is, the communication is the inter-corporation communication (Step S102). Next, the access control apparatus 110-1 obtains that the receiving ICS network address corresponding to the receiver user address "1156" is "8822" (Step S104), and then converts the sender ICS user address "0012" into an inter-corporation communication user address "2212" (Step S105). The access control apparatus 110-1 performs the ICS encapsulation by adding a network control field as the transmitting ICS network address "7711", the sender ICS user address "2212", the receiver ICS user address "1156" and the receiving ICS network address "8822", and sends it to the relay apparatus 120-1 as the ICS network frame F2 (Step S106). The above procedures illustrated in a flowchart are as shown in FIG. 18, with the inter-corporation communication being flow (2) therein.

In the above inter-corporation communication, in the event that the sender ICS user address within the ICS user frame F1 is made to be the inter-corporation communication address "2212", the sender and receiver perform the inter-corporation communication using an inter-corporation communication address (Steps S102 and S104). In this case, the access control apparatus 110-1 does not perform the process of converting the sender ICS user address "2212" into the inter-corporation communication address "2212", as such is not necessary. The above procedures are illustrated in a flowchart shown in FIG. 18, with the inter-corporation communication as flow (3). The sender ICS user address may be used to specify the transmitted original of the ICS frame.

Figure 19:
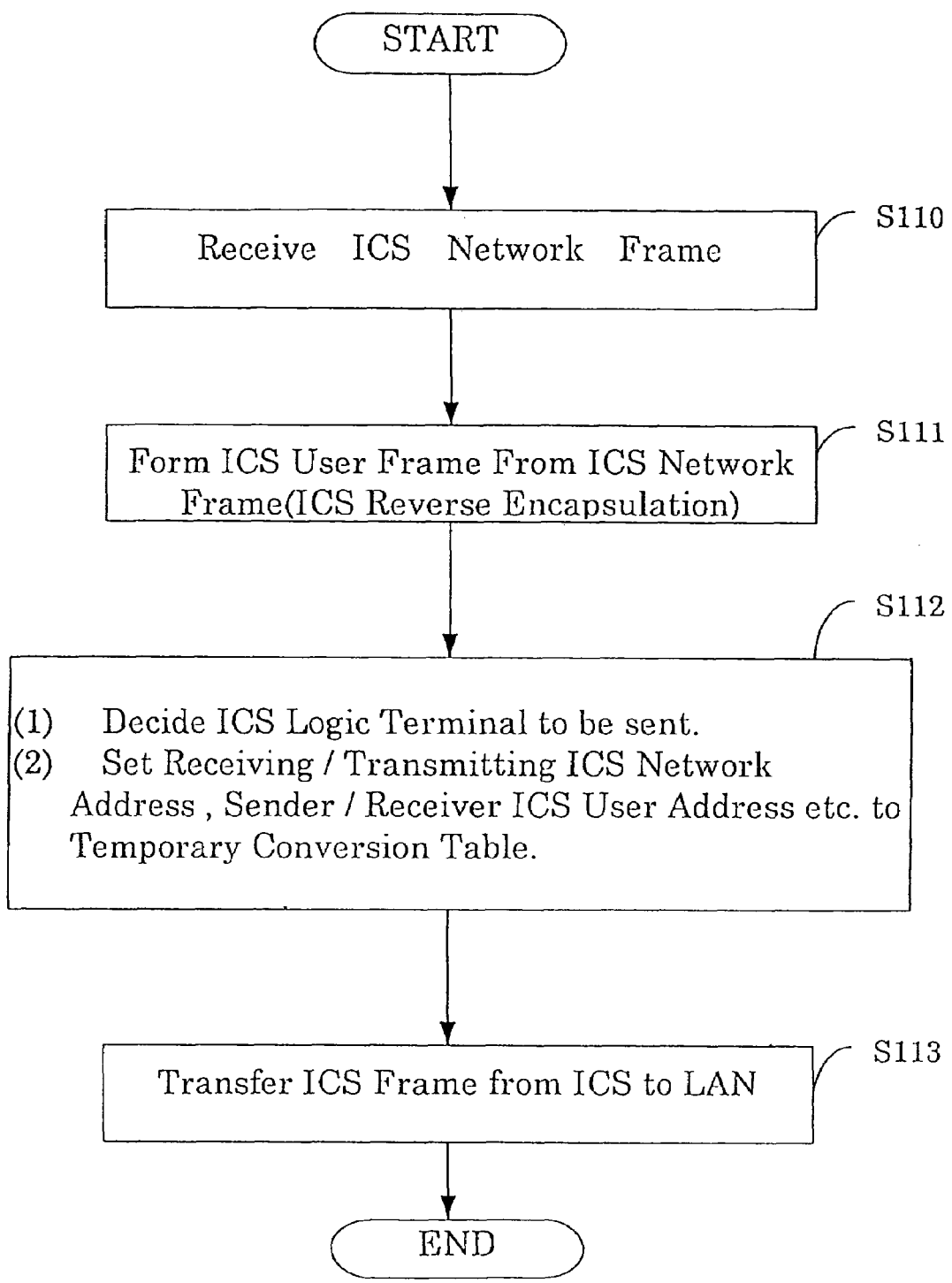
FIG. 19 is a flowchart to show an example of operation of the access control apparatus in inter-corporation communication.

The relay apparatus 120-1 transfers the ICS network frame to the access control apparatus 110-4 within the VAN-2 via the relay apparatus 120-2 within the VAN-1, the inter-VAN gateway 130, and the relay apparatus 120-3 within the VAN-2, based on the receiving ICS network address. It will be described with reference to FIG. 19. The access control apparatus 110-4 receives the ICS network frame (Step S100), forms an ICS user frame F5 from the network data field (Step S111: ICS reverse encapsulation), decides from the receiving ICS network address the ICS logic terminal for sending ((1) in Step S112), and sends to the LAN 100-3 (Step S113). At the same time, in the event that the relation among the transmitting ICS network address "7711", the sender ICS user address "2212", the receiver ICS user address "1156" and the receiving ICS network address "8822" is not registered in the conversion table within the access control apparatus 110-4, a temporary conversion table 114-2 is compiled ((2) in Step S112). The registration contents of the temporary conversion table 114-2 are updated according to a process such as the contents being deleted if there is no usage thereof for 24 hours. The ICS use frame is routed through the LAN 100-3, and is transferred to the terminal having the ICS user address "1156".

In this embodiment, it is not set in the temporary conversion table 114-2. In another embodiment of this, the conversion table 113-1 does not include the sender ICS user address (intra-corporation) and the sender ICS user address (inter-corporation), and further does not contain the flowchart (2) in FIG. 18, i.e., Step S105. A merit of this embodiment is that the register number to the conversion table can be reduced to one of the sender ICS user address if there are the sender ICS user address for one of the receiver ICS user address.

Embodiment-2

Virtual Dedicated Line

Figure 20:
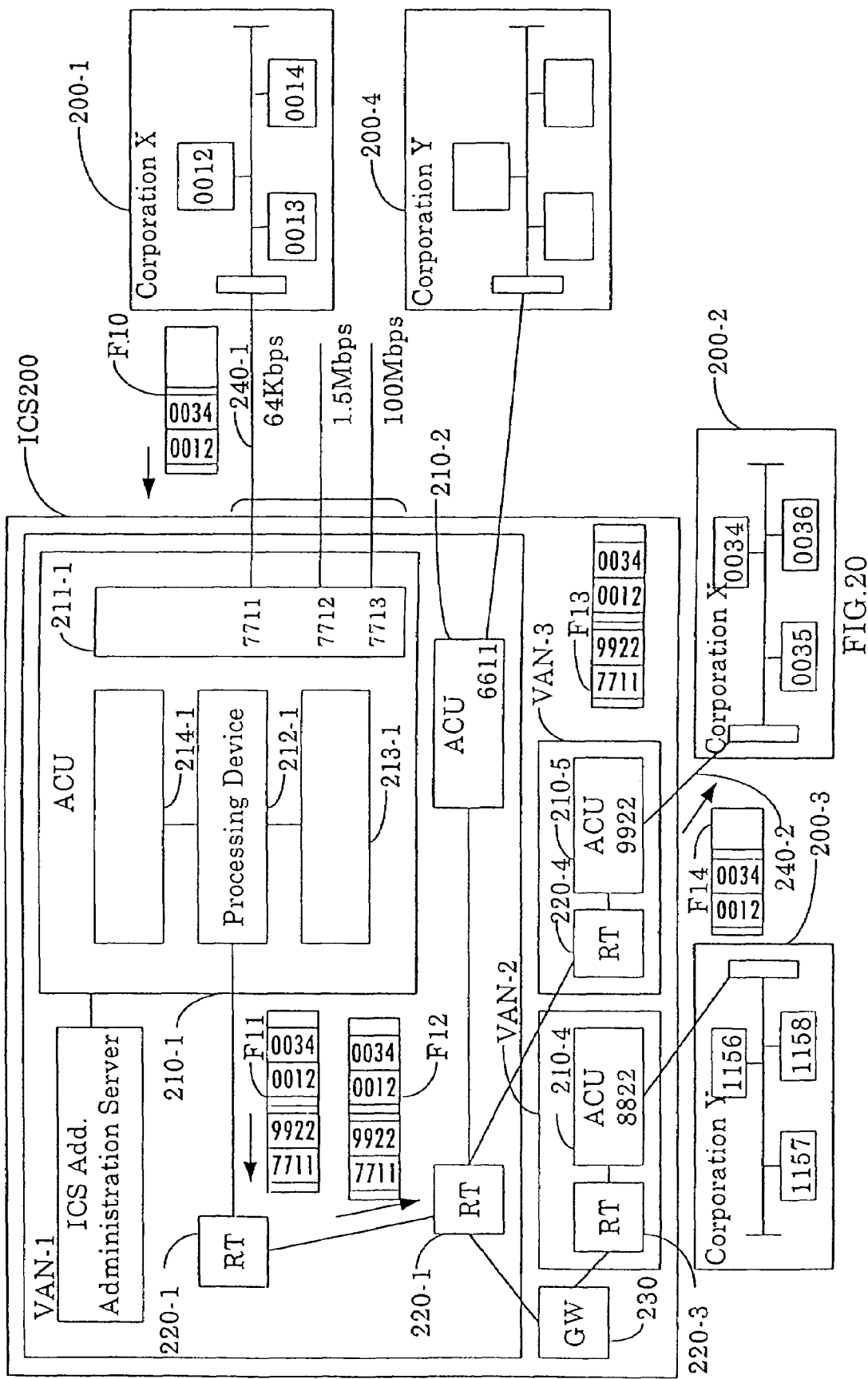
FIG. 20 is a constructional block diagram to show a second embodiment (virtual dedicated line) according to the present invention.

Now, description of the operation of virtual dedicated line connection according to the present invention will be made with reference to FIG. 20. Here, the virtual dedicated line connection refers to communication wherein the ICS user frame is transferred in a fixed manner to a receiving ICS network address already registered in the conversion table, regardless of the ICS user address within the user control field of the ICS user frame, in which the format taken is one-on-one or one-on-N. While the components of FIG. 20 are the same as those of Embodiment-1 shown in FIGS. 14 and 15, what is different is the contents of registration in the conversion table shown in FIG. 21. In the conversion table of the access control apparatus, the receiving ICS network address is determined from the transmitting ICS network address in a fixed manner, so that either the sender ICS user address (intra-corporation), the sender ICS user address (inter-corporation) and the receiver ICS user address are either not registered, or ignored if registered.

Description will now be given regarding a case in which the corporation X uses virtual dedicated line connection, and the communication is conducted between the LAN 200-1 of the corporation X which is connected to the access control apparatus 210-1, and the LAN 200-2 of the corporation X which is connected to the access control apparatus 210-5.

<<Preparation>>

The user applies to the VAN operator for the virtual dedicated line connection. The VAN operator determines the ICS network address "7711" of the ICS logic terminal at the connection point between the access control apparatus 210-1 for connecting the LAN 200-1 of the corporation X and the user logic communications line 240-1, and similarly determines the ICS network address "9922" of the ICS logic terminal at the connection point between the access control apparatus 210-5 for connecting the LAN 200-2 of the corporation X and the user logic communications line 240-2. Next, the VAN operator performs setting to the conversion table 213-1 of the access control apparatus 210-1 of the following: the transmitting ICS network address "7711", the receiving ICS network address "9922" and the request identification. Illustrated in FIG. 21 is an example wherein the request identification "3" has been made to serve as the virtual dedicated line connection. Similarly, the VAN operator performs setting to the conversion table of the access control apparatus 210-5 of the following: the transmitting ICS network address "9922", the receiving ICS network address "7711" and the request identification.

<<Procedures>>

Figure 22:
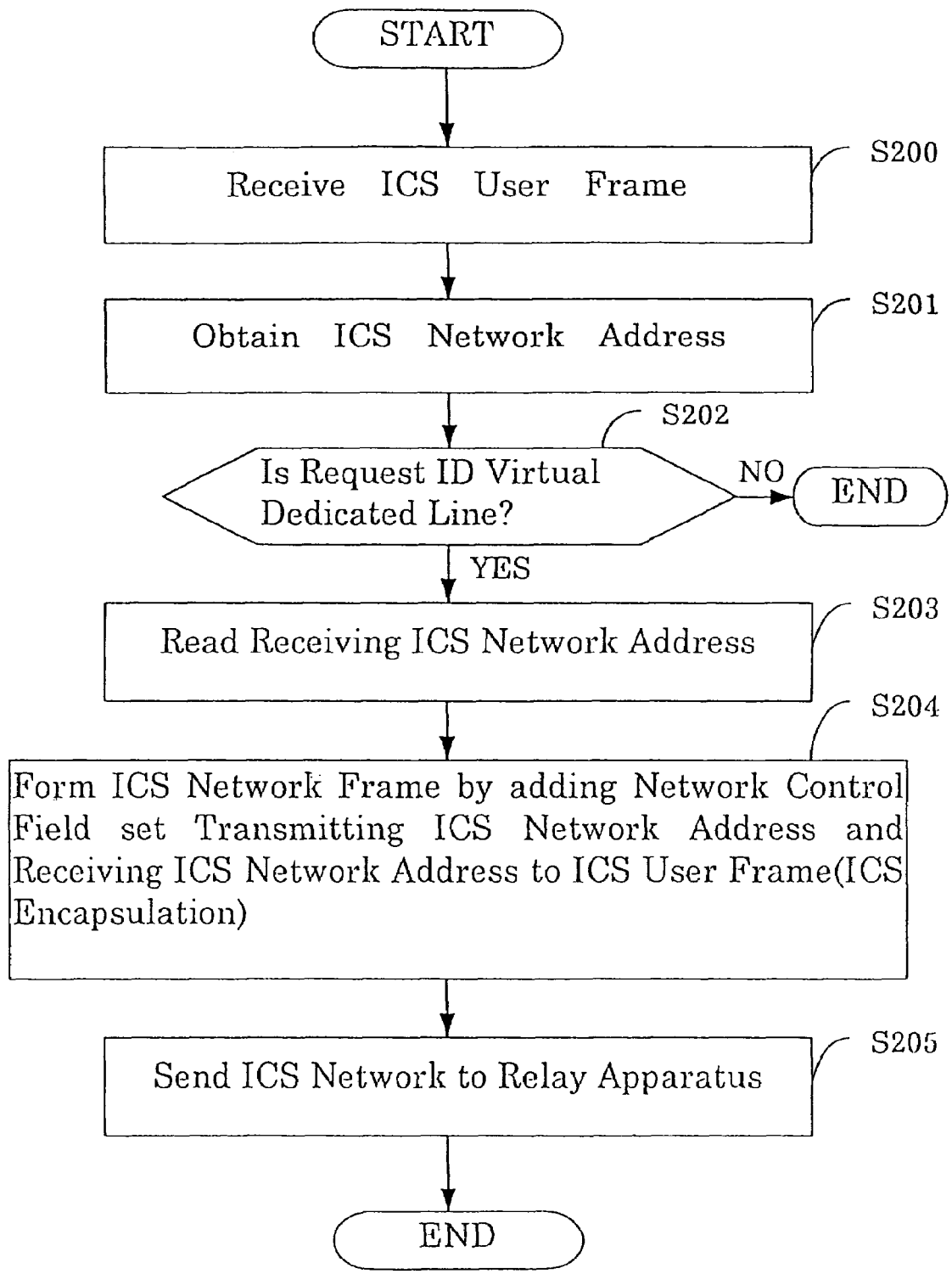
FIG. 22 is a flowchart to show an example of operation of the access control apparatus in virtual dedicated line connection.

The operation will be explained with reference to FIG. 22. The LAN 200-1 of the corporation X sends an ICS user frame F10 to the ICS 200 via the user logic communications line 240-1. The access control apparatus 210-1 receives the ICS user frame F10 from the ICS logic terminal of the ICS network address "7711" (Steps S200 and S201), references to the request identification "3" of the originating ICS network address "7711" in the conversion table 213-1, identifies this as a virtual dedicated line connection (Step S202), and reads the receiving ICS network address "9922" (Step S203). Next, the access control apparatus 210-1 adds a network control field to the ICS user frame F10 in which the receiving ICS network address is set to "9922" and the transmitting ICS network address is set to "7711", thus forming an ICS network frame F11 (Step S204; ICS encapsulation), and sends the frame F11 to the relay apparatus 200-1 (Step S205). The relay apparatus 220-1 which received the ICS network frame F11 determines the destination based on the receiving ICS network address of the ICS network frame F11, and sends an ICS network frame F12 to the relay apparatus 220-2. The ICS network frame F12 is transferred to the access control apparatus 210-5 via the relay apparatus 220-4 within the VAN-3.

The access control apparatus 210-5 removes the network control field from the ICS network frame F13 (ICS reverse encapsulation), and sends the ICS network frame F14 from the ICS logic terminal of the ICS network address "9922" to the user logic communications line 240-2. Then, the LAN 200-2 of the corporation X receives the ICS user frame F14. Transmission can be made in the same say as described from the LAN 200-2 to the LAN 200-1, and thus, interactive communication is available. Since it is clear that the sender and the receiver are not necessary to be the same corporation X, using the same method, an ICS user frame can be transferred from the LAN 200-1 of the corporation X to a LAN 200-3 of another corporation Y.

While the above description has been made with reference to a case of one-on-one, one-on-N communication can also be performed. For example, a plurality of ICS network addresses may be set to the conversion table 213-1 of the access control apparatus 210-1 shown in FIG. 20, as indicated by the transmitting ICS network address "7712". In the present example, two ICS network addresses "6611" and "8822" are set. The access control apparatus 210-1, upon receiving the ICS user frame from the ICS logic terminal with an ICS network address "7712", forms a first ICS network frame wherein an ICS network control field set with "6611" for the receiving ICS network address is added thereto, and a second ICS network frame wherein a network control field set with "8822" for the receiving ICS network address is added thereto, these being sent to the relay apparatus 220-1. Consequently, one-on-two communication can be performed.

Further, one-on-N communication can be performed by transferring each ICS network frame in the same manner as described above.

Embodiment-3

ICS Network Server

Figure 23:
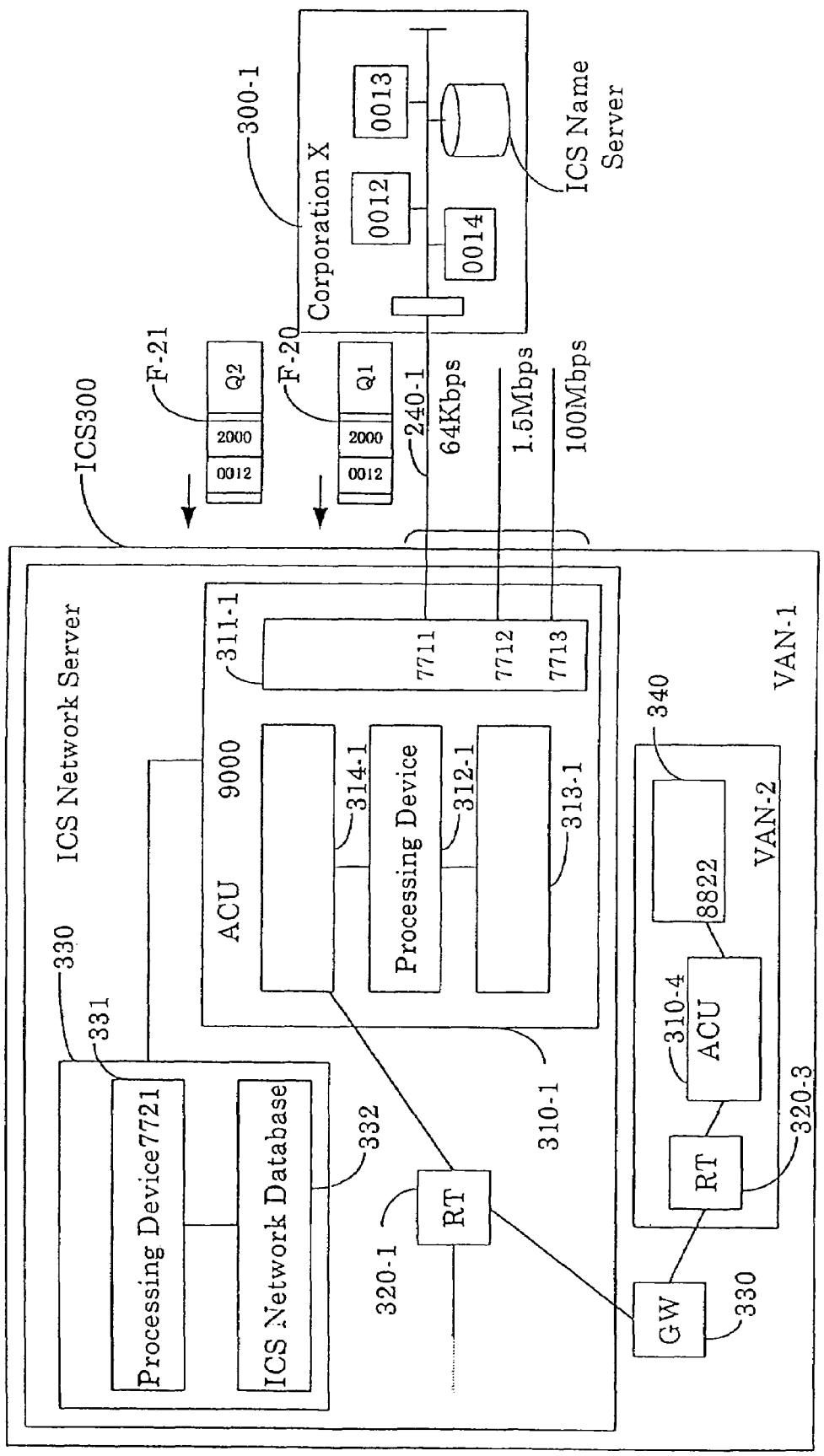
FIG. 23 is a constructional block diagram to show a third embodiment (ICS network server) according to the present invention.

AS shown in FIG. 23, an ICS network server 330 is comprised of a processing device 331 and an ICS network database 332, the data held by the ICS network database 332 comprising: question item, type, contents of answer, and network addresses of other ICS network servers. The ICS network server 330 analyzes the data portion of the ICS frames received from the access control apparatus 310-1, refers to the ICS network database 332 based on this, obtains answer contents corresponding with the question items (in the event that the identification is "1"), and sends the obtained answer to the access control apparatus 310-1. In the event that the ICS network database 332 does not have answer contents corresponding with the question items (in the event that the identification is "2"), questions another ICS network server and obtains the answer contents corresponding with the question items therefrom, using the ICS network server communication function, based on the ICS network address of another ICS network server, and sends the answer obtained thus to the access control apparatus 310-1.

In further detail, the following are registered to the conversion table 313-1 shown in FIG. 24 as preparatory items: the ICS user address "2000" of the ICS network server 330, the ICS network address "7721" and the request identification "4". Here, the request identification "4" indicates that the ICS user address "2000" is a number used in common with other users (called an "ICS special number"), like the telephone number "119" in Japan. Next, it is written to the ICS network database 332 that the type of the question Q1 is "1" and that the answer contents are "A1", that the type of question Q2 is "2", the answer contents field is left blank, and the ICS network address for the other ICS network server 340 is written as "8844".

Figure 26:
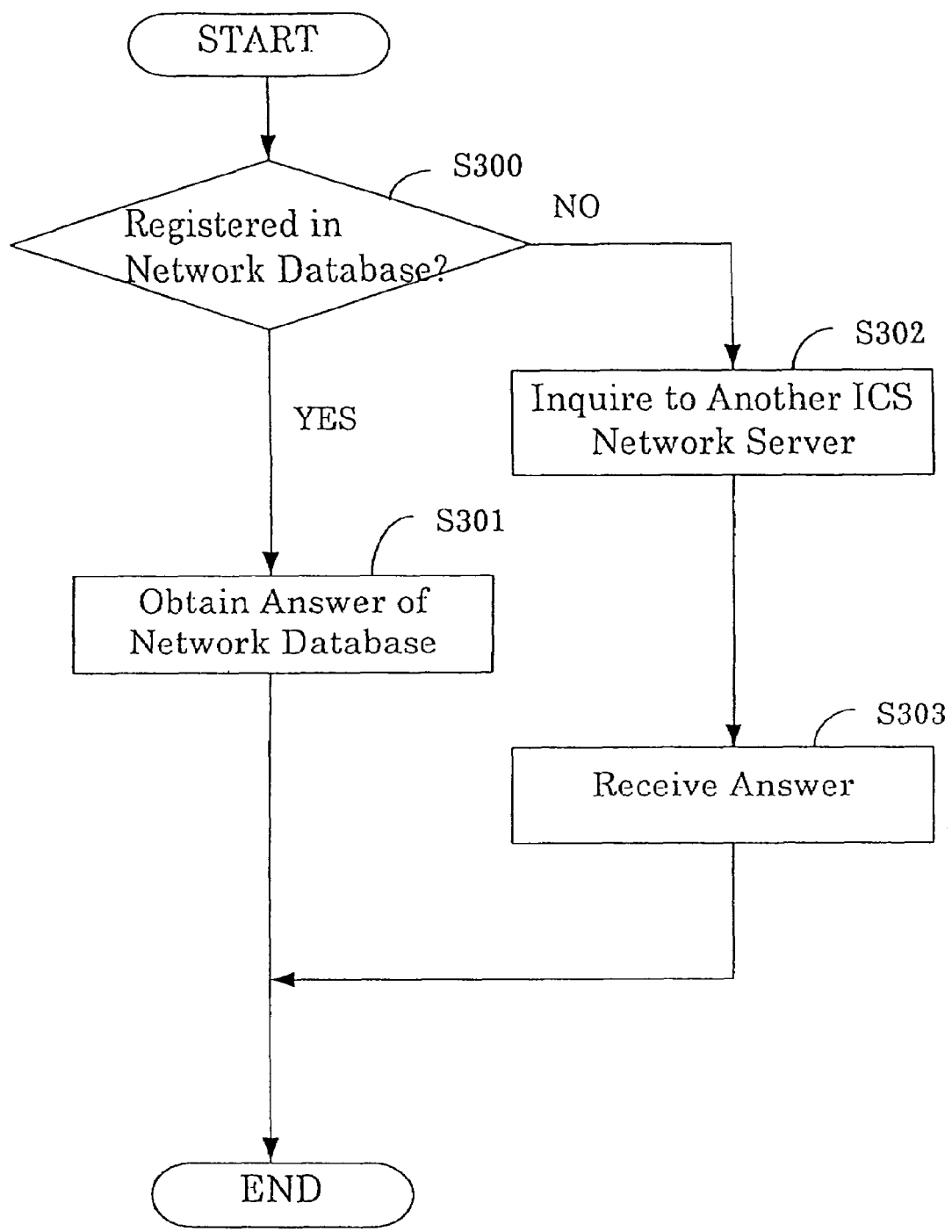
FIG. 26 is a flowchart to show an example of operation within the access control apparatus in virtual ICS network server connection.

Next, the user of the ICS user address "0012" sends an ICS frame F20 (including question Q1) to the ICS user address "2000" of the ICS network database 332. The access control apparatus 310-1 receives the ICS user frame F20 from the ICS logic terminal of the line portion 311-1, obtains the ICS network address "7711", references the conversion table 313-1, and sends an ICS network frame which is ICS encapsulated to the ICS network server 320 as illustrated in the flowchart shown in FIG. 26. The ICS network database 332 finds the answer A1 corresponding to the question Q1 contained in the ICS frame F20 (Step S300 and S301), and returns the answer A1 to the access control apparatus 310-1. The access control apparatus 310-1 sends an ICS frame containing the answer A1 to the ICS user address "0012".

The user of the ICS user address "0012" sends an ICS frame F21 (including question Q2) to the ICS user address "2000". The access control apparatus 310-1 refers to the conversion table 313-1, and upon obtaining the ICS network address "7721", sends an ICS frame comprised of the ICS encapsulated frame F21. The ICS network database 332 recognizes the type "2" corresponding to the question Q2 contained in the ICS frame F21 (Step S300) and knows that the ICS network database 332 itself does not have the answer (A2). Therefore, the ICS network database 332 performs information exchange with another ICS network server 340 using ICS network communication functions, based on the ICS network address "8844" of the ICS network server 340

(Step S302), and returns the answer A2 to the access control apparatus 310-1. The access control apparatus 310-1 sends an ICS frame containing the answer A2 to the ICS user address "0012".

Embodiment-4

ICS Address Administration Server

Figure 27:
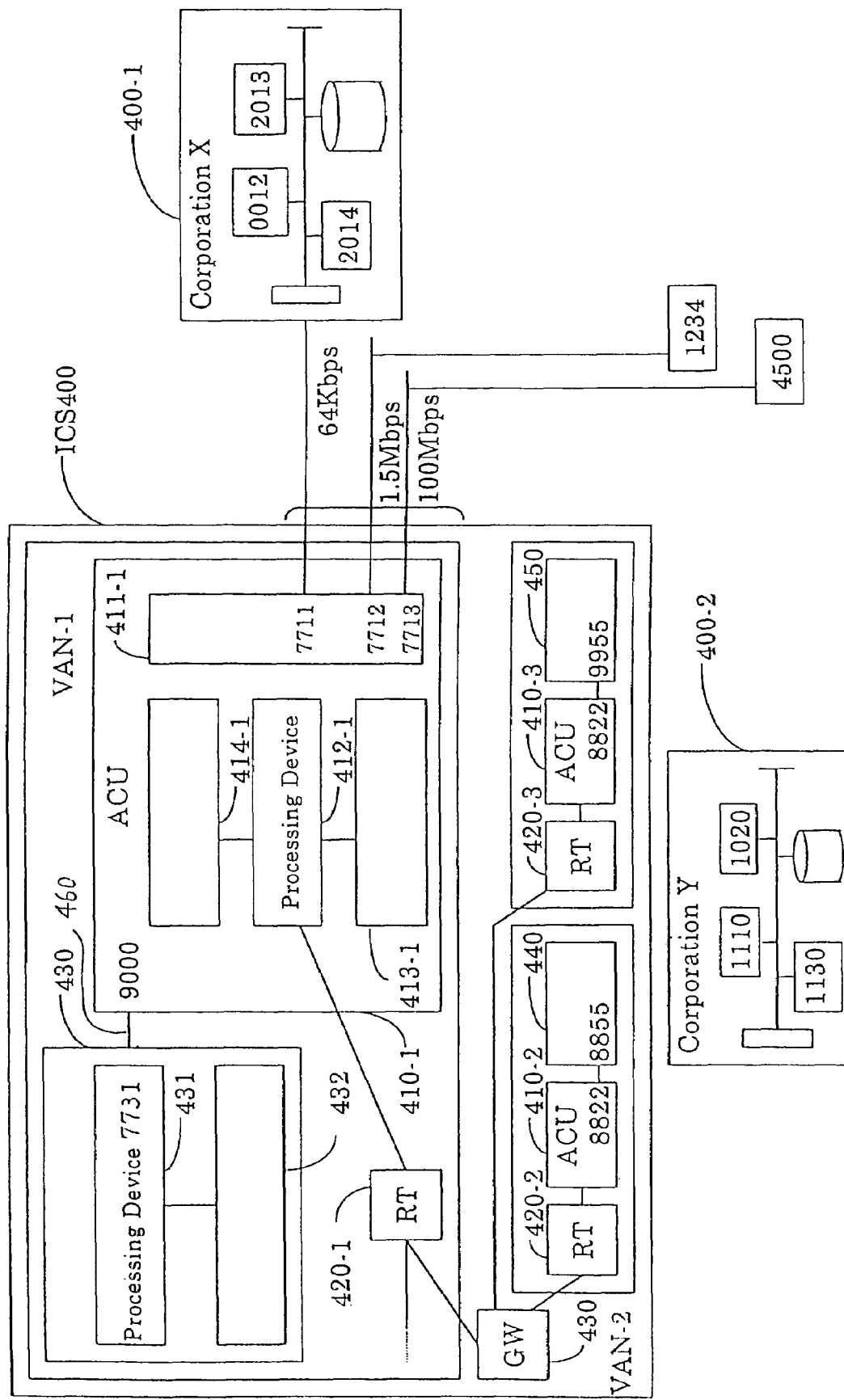
FIG. 27 is a constructional block diagram to show a fourth embodiment (ICS address administration server) according to the present invention.

As shown in FIG. 27, the ICS address administration server 430 is connected with via the access control apparatus 410-1 via the ICS network communication line 460 and holds a correspondence table 432 regarding an ICS network address having an ICS logic terminal at the line portion 411-1 of the access control apparatus 410-1 and the ICS user address corresponding thereto. Examples of the conversion table 413-1 and the correspondence table 432 are respectively shown in FIGS. 28 and 29. That is, the ICS address administration server 430 holds ICS user addresses "2013", "2014", "1234" and "4500", and the corresponding ICS network addresses "7711", "7711", "7712" and "7713". At the same time, all the information to be described in the conversion table, address related information such as records dealing with VAN operation may be included, as well. Further, the ICS address administration server 430 holds the ICS network addresses of a plurality of other ICS address administration servers, and the ICS network addresses of a plurality of ICS name servers. Also, the ICS address administration server 430 is capable of communicating using the ICS name server described in Embodiment-5 and the ICS network server communication function, thus obtaining ICS names corresponding with ICS user addresses.

Figure 30:
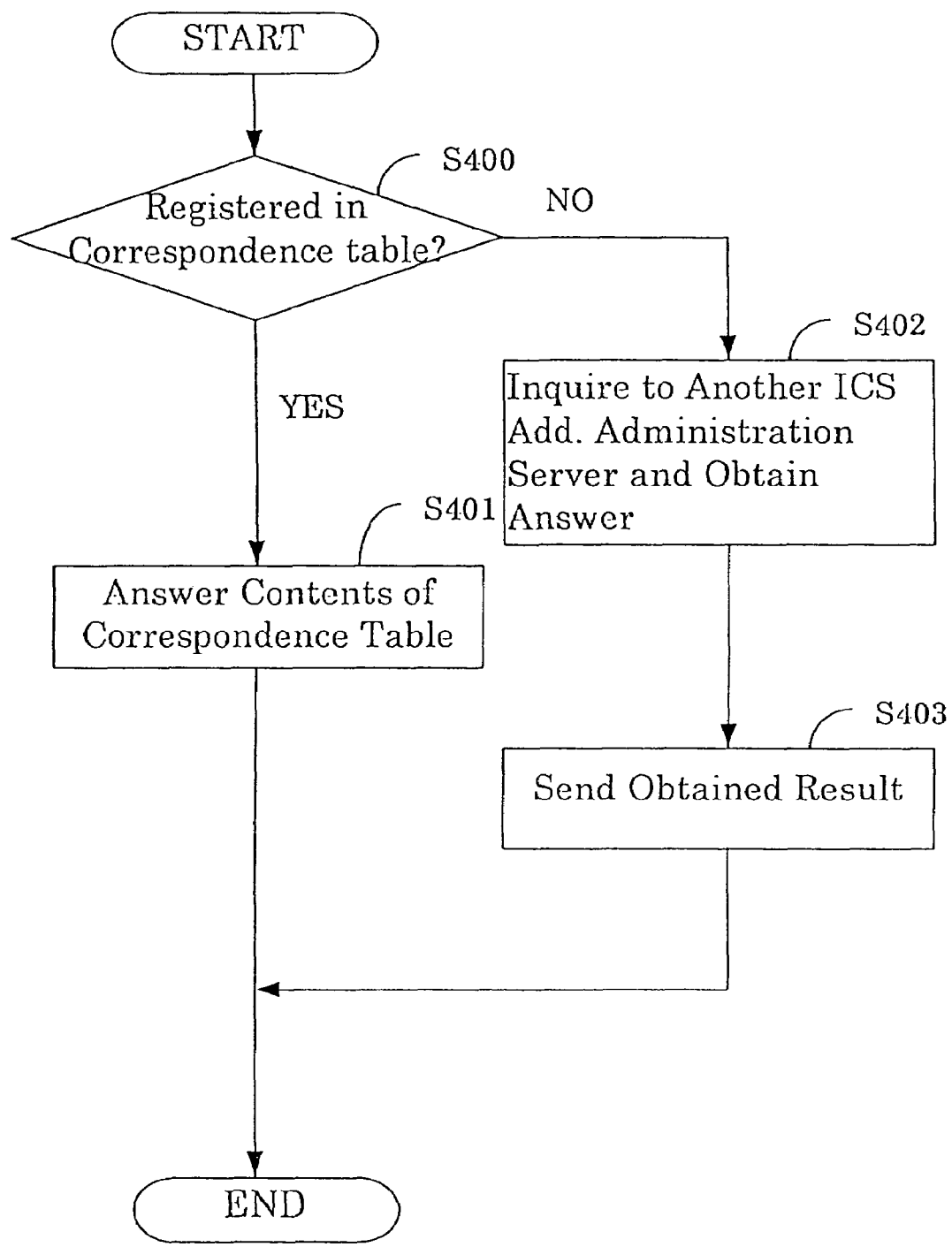
FIG. 30 is a flowchart to show an example of operation of the ICS address administration server.

The processing device 412-1 of the access control apparatus 410-1 can perform the communication with the ICS address administration server 430 using the ICS network server communication function, and disclose the value of the ICS network address and have the corresponding ICS user address, or disclose the value of the ICS user address and have the corresponding ICS network address. The operation will be explained with reference to FIG. 30. The ICS address administration server 430 checks or not whether the ICS network address or the ICS user address questioned from the access control apparatus server 410-1 is registered in its correspondence table 432 (Step S400), and answers a reply if it is registered (Step S401). If the ICS network address or the ICS user address is not registered in the correspondence table, the ICS address administration server 430 communicates with another ICS address administration server 440 using the ICS network server communication function, thus obtaining the ICS user address or the ICS network address (Step S402), the results thereof being replied to the access control apparatus 410-1 (Step S403). According to such a configuration, the access control apparatus 410-1 is able to request of the ICS address administration server 430 and to obtain one of the ICS network address or ICS user address based on the other.

Embodiment-5

ICS Name Server

The ICS user address is problematic in that it is a 32-bit binary expression or 128-bit binary expression for example, and thus is difficult to remember. There is a method wherein an "ICS name" which is easily remembered, is used.

First, description will be made regarding the ICS name. The ICS address expressed in binary form is, as shown in FIG. 11, expressed by e.g., a district administration code, country code, VAN code, VAN district code, VAN access point code, and user logic code, with these numeric values being arrayed to form an expression such as district administration code‖country code‖VAN code‖VAN district code‖VAN access point code‖user logic code. In the ICS name, the district administration code which can be expressed in the binary form as described above, for example, is expressed as follows: AS (an ICS name component which indicates Asia), JP (Japan), VAN#1 (identification of a VAN), DIS#1 (identification of a VAN district code which comprises the VAN#1), ACS#1 (identification of a VAN access point code restricted by the DIS#1), USR#1 (identification of a user logic code). The components of the ICS name thus decided are reversed and separated by dots ".", thus forming the ICS name "USR#1.ACS#1.DIS#1.VAN#1.JP.AS". In the above-described case, this ICS name may be even further divided, so that the USR#1 is divided into USR#10 and COMP#10, and ACS#1 is divided into ACS#11 and ACS#12, thus giving the overall ICS name "USR#10.COMP#10.ACS#11.ACS#12.DIS#1.VAN#1.JP.AS".

Figure 31:
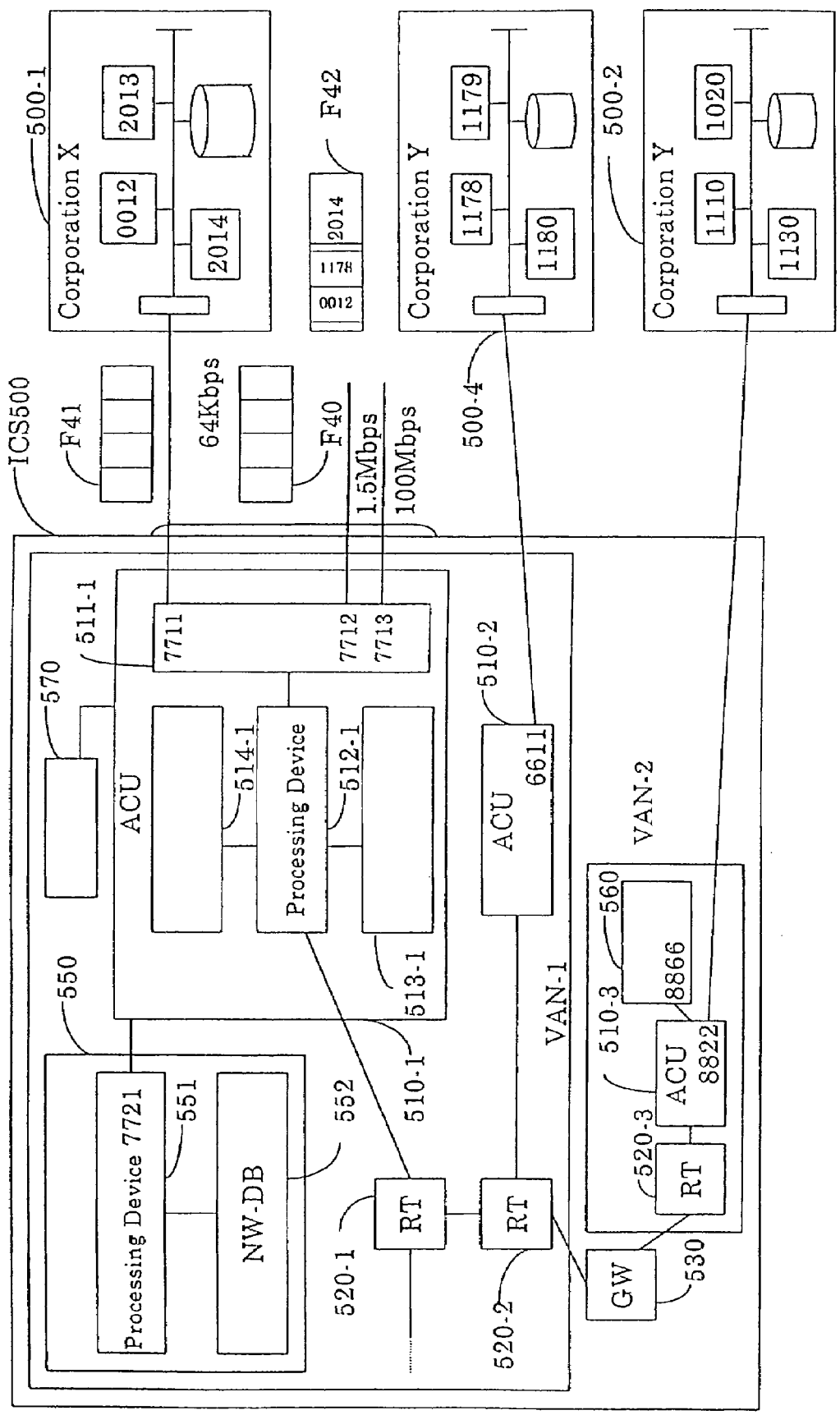
FIG. 31 is a constructional block drawing illustrating a fifth embodiment (ICS name server) according to the present invention.

The ICS name server, which is a type of ICS network server, will now be described. As shown in FIG. 31, the ICS name server 550 is made up of a processing device 551 and an ICS name conversion table 552, with the ICS name conversion table 552 being comprised of e.g., ICS name, type (identification of existence of an ICS user address corresponding to the ICS name), ICS user address and so forth. The type "2" indicates that the ICS network database 332 does not hold an ICS network address corresponding to the ICS name, and thus the ICS network address corresponding to the ICS name is to be obtained from another ICS name server. An example of the conversion table 513-1 is shown in FIG. 32. Here, another ICS name server administrating the ICS name "USR#2.ACS#2.DIS#2.VAN#2.JP.AS" can be called up "DIS#2.VAN#2.JP.AS" with "USR#2" and "ACS#2" removed. The ICS name server 550 analyzes the ICS frame data field received from the access control apparatus 510-1, refers to the ICS name conversion table 552 based on the above analysis, obtains an ICS user address corresponding to the ICS name, and sends it to the access control apparatus 510-1. Further based on the ICS user address, a reply is made regarding the ICS name corresponding thereto. In the event that an ICS user address corresponding thereto does not exist within the ICS name conversion table 552, the ICS network communication function is used to request the questioned ICS user address from another ICS name server which has the ICS user address, and the ICS user address obtained therefrom is sent to the access control apparatus 510-1.

Now, description will be made the method whereby the terminal of the sender ICS user address "0012" connected to the LAN 500-1 obtains an ICS user address corresponding to the ICS name #1 "USR#1.ACS#1.DIS#1.VAN#1.JP.AS". Here, two cases will be described: that wherein the access control apparatus 510-1 obtains data from the ICS name server 550, and that wherein the access control apparatus 510-1 obtains data from another ICS name server 560.

First, in preparation, an ICS network address "7741" corresponding to the ICS user address "1000" of the ICS name server 550, and a request identification "4" thereof are registered in the conversion table 513-1 of the access control apparatus 510-1. Here, the request number "4" indicates that as the ICS user address "1000" is the telephone number "119", it is a special ICS number to be common to another user. The receiver ICS user address "2014" corresponding to the ICS name "USR#1.ACS#1.DIS#1.VAN#1.JP.AS" is registered in the ICS name conversion table 552 of the ICS name server 550. Then, the terminal user of the sender ICS user address "0012" of the LAN 500-1 sends an ICS user frame F40 to the access control apparatus 510-1, and requests a conversion from the ICS name #1"USR#1.ACS#1.DIS#1.VAN#1.JP.AS" to an ICS user address. The processing device 512-1 within the access control apparatus 510-1 receives the ICS user frame F40 from the ICS logic terminal in the line portion 511-1, obtains the ICS network address "7711" and then refers to the conversion table 513-1 based on the receiver ICS user address of the ICS user frame F40. If the corresponding request identification is "4" (connection to an ICS name server of the ICS special number), the processing device 512-1 performs the ICS encapsulation of the ICS user frame F40 by using the obtained ICS network address "7711", and sends an ICS network frame including an ICS name to the ICS name server 550.

Figure 34:
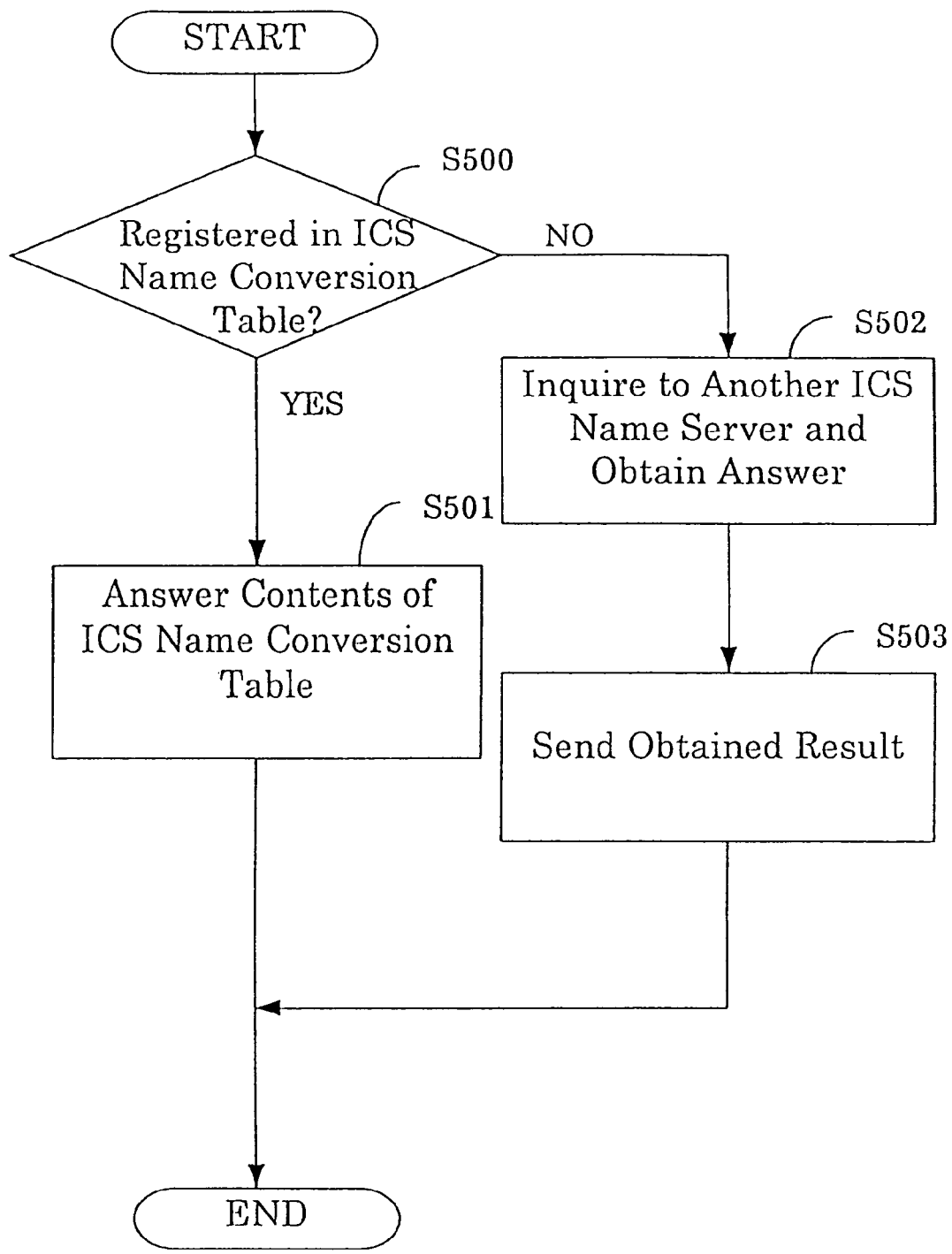
FIG. 34 is a flowchart to show an example of operation of the ICS name server.

As shown in FIG. 34, the ICS name server 550 analyzes the ICS name within the ICS frame received from the access control apparatus 510-1 with the processing device 551, and refers to the ICS name conversion table 552 (Step S500). Then, in the event that an ICS user address corresponding to the ICS name exists within the ICS name conversion table 552, the ICS user address is obtained, and the ICS network frame F45 including the ICS user address "2014" is sent to the access control apparatus 510-1 (Step S501). In the event that the questioned ICS name does not exist within the ICS name conversion table 552, the access control apparatus 512-1 receives an ICS user frame F41 for example, and in the event that the ICS name #2 (i.e., "USR#2.ACS#2.DIS#2.VAN#2.JP.AS") described in the ICS user frame F41 is not described in the ICS name conversion table 552, the ICS name server 550 obtains the ICS network address of another ICS name server from the ICS name conversion table 552 based on the ICS name (i.e., "DIS#2.VAN#2.JP.AS"), and then obtains the ICS user address "1130" corresponding to the questioned ICS name, by means of performing an information exchange by using the ICS name server 560 and the ICS network server communication function (Step S502). The obtained result is sent to the access control apparatus 510-1 (Step S503). The access control apparatus 510-1 exchanges informations with the ICS address administration server 570 based on the receiver ICS user address which is received from the ICS name server 550 and is described in the ICS network frame F45, obtains the ICS network address corresponding to the ICS user address and the address related information contained in the correspondence table, and writes the data comprised of the obtained ICS user address, ICS network address and address-related information, to the conversion table 513-1. The access control apparatus 510-1 sends the ICS user address "2014" (or "1130") obtained from the ICS name server 550 to a terminal user of the sender ICS user address "0012" of the LAN 500-1. The ICS user address "0012" is written in the ICS network frame F45. The terminal user of the sender ICS user address "0012" of the LAN 500-1 obtains the receiver ICS user address "2014" (or "1130") obtained from the access control apparatus 510-1.

Embodiment-6

ICS Name Server

In Embodiment-5, the access control apparatus 510-1 does not write the data such as the obtained ICS user address, the ICS network address and so on to the conversion table 513-1, but rather writes this obtained data to a temporary conversion table 514-1. In this case, the aforementioned address written to this temporary conversion table are deleted after 24 hours, for example.

Embodiment-7

ICS Name Server

In Embodiment-5, the access control apparatus 510-1 does not call up the address administration server 570 and only performs service of telling the obtained ICS user address "2014" (or "1130") to the terminal of the ICS user address "0012".

Embodiment-8

Accounting Server

There are three types of charging systems: the "network charging system" wherein the charging is performed by counting ICS user frames to be sent or received when a communication is made, the "information charging system" wherein the charging is performed by counting the transferred information in the ICS user frame, and the "fixed charging system" wherein no charging is performed regarding the transferred ICS user frames, but a constant amount is charging for a certain period (month, year, etc.) of a time when the registration of the ICS user address or the like continues in the conversion table of the access control apparatus. The information charging system counts and charges by designating the identification which indicates the information charging to the user control field of the ICS user frame. The network charging system and the information charging system are "transmitting account" if the transmitter of the communication bears the charges, and are "receiving account" if the receiver does. Each of the network charging system and the information charging system is called as "charge-by-quantity charging system".

<<Configuration>>

Figure 35:
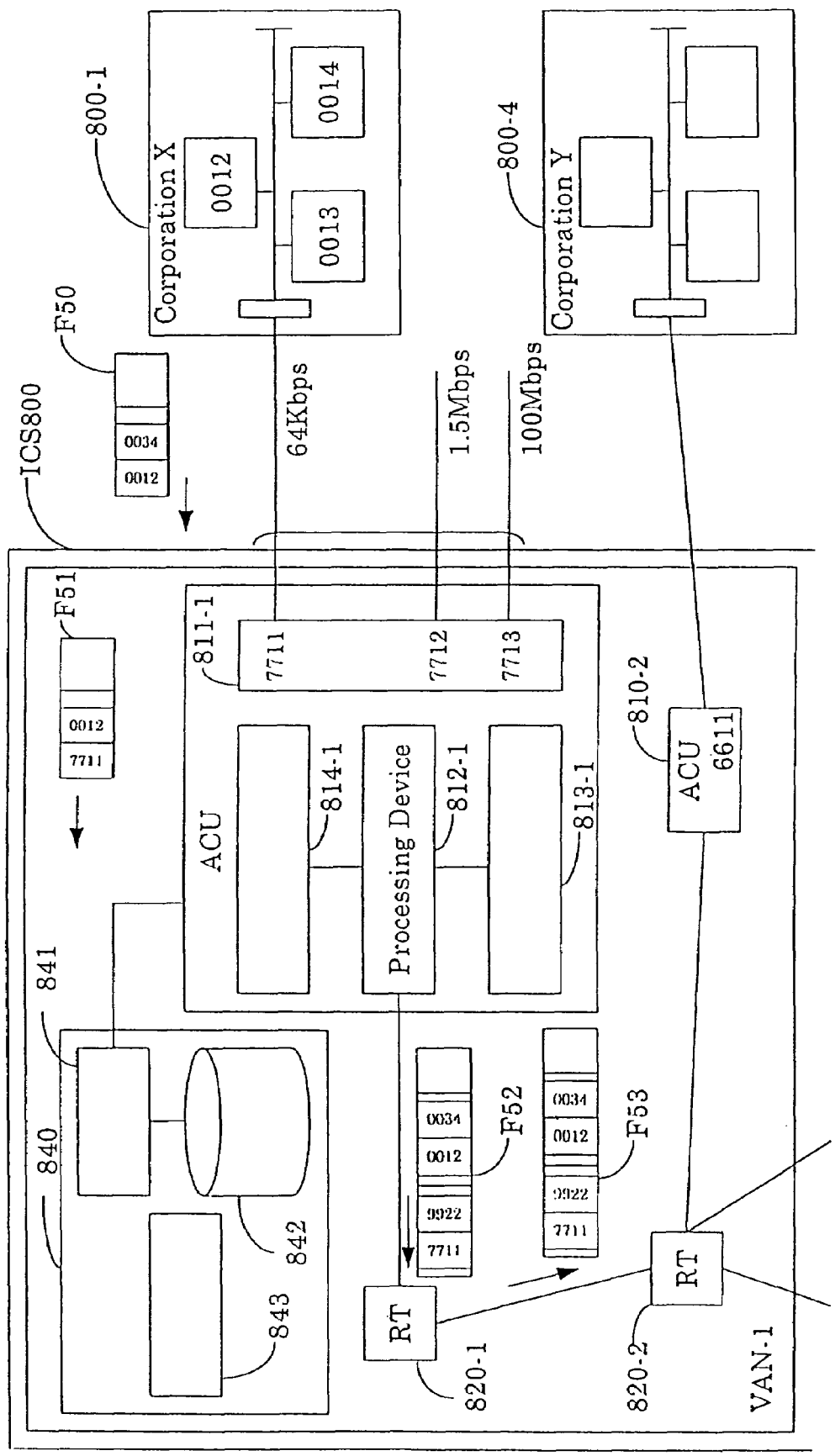
FIG. 35 is a portion of a constructional block drawing illustrating a eighth embodiment (accounting server) according to the present invention.
Figure 36:
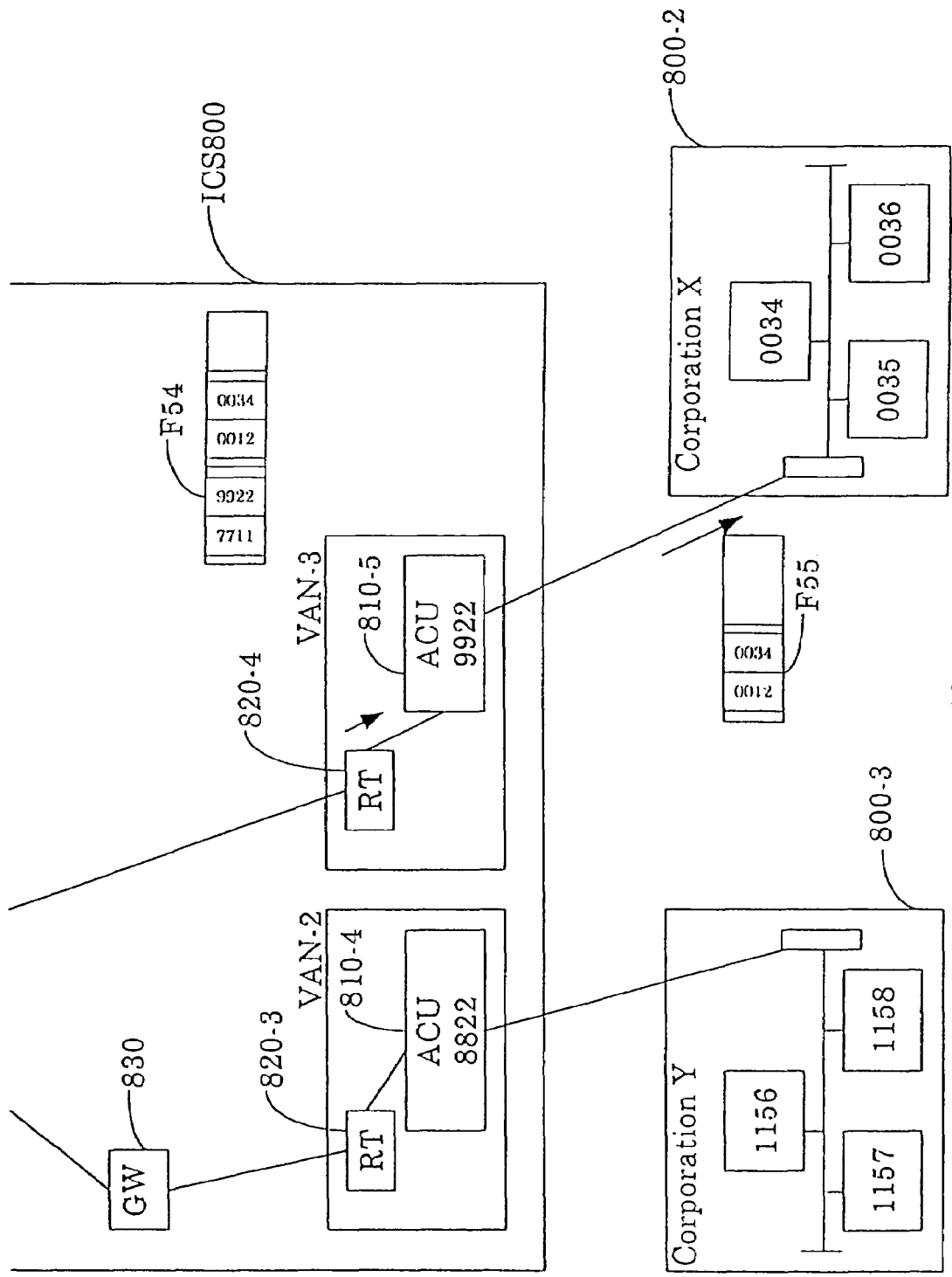
FIG. 36 is a portion of a constructional block diagram to show an eighth embodiment (accounting server) according to the present invention.
Figure 39:
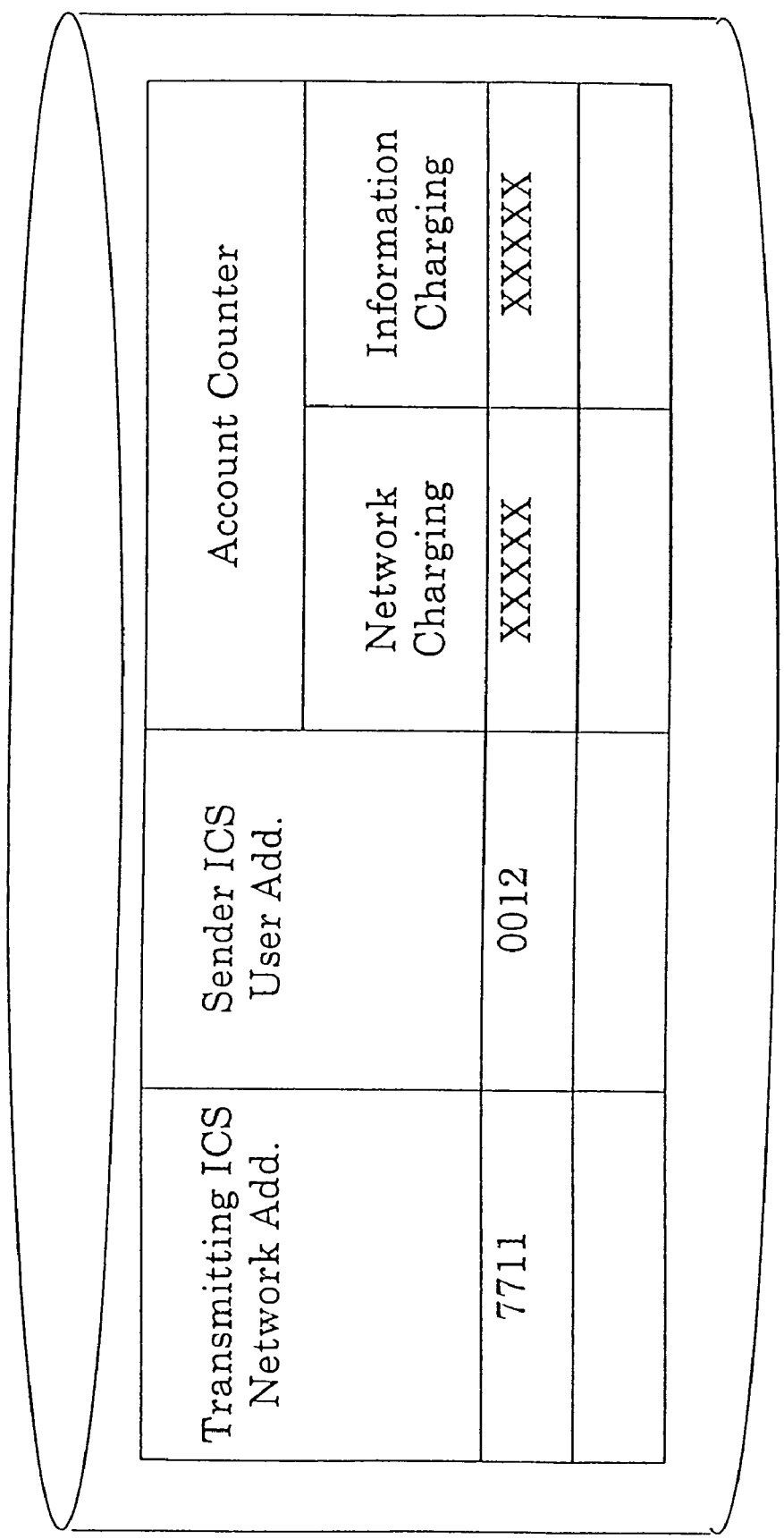
FIG. 39 is a diagram to show an example of the accounting information database in the accounting server.

The charging system in the ICS network according to the present invention will be explained with reference to FIGS. 35 and 36. Each example of the conversion table 813-1, the definition table for fixed charges 843 and the account information database 842 are respectively shown in FIG. 37, FIG. 38 and FIG. 39.

Figure 40:
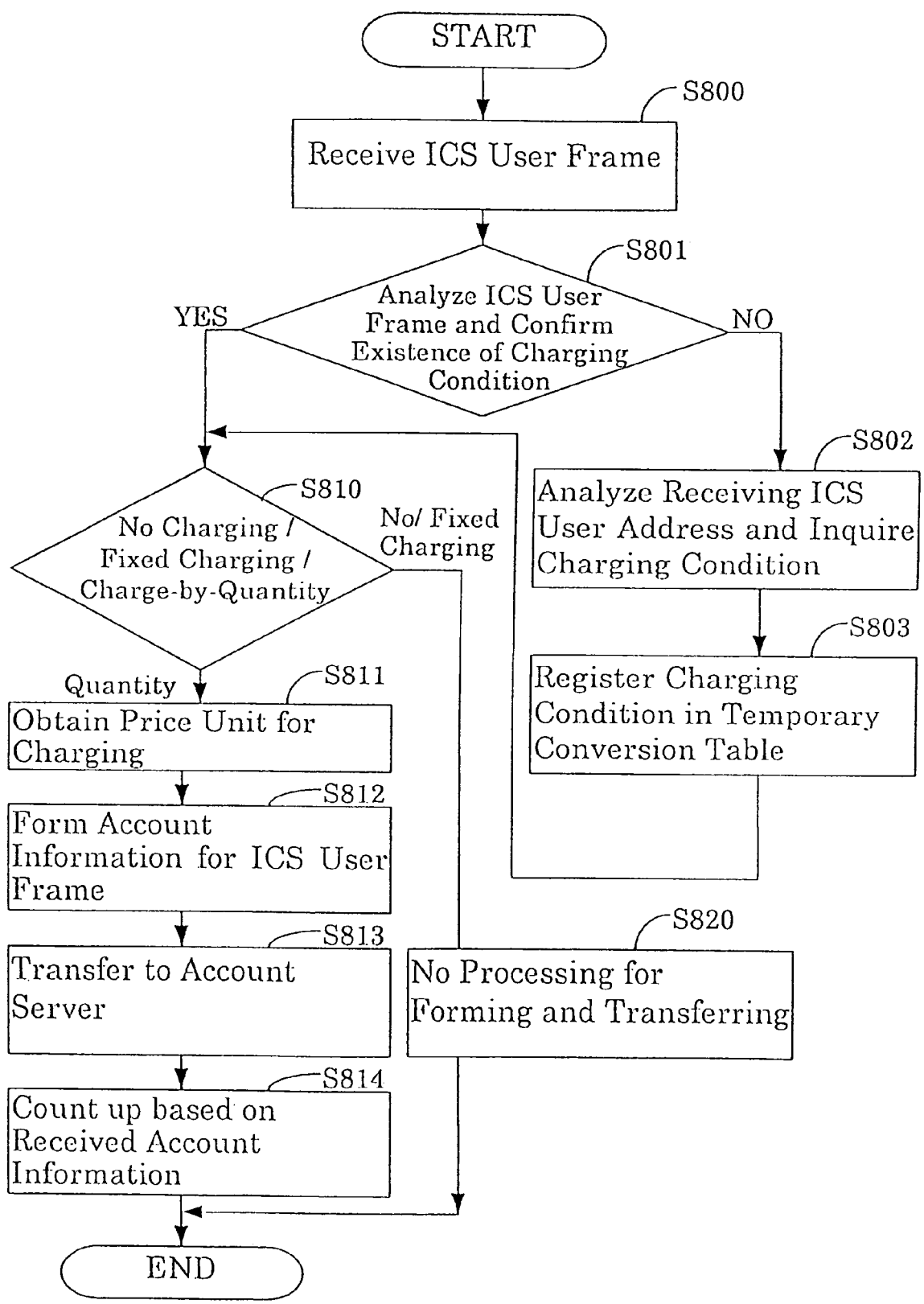
FIG. 40 is a flowchart to show an example of operation of the charging process.

Setting information of the charging system is held in the conversion table 813-1 in the access control apparatus 810-1 and the definition table for fixed charges 843 in the account server 840, and a set value indicating the network charging or the information charging and a set value indicating the charge-by-quantity charging system (identify the transmitting account and the receiving account) or the fixed charging system (identify the transmitting account and the receiving account) are held in the conversion table 813-1. The operation will be explained with reference to FIG. 40. The access control apparatus 810-1 receives the ICS user frame F50 (Step S800), and reads out the type of charging system for each ICS frame held in the conversion table 813-1 us read out based on the ICS user address contained in the ICS user frame F50 and checks up the account condition (Step S801). The access control apparatus 810-1 forms the account information in the event that the read type indicates the charge-by-quantity charging system, and transfers the account information in the form of an account information frame F51 to the account server 840 which is one of the ICS network servers (Step S810). However, in the event that the read type indicates the fixed charging system, no formation of account information not transferring the account information in the form of an account information frame F51 to the account server 840 is performed (Step S820).

The account server 840 receives the account information frame F51 sent from each of the access control apparatuses, and stores the account information contained within the account information frames. There is an account processing device 841 and an account information database 842 within the account server 840, whereby the account processing device 841 receives the accounting information frame F51 sent from the access control apparatus 810-1, analyzes the account information contained within the account information frame F51, and stores the information in the account information database 842. The account information database 842 uses the ICS network address and the ICS user address as identifiers, and stores the account information as a database. Also, in the event that the charging system is the charge-by-quantity charging system, the account information database 842 stores the information regarding the quantity in the form of a count number, which the count number may be set with an upper limit, and in the event that the count exceeds the set upper limit, the account server 840 notifies to the access control apparatus 810-1 that the upper limit has been exceeded, and the access control apparatus 810-1 which receives the notification terminates the communication of the user. The account server 840 is capable of handing the stored account information to other VANs and users using the ICS network server communication function.

(1) Example of Communication with an Arrangement of Network Charging, Transmitting Charging and Charge-By-quantity Charging System:

Description will be made regarding a case wherein the corporation X and the corporation Y perform inter-corporation communication using the ICS 800 according to the present invention. In this case, the charging system for the LANs 800-1 and 800-3 is the charge-by-quantity charging system for the network charging, with the entire bill being borne by the LAN 800-1, and no information charging being conducted.

<<Preparations to Make for Communication>>

The LANs 800-1 and 800-3 are each connected to the respective access control apparatuses 810-1 and 810-4.

<<Preparations to Make for Charging>>

The charging condition for the LANs 800-1 and 800-3 which are to conduct the communication is registered in the conversion table 813-1. The charging conditions are set for registering in the conversion table 813-1 based on the transmitting ICS network address, the receiver ICS user address, the receiving ICS network address, and the receiver ICS user address. A value "1" is set to indicate that network charging is to be conducted by charge-by-quantity charging with transmitting charging. Also, a value "1" is set for the charging unit price. Since the information charging is not to be performed, a value "0" indicating non-charging is set to the charging conditions in the information charging condition of the conversion table 813-1. A value "0" indicating the fixed charging system is set in the conversion table of the access control apparatus 810-4 containing the LAN 800-3, to keep the access control apparatus 810-4 from performing the account processing, since the LAN 800-1 is to be billed.

<<Description of Operation of Charging>>

Regarding the ICS user frame F50 sent from the terminal of the ICS network address "0012" connected to the LAN 800-1, the charging condition fields are specified from the sender ICS user address and the receiver ICS user address in the ICS user frame at the processing device 812-1 within the access control apparatus 810-1 (Steps S800 and S801), and a reference is made to the charging conditions in order to specify the charging system relating to the network charging from the field (Step S810). Since this is "1" indicating that the charging system is the charge-by-quantity charging and that transmitting charging is to be performed, the charging unit price is referred to (Step S811), the charging information is formed (e.g., charging unit price "1" is formed as one unit of charging information) (Step S812), and that charging information is transferred to the account server 840 in the form of an account information frame F51 (Step S813). In the account processing device 841 within the account server 840, the network account counter of the account information database 842 is incremented, according to the charging information within the account information frame F51 received from the access control apparatus 810-1 (Step S814). In the event that the charging conditions is neither in examples described later, the charging described here is performed.

(2) Example of Communication with an Arrangement of Network Charging, Transmitting Charging and Fixed Charging System:

Description will be made regarding a case wherein the corporation X performs the intra-corporation communication using the ICS 800 according to the present invention. In this case, the charging system for the LANs 800-1 and 800-2 is the fixed charging system for the network charging, with the entire bill being borne by the LAN 800-1, and no information charging being conducted.

<<Preparations to Make for Communication>>

The LANs 800-1 and 800-2 are each connected to the respective access control apparatuses 810-1 and 810-5.

<<Preparations to Make for Charging>>

The charging condition for the LANs 800-1 and 800-2 which are to conduct the communication is registered in the conversion table 813-1. The charging conditions are set for registering in the conversion table 813-1 based on the transmitting ICS network address, the sender ICS user address, the receiving ICS network address and the receiver ICS user address. A value "0" is set to indicate that network charging is to be conducted by the fixed charging system, and also, a value "1" indicating the transmitting charging is set to billing bearing of the definition table for fixed charges 843, indicating the party bearing the charges. Since the information charging is not to be performed, a value "0" indicating non-charging is set to the charging conditions in the information charging condition of the conversion table 813-1. A value "0" indicating the fixed charging system is set in the conversion table of the access control apparatus 810-5 containing the LAN 800-2.

<<Description of Operation of Charging>>

Regarding the ICS user frame sent from the terminal of the ICS network address "0012" connected to the LAN 800-1, the charging condition fields are specified from the sender ICS user address and the receiver ICS user address and in the ICS user frame at the processing device 812-1 within the access control apparatus 810-1 (Steps S800 and S801), and a reference is made to the charging conditions in order to specify the charging system relating to the network charging from the field (Step S810). Since this is "0" indicating that the charging system is fixed charging, no charging processing such as forming the charging information is performed (Step S820). The processing for billing is performed with reference to the definition table for fixed charges 843. That is, billing is performed to the LAN 800-1, since the value "0" indicating transmitting charging is set to the definition table for fixed charges 843.

(3) Example of Communication with an Arrangement of Network Charging, Receiving Charging and Charge-By-quantity Charging System:

Description will be made regarding a case wherein the corporation X and the corporation Y perform inter-corporation communication. In this case, the charging system for the LANs 800-1 and 800-3 is the charge-by-quantity charging system for network charging, with the entire bill being borne by the LAN 800-3, and no information charging being conducted.

<<Preparations to Make for Communication>>

The LANs 800-1 and 800-3 are each connected to the respective access control apparatuses 810-1 and 810-4.

<<Preparations to Make for Charging>>

The charging condition for the LANs 800-1 and 800-3 which are to conduct the communication is registered in the conversion table 813-1. The charging conditions are set for registering in the conversion table 813-1 based on the transmitting ICS network address, the sender ICS user address, the receiving ICS network address and the receiver ICS user address. A value "2" is set to indicate that network charging is to be conducted by the charge-by-quantity charging system, and also, a value "1" is set for the charging unit price. Since the information charging is not to be performed, a value "0" indicating non-charging is set to the charging conditions in the information charging condition of the conversion table 813-1. A value "2" indicating the charge-by-quantity charging system and the receiver charging is set to the conversion table of the access control apparatus 810-4 containing the LAN 800-3, since the LAN 800-3 is to be billed.

<<Description of Operation of Charging>>

Regarding the ICS user frame sent from the terminal of the ICS network address "0012" connected to the LAN 800-1, the charging condition fields are specified from the sender ICS user address and the receiver ICS user address in the ICS user frame at the processing device 812-1 within the access control apparatus 810-1 (Steps S800 and S801), and a reference is made to the charging conditions in order to specify the charging system relating to the network charging from the field (Step S810). Since this is "2" indicating that the charging system is charge-by-quantity and that the receiving charging is to be performed, the charging information is formed (e.g., charging unit price "1" is formed as two units of the charging information), and that the account information frame is transferred to the account server 840. In the account processing device 841 within the account server 840, the network account counter of the LAN 800-3 of the account information database 842 is incremented, according to the charging information within the account information frame received from the access control apparatus 810-4.

(4) Example of Communication with an Arrangement of Network Charging, Receiving Charging and Fixed Charging System:

Description will be made regarding a case wherein the corporation X performs intra-corporation. In this case, the charging system for the LANs 800-1 and 800-2 is the fixed charging system for the network charging, with the entire bill being borne by the LAN 800-2, and no information charging being conducted.

<<Preparations to Make for Communication>>

The LANs 800-1 and 800-2 are each connected to the respective access control apparatuses 810-1 and 810-5.

<<Preparations to Make for Charging>>

The charging condition for the LANs 800-1 and 800-2 which are to conduct the communication is registered in the conversion table 813-1. The charging conditions are set for registering in the conversion table 813-1 based on the transmitting ICS network address, the receiver ICS user address, the receiving ICS network address, and the receiver ICS user address. A value "0" is set to indicate that network charging is to be conducted by fixed charging, and also, a value "2" indicating receiving charging is set to billing bearing of the definition table for fixed charges 843, indicating the party bearing the charges. Since the information charging is not to be performed, a value "0" indicating non-charging is set to the charging conditions in the information charging condition of the conversion table 813-1. A value "0" indicating the fixed charging system is set to the conversion table of the access control apparatus 810-5 containing the LAN 800-2.

<<Description of Operation of Charging>>

Regarding the ICS user frame sent from the terminal of the ICS network address "0012" connected to the LAN 800-1, the charging condition fields are specified from the sender ICS user address and the receiver ICS user address in the ICS user frame at the processing device 812-1 within the access control apparatus 810-1 (Steps S800 and S801), and a reference is made to the charging conditions in order to specify the charging system relating to the network charging from the field (Step S810). Since this is "0" indicating that the charging system is fixed charging, no charging processing such as forming charging information is performed (Step S820). The processing for billing is performed with reference to the definition table for fixed charges 843. That is, billing is performed to the LAN 800-2, since a value "2" indicating transmitting billing is set to the definition table for fixed charges 843.

(5) Example of Communication with an Arrangement of Information Charging, Transmitting Charging and Charge-By-quantity Charging System:

Description will be made regarding a case wherein the corporation X and the corporation Y perform the communication. In this case, the charging system for the LANs 800-1 and 800-3 is the information charging, with no network charging being conducted. The entire bill is borne by the LAN 800-1.

<<Preparations to Make for Communication>>

The LANs 800-1 and LAN 800-3 are each connected to the respective access control apparatuses 810-1 and 810-4.

<<Preparations to Make for Charging>>

For the charging conditions for the network charging conditions, a value "0" indicating non-charging is set in the conversion table 813-1, and since charging itself is not performed, there is no setting of the charging unit price. A value "3" is set to indicate that information charging condition is to be conducted by charge-by-quantity charging and transmitting charging. Also, a value "2" is set for the charging unit price.

<<Description of Operation of Charging>>

Regarding the ICS user frame sent from the terminal of the ICS network address "0012" connected to the LAN 800-1, the charging condition fields are specified from the sender ICS user address and the receiver ICS user address in the ICS user frame at the processing device 812-1 within the access control apparatus 810-1 (Steps S800 and S801), and a reference is made to the charging conditions in order to specify the charging system relating to the network communication from the field (Step S810). Since this is "0" indicating non-charging is set, network charging is not performed (Step S820). Next, a reference is made to the charging conditions of the information charging conditions, in order to specify the conditions of charging related to the information charging. In this case, a value "1" is set which indicates charging-by-quantity which is to be borne by the transmitter, so the charging-by-quantity charging is performed. Also, the charging unit price which indicates the weighting of this charging-by-quantity is referred to, which in the case is set at a value of "2". Next, based on the obtained information, the charging information for each ICS user frame is formed (e.g., charging unit price "2" is formed as two units of the charging information), and that the charging information is transferred to the account server 840 in the form of an account information frame F51. The account processing device 841 within the account server 840 which received the charging information specifies the information storage field of the account information database 842 based on the transmitting ICS network address, the sender ICS user address, the receiving ICS network address and the receiver ICS user address from the account information frame F51, and the network account counter is incremented according to the charging information within the account information frame F51.

(6) Example of Communication with an Arrangement of Information Charging, Receiving Charging and Charge-By-quantity Charging System:

Description will be made regarding a case wherein the corporation X and the corporation Y perform the inter-corporation communication. In this case, the charging system for the LANs 800-1 and 800-3 is the charge-by-quantity charging system for the information charging, and no network charging being conducted. The entire bill is borne by the LAN 800-3 which is a receiver.

<<Preparations to Make for Communication>>

The LANs 800-1 and 800-3 are each connected to the respective access control apparatuses 810-1 and 810-4.

<<Preparations to Make for Charging>>

For the charging conditions for network charging conditions, a value "0" indicating non-charging is set in the conversion table 813-1, and since charging itself is not performed, there is no setting of the charging unit price. A value "2" is set to the information charging conditions to indicate that information charging condition is to be conducted by charge-by-quantity charging and transmitting charging. Also, a value "2" is set for the charging unit price.

<<Description of Operation of Charging>>

Regarding the ICS user frame sent from the terminal of the ICS network address "0012" connected to the LAN 800-1, the charging condition fields are specified from the sender ICS user address and the receiver ICS user address and in the ICS user frame at the processing device 812-1 within the access control apparatus 810-1 (Steps S800 and S801), and a reference is made to the charging conditions in order to specify the charging system relating to the network communication from the field (Step S810). Since this is "0" indicating non-charging is set, network charging is not performed (Step S820). Next, a reference is made to the charging conditions of the information charging conditions, in order to specify the conditions of charging related to the information charging. In this case, a value "2" is set which indicates the charging-by-quantity charging which is to be borne by the receiver, so the charging-by-quantity charging is performed. Also, the charging unit price which indicates the weighting of the charging-by-quantity charging is referred to, which in this case is set at a value of "2". Next, based on the obtained information, the charging information for each ICS user frame is formed (e.g., charging unit price "2" is formed as two units of the charging information), and that the charging information is transferred to the account server 840 in the form of an account information frame F51. The account processing device 841 within the account server 840 which received the charging information specifies the information storage field of the account information database 842 based on the transmitting ICS network address, the sender ICS user address, the receiving ICS network address and the receiver ICS user address from the account information frame F51, and the network account counter is incremented according to the charging information within the account information frame F51.

(7) Example of Communication with an Arrangement of Information Charging, Transmitting Charging and Charge-By-quantity Charging System, wherein the Charging Conditions Have not been Registered in a Conversion Table Beforehand:

Description will be made regarding a case wherein the corporation X and the corporation Y perform a communication. The charging conditions for a communication between the LANs 800-1 and 800-3 are the same as described above, but there is a difference in this case in that values for stipulating the charging conditions are not registered in the conversion table 813-1 of the access control apparatus 810-1 connected to the LAN 800-1.

<<Preparations to Make for Communication>>

The LANs 800-1 and 800-4 are each connected to the respective access control apparatuses 810-1 and 810-2.

<<Preparations to Make for Charging>>

In this case, there are no charging conditions registered in the conversion table 813-1, so there is no need to make a preparation in the access control apparatus 810-1 containing the LAN 800-1. The receiving charging conditions for the LAN 800-4 are set in the conversion table in the access control apparatus 810-2 containing the LAN 800-4. A value "0" indicating non-charging is set to the charging conditions in the information charging condition of the conversion table 813-1. Since the charging itself is not performed, there is no setting of the charging unit price. A value "3" is set to the information charging conditions to indicate that the information charging is to be conducted by the charge-by-quantity charging and the transmitting charging. Also, a value "1" is set for the charging unit price.

<<Description of Operation of Charging>>

Regarding the ICS user frame sent from the terminal of the ICS network address "0012" connected to the LAN 800-1, specification of the charging condition fields is attempted using the sender ICS user address, and the receiver ICS user address in the ICS user frame from the conversion table 813-1 at the processing device 812-1 within the access control apparatus 810-1 (Steps S800 and S801), but since there are no fields indicating the pertinent charging conditions in this case, a contact is made with the access control apparatus 810-4 containing the receiver user, based on the receiver ICS user address of the receiver user (Step S802). The access control apparatus 810-4 refers to the charging conditions of the receiver user with the conversion table in the access control apparatus 810-4, and replies of the charging conditions to the access control apparatus 810-1. The charging conditions which the access control apparatus 810-1 has obtained from the access control apparatus 810-4 are registered in a temporary conversion table 814-1 (Step S803). Subsequently, a reference is made in the processing device 812-1 to the charging conditions in order to specify the charging conditions relating to the network communication from the charging conditions. Since this is "0" indicating non-charging is set, network charging is not performed (Step S820). Next, a reference is made to the charging conditions of the information charging conditions, in order to specify the conditions of charging related to the information charging. In this case, a value "1" is set which indicates charging-by-quantity which is to be borne by the transmitter, so the charging-by-quantity charging is performed. Also, the charging unit price which indicates the weighting of the charging-by-quantity charging is referred to, which in this case is set at a value of "1", and thus the weighting of this charging is known. Next, based on the obtained information, the charging information for each ICS user frame is formed (e.g., charging unit price "1" is formed as one unit of the charging information), and that the charging information is transferred to the account server 840 in the form of an account information frame F51. The account processing device 841 within the account server 840 which received the charging information specifies the information storage field of the account information database 842 based on the transmitting ICS network address and the receiver ICS user address from the account information frame F51, and the network account counter is incremented according to the account information within the account information frame F51.

Embodiment-9

ICS Frame Database Server

Figure 41:
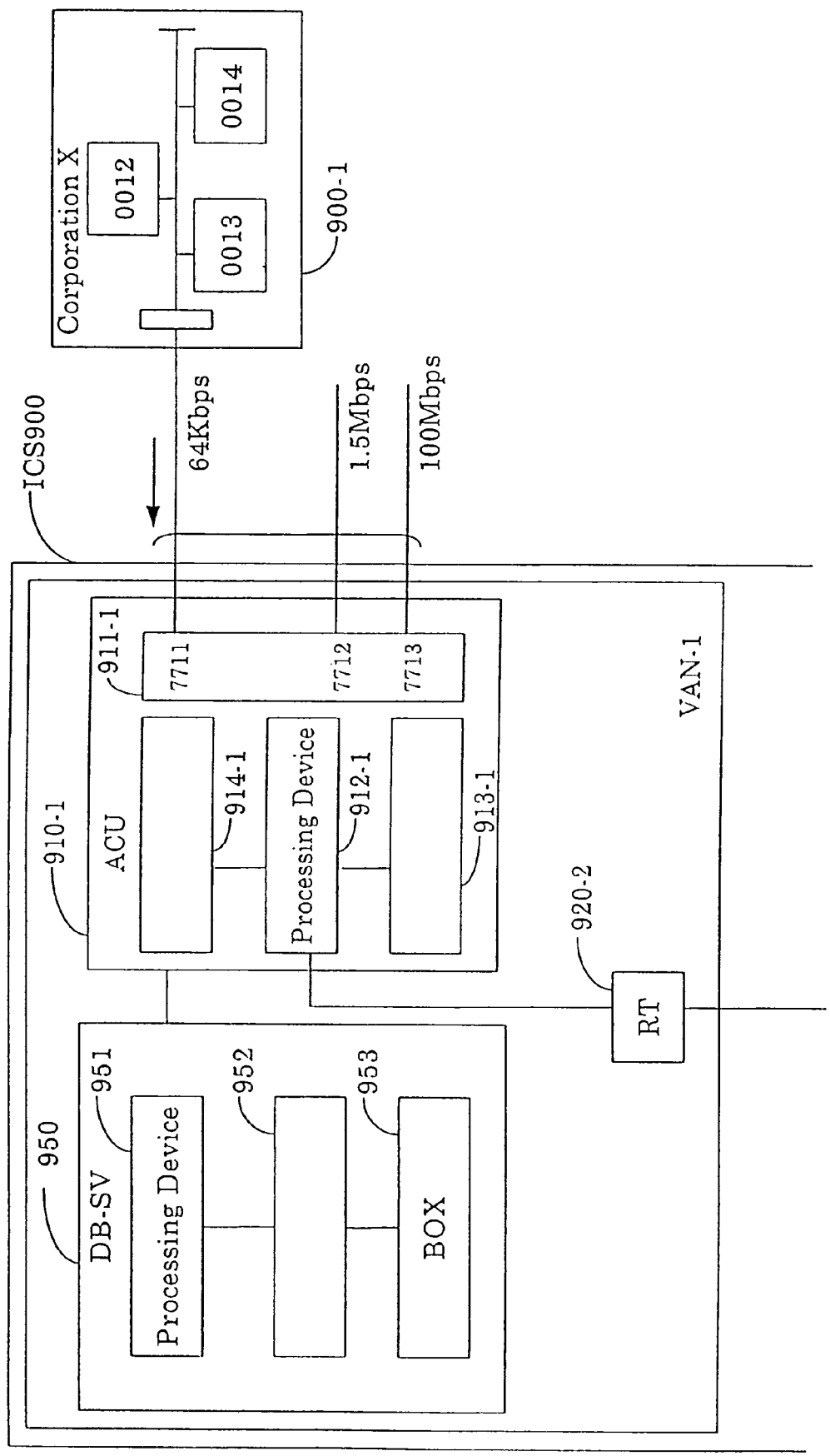
FIG. 41 is a portion of a constructional block diagram to show a ninth embodiment (ICS frame database server) according to the present invention.
Figure 42:
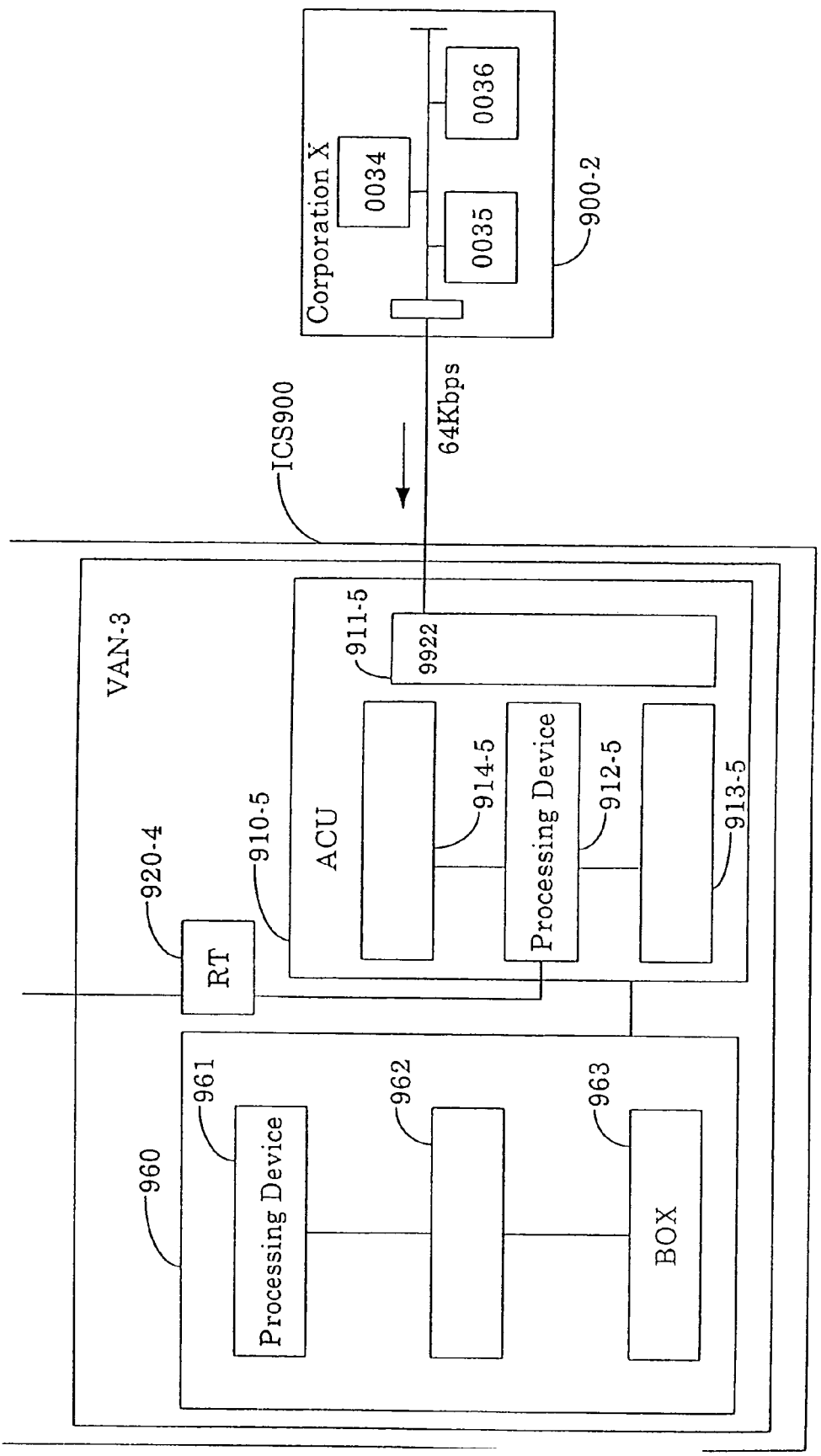
FIG. 42 is a portion of a constructional block diagram to show a ninth embodiment (ICS frame database server) according to the present invention.
Figure 43:
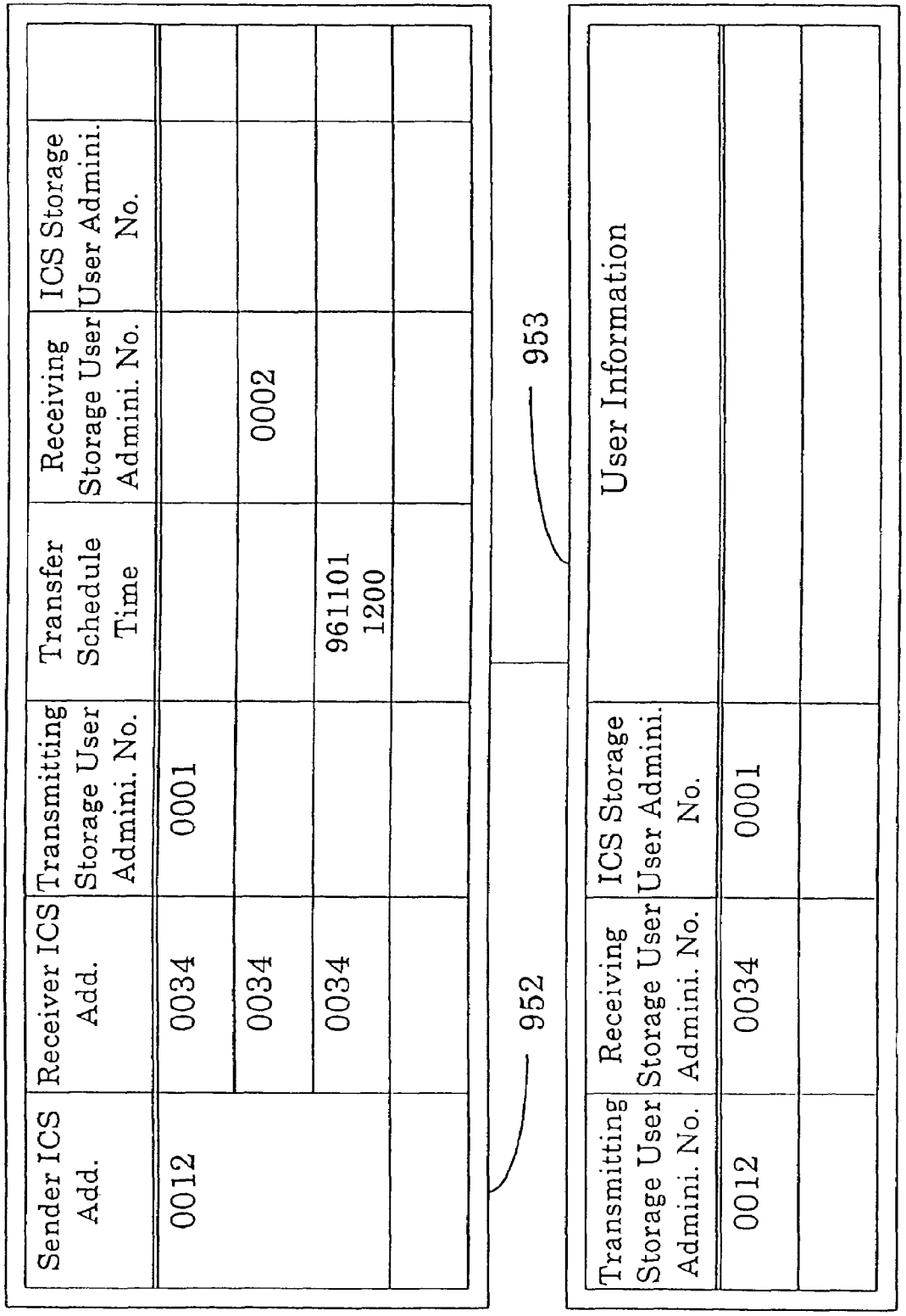
FIG. 43 is a diagram to show an example of the stored information administration table and the Box in the ICS frame database server.
Figure 44:
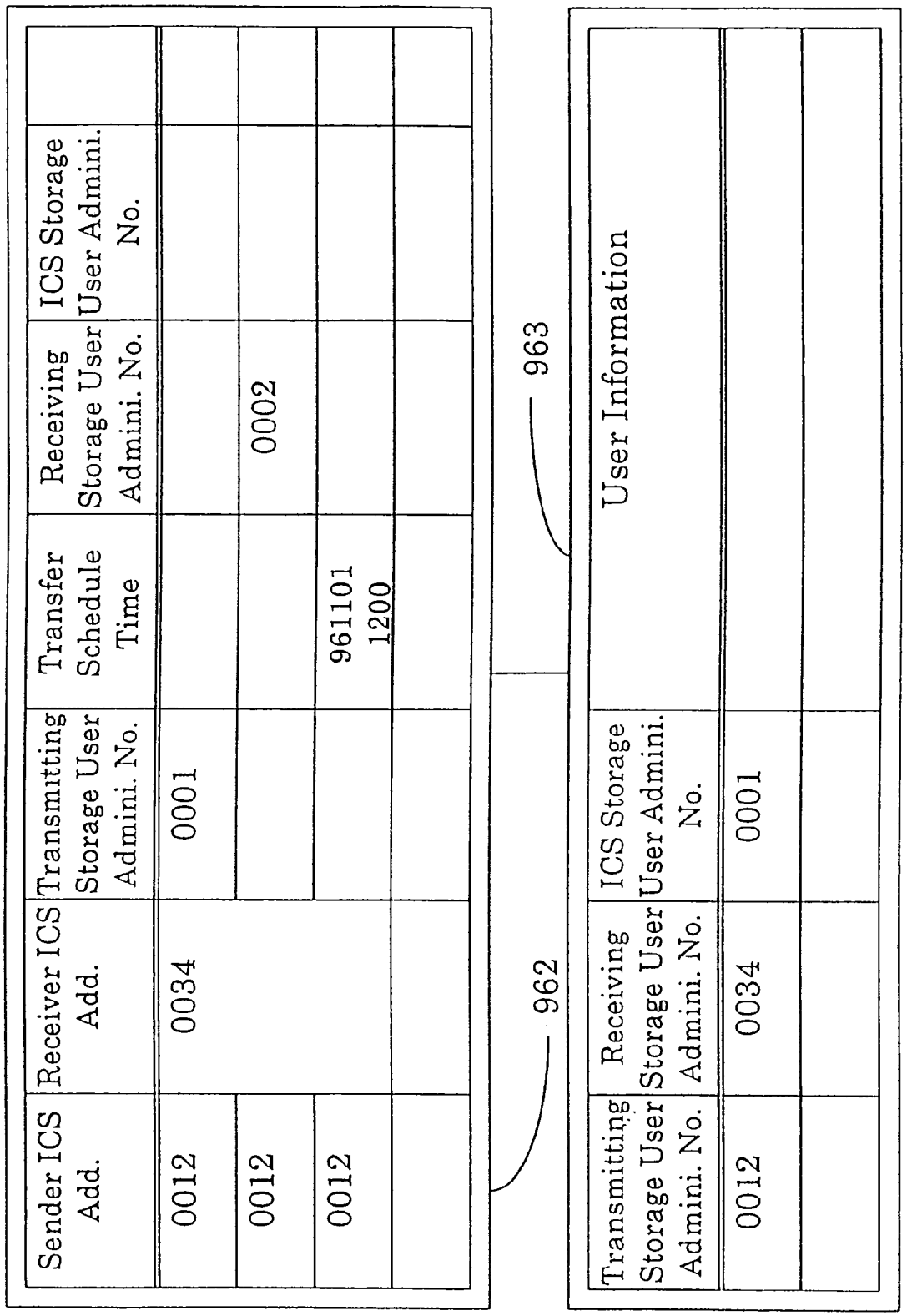
FIG. 44 is a diagram to show an example of the stored information administration table and the Box in the ICS frame database server.

FIGS. 41 and 42 show an example of an ICS 900 which includes ICS frame database servers 950 and 960 which are a type of ICS network servers. The ICS frame database servers 950 and 960 store data based on requested timing from the side of the terminals (hereafter referred to as "ICS-using terminal") using the ICS 900, or removes the stored data and sends the data to the requester. The ICS frame database servers 950 and 960 are respectively comprised of processing devices 951 and 961, storage information administration tables 952 and 962, and BOXs 953 and 963. Examples of storage information administration tables 952 and BOX 953, and storage information administration tables 962 and BOX 963 are respectively shown in FIGS. 43 and 44.

The processing devices 951 and 961 receive ICS user frames from the ICS-using terminals, refer to the usage requests of ICS frame database servers explicitly indicated by the ICS-using terminals, perform storage commanding of the ICS user frames to the storage information administration tables 952 and 962, and perform storage instruction of information to the BOXs 953 and 963. The storage information administration tables 952 and 962, upon receiving the instruction from the processing devices 951 and 961, store items regarding which administration is necessary for each separate ICS-using terminal, such as the index number of stored information. The BOXs 953 and 963, upon receiving the instruction from the processing devices 951 and 961, store administration number of stored information for each separate ICS-using terminal, user information and so forth. The following is a description of the preparatory items for using ICS frame database servers 950 and 960 and examples of communication therewith.

<<Preparatory Items>>

Figure 45:
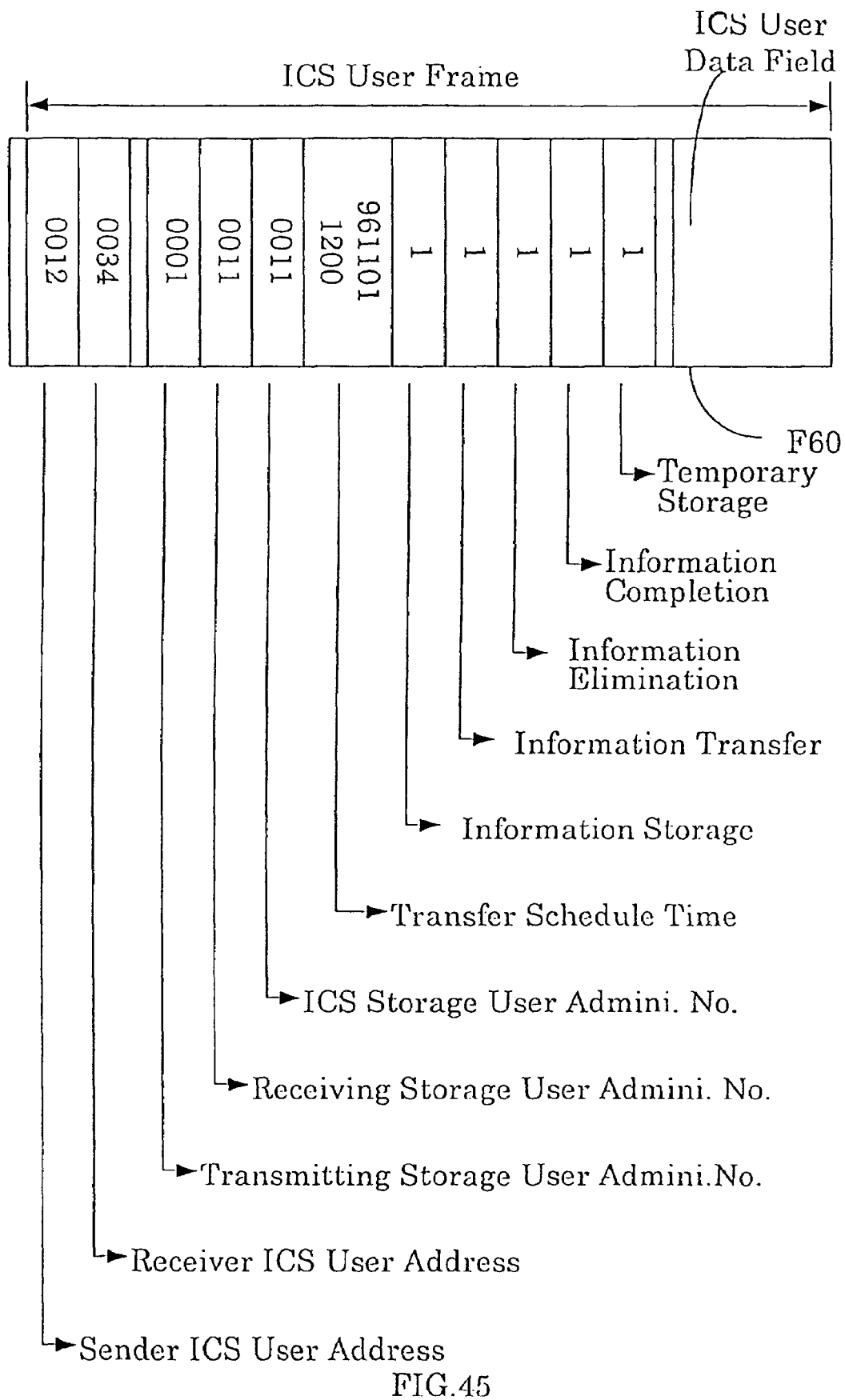
FIG. 45 is a diagram illustrating an example of an ICS user frame used by the ICS frame database server.

The operator of the VAN-1 registers the information (in the present embodiment, ICS user address "0012", etc.) regarding the user in the storage information administration table 952 and the BOX 953 beforehand, so that the storage of information can be performed for a terminal having the ICS user address "0012", being connected to the LAN 900-1 of the corporation X. Also, in the same way, the operator of the VAN-3 registers the information (in the present embodiment, ICS user address "0034", etc.) regarding the user in the storage information administration table 962 and the BOX 963 beforehand, so that the storage of information can be performed for a terminal having the ICS user address "0034", being connected to the LAN 900-2 of the corporation X. The ICS-using user sends an ICS user frame F60 as shown in FIG. 45 to the ICS 900. This ICS user frame F60 is provided with the following to the user control field thereof: a usage request identifier (an identifier which explicitly indicates using the ICS frame database server) for using the ICS frame database server, and an information operating identifier (an identifier which explicitly indicates operation of information stored in the ICS frame database server). Incidentally, although the description of the present embodiment involves the user attaching the usage request identifier and the information operating identifier to the user control field of the ICS user frame F60, thus achieving the usage request of the ICS frame database server by the user, but the usage request identifier and the information operation identifier may be attached to the ICS user data field, instead.

EXAMPLES OF COMMUNICATION (1) Communication Example-1

Operation of the ICS Frame Database Server on the Sending Side

Figure 46:
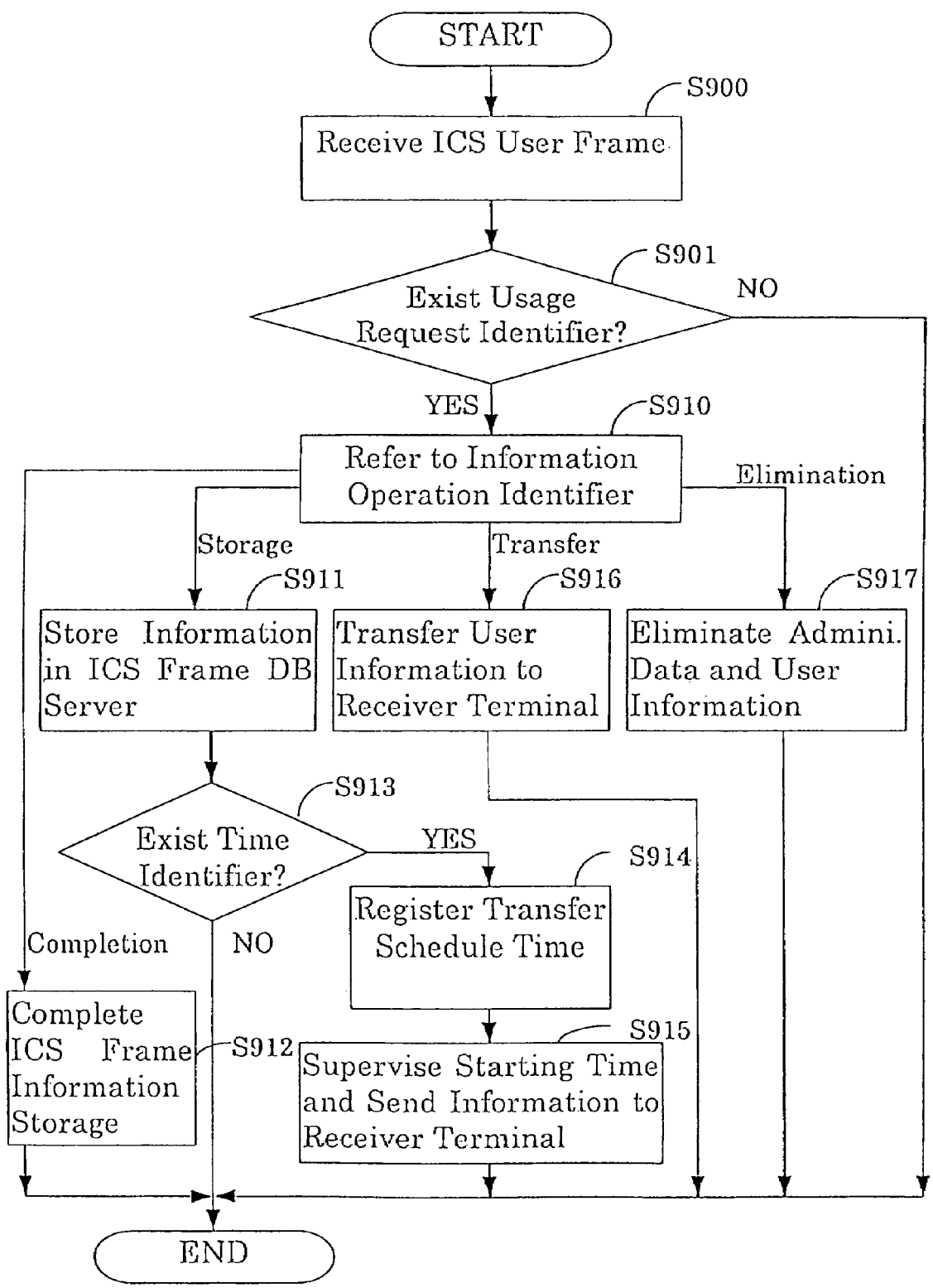
FIG. 46 is a flowchart to show an example of operation of the communication example 1 of the ICS frame database server.

A terminal which is connected to the LAN 900-1 of the corporation X and has an ICS user address "0012" performs a communication to a terminal which is connected to the LAN 900-2 of the corporation X and has an ICS user address "0034", using the ICS frame database server. A flowchart is shown in FIG. 46, describing the operation thereof.

The transmitter terminal sends an ICS user frame F60 for using the ICS frame database server 950 to the ICS 900, the ICS user frame F60 being provided at the user control field with a usage request identifier (transmitting storage user administration number: a code which the user using the ICS provides optionally, used as a search index number in the event that the ICS user operates the stored information) and an information operating identifier (transfer schedule time, information storage, information transfer, information elimination, information completion, etc.). The access control apparatus 910-1 received this (Step S900) refers to the usage request identifier of the ICS user frame F60 at the processing device 912-1 (Step S901), and in the event that the number of the user request identifier set by the transmitter terminal exists, the ICS user frame F60 is transferred to the processing device 951. The processing device 951 received the ICS user frame F60 refers to the usage request identifier and the information operating identifier (Step S910), and executes the operation indicated in the information operating identifier.

In the event that information storage is indicated, the processing device 951 receives the usage request identifier (transmitting storage user administration number) and the information operating identifier (information storage) of the ICS user frame F60 sent from the transmitter terminal, thereby storing the receiver ICS user address and the usage request identifier in the storage information administration table 952 corresponding to the sender ICS user address of the frame, and then stores the ICS user data frame in the BOX 953 (Step S911). Since the user frame to be stored is sent from the transmitter in the form of being divided into a plurality of ICS user frames, this operation is performed until the last frame of the ICS user frames to be stored is indicated, by means of the information operation identifier (information completion) indicated in the ICS user frame F60 (Step S912)

In the event that the transfer schedule time is indicated (Step S913), the processing device 951 receives the usage request identifier (transmitting storage user administration number) and the information operating identifier (transfer schedule time) of the ICS user frame F60 sent from the transmitter terminal, thereby storing the specified time in the storage information administration table 952 (Step S914), and the processing device 951 also transfers the information stored in the BOX 953 to the receiver terminal at a predetermined time, by means of constantly monitoring the transfer schedule time (Step S915).

In the event that the information transfer is indicated, the processing device 951 receives the usage request identifier (transmitting storage user administration number) and the information operating identifier (transfer request) of the ICS user frame F60 sent from the transmitter terminal, thereby sending the information (ICS user frame) stored in the BOX 953 to the receiver terminal (Step S916). Also, in the event that the information elimination is indicated, the processing device 951 receives the usage request identifier and the information operating identifier (information elimination) of the ICS user frame F60 sent from the transmitter terminal, thus eliminating the information stored in the storage information administration table 952 and the BOX 953 (Step S917).

(2) Communication Example-2

Operation of the ICS Frame Database Server on the Receiving Side

Figure 47:
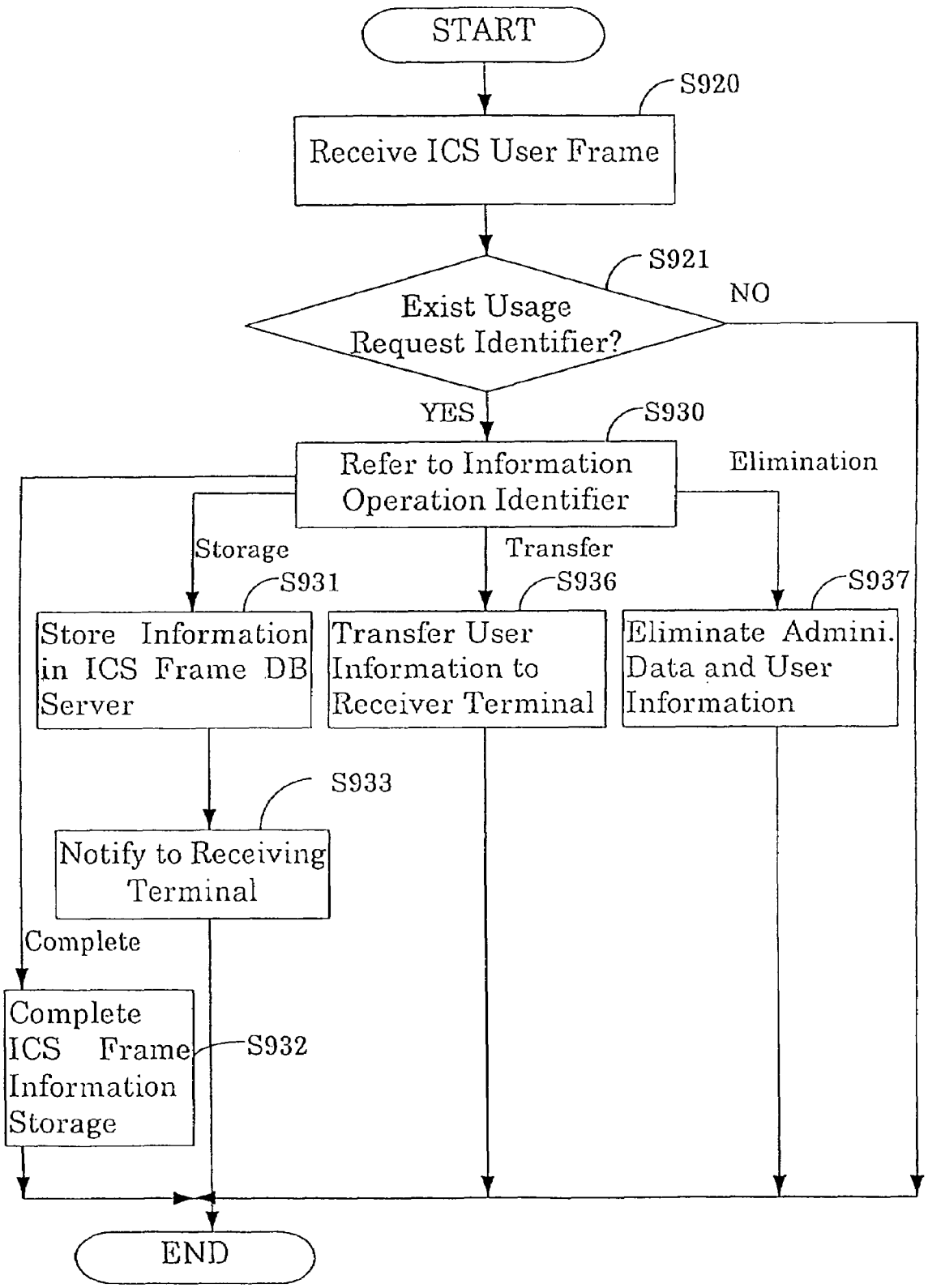
FIG. 47 is a flowchart to show an example of operation of the communication example 2 of the ICS frame database server.

A terminal which is connected to the LAN 900-2 of the corporation X and has an ICS user address "0034" receives a communication from a terminal which is connected to the LAN 900-1 of the corporation X and has an ICS user address "0012", using the user BOX. A flowchart is shown in FIG. 47, describing the operation thereof.

The transmitter terminal sends an ICS user frame F60 for using the receiver side ICS frame database server 960 to the ICS 900, the ICS user frame F60 being provided at the user control field with a usage request identifier (receiving storage user administration number: a code which the user using the ICS provides optionally, used as an index number in the event that the ICS user operates the stored information) and the information operating identifier. The ICS user frame F60 is sent through the ICS 900 to the access control apparatus 910-5 containing the receiver terminal (Step S920). The processing device 912-5 refers to the usage request identifier of the ICS user frame F60 (Step S921), and if the number of the usage request identifier set by the transmitter terminal exists, transfers the ICS user frame F60 to the processing device 961.

The processing device 961 received the ICS user frame F60 checks up the information operating identifier (information storage, information transfer, information elimination, information completion, etc.) of the ICS user frame F60 (Step S930), in a case of the information storage, stores the usage request identifier in the storage information administration table 962 corresponding to the sender ICS user address and the receiver user address of the frame, and then stores the ICS user frame in the BOX 963 (Step S931). The ICS user frame to be stored is sent from the transmitter in the form of being divided into a plurality of ICS user frames, so in the present embodiment, this operation is performed until the last frame of the ICS user frames to be stored is indicated, by means of the information operating identifier (information completion) indicated in the ICS user frame F60 (Steo S932). The processing device 962 notifies to the terminal of the receiver that there is information addressed to the receiving terminal in the ICS frame database server 960 by attaching the receiving storage user administration number, at a timing (e.g. noon) agreed on beforehand with the receiver terminal (Step S933). The receiver terminal which has been notified sends an ICS user frame F60 which set the usage request identifier and information operating identifier (information transfer), to the access control apparatus 910-5, the ICS frame database server 960 sends the information stored in the BOX 963 to the receiver terminal (Step S936) and then the receiver terminal receives the information (ICS user frame) stored in the ICS frame database server 960.

The processing device 961, upon receiving a frame explicitly indicating the usage request identifier and the information operating identifier (information elimination) of the ICS user frame F60, eliminates the information stored in the storage information administration table 962 and the BOX 963 (Step S937).

(3) Communication Example-3

Case of the Receiving Side Temporarily Cannot Receive

Figure 48:
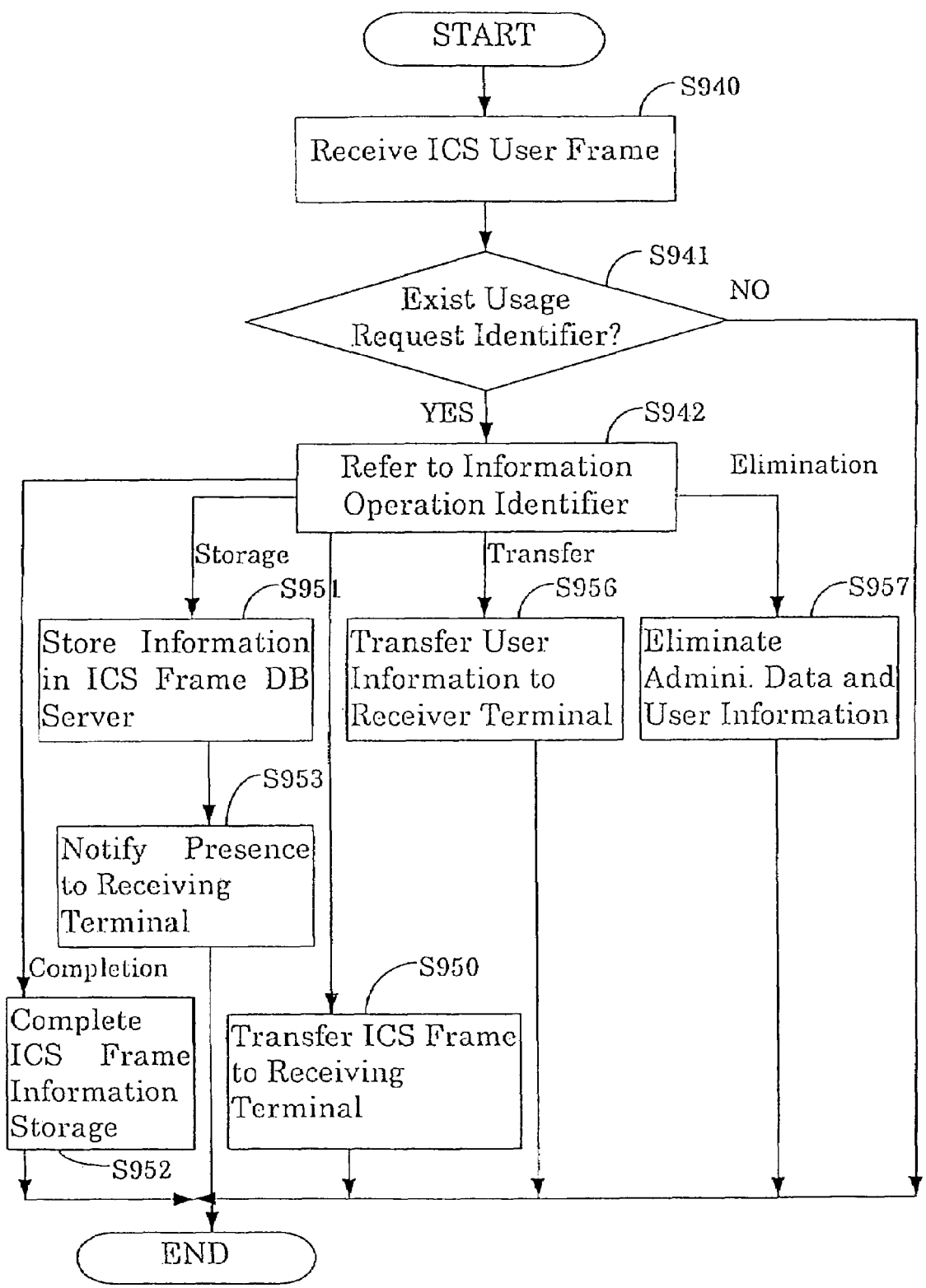
FIG. 48 is a flowchart to show an example of operation of the communication example 3 of the ICS frame database server.

In a case that a terminal which is connected to the LAN 900-1 of the corporation X and has an ICS user address "0012" performs a communication to a terminal which is connected to the LAN 900-2 of the corporation X and has an ICS user address "0034", even if a connection cannot be made temporarily between the transmitter terminal and the LAN 900-2 of the corporation X, the ICS frame database server 960 temporarily stores information addressed to the receiving terminal, and executes the communication when the connection becomes possible. A flowchart is shown in FIG. 48, describing the operation thereof.

The transmitter terminal sends an ICS user frame F60 to the ICS 900, the ICS user frame F60 being provided at the user control field with an information operating identifier (temporary storage) which allows informations to be distributed even if the communication with the receiver terminal is impossible, by storing the informations in the ICS frame database server 960 temporarily. The ICS user frame F60 is sent through the ICS 900 to the access control apparatus 910-5 containing the receiver terminal, the access control apparatus 910-5 receives the ICS user frame F60 (Step S940), and the processing device 912-5 checks us whether or not the usage request identifier in the ICS user frame F60 exists (Step S941) and refers to the information operating identifier (temporary storage) of the ICS user frame F60 (Step S942). If there is a request for temporary storage, a judgment is made whether the receiving side terminal is in a state in which communication is available. In the event that the communication is available, the ICS user frame F60 is transferred to the receiving terminal (Step S950), in the event that the communication is not available, the ICS user frame F60 is transferred to the processing device 961 of the ICS frame database server 960.

The processing device 961, stores the sender ICS user address, the receiver ICS user address and the usage request identifier of the ICS user frame F60 in the storage information administration table 962, and then stores the ICS user frame in the BOX 963 (Step S951). The ICS user frame to be stored is sent from the transmitter in the form of being divided into a plurality of ICS user frames, so in the present embodiment, this operation is performed until the last frame of the ICS user frames to be stored is indicated, by means of the information operating identifier (information completion) indicated in the ICS user frame F60 (Step S952). The processing device 912-5 constantly monitors the communication state with the receiving terminal, and when the receiving terminal becomes to be possible to receive, it notifies to the processing device 961 that the communication with the receiver is available. Upon receiving the notification, the processing device 961 notifies to the receiver terminal that there is information addressed to the receiver in the ICS frame database server 960, at a timing (e.g. after 5 minutes) agreed on beforehand with the receiver terminal (Step S953). The receiver terminal which has been notified sends an ICS user frame F60 which is set the usage request identifier (ICS storage user administration number) and the information operating identifier (information transfer), to the access control apparatus 910-5, the ICS frame database server 960 sends the information stored in the BOX 963 to the receiver terminal (Step S956), and the receiver terminal receives the stored information from the ICS frame database server 960 (Step S945).

When the processing device 961 receives a frame explicitly indicating the usage request identifier and the information operating identifier (information elimination) of the ICS user frame F60 sent from the receiver terminal, it eliminates the information stored in the storage information administration table 962 and the BOX 963 (Step S957).

Embodiment-10

Transfer by X.25, FR, ATM, Satellite Communication, and Containment of Telephone Line, ISDN Line, CATV Line, Satellite Line The data format from the user in the ICS according to the present invention is not restricted to the ICS user frames following the protocol of RFC 791 or RFC 1883, but can also be applied to containment of telephone line, ISDN line, CATV line, satellite line, IPX. Also, the relay network of the ICS network frame within the ICS network may handle X.25, FR, ATM, satellite communication, etc. In the present invention, the ATM exchanger includes cell-relay equipment, and the ATM network includes cell-relay networks.

Figure 49:
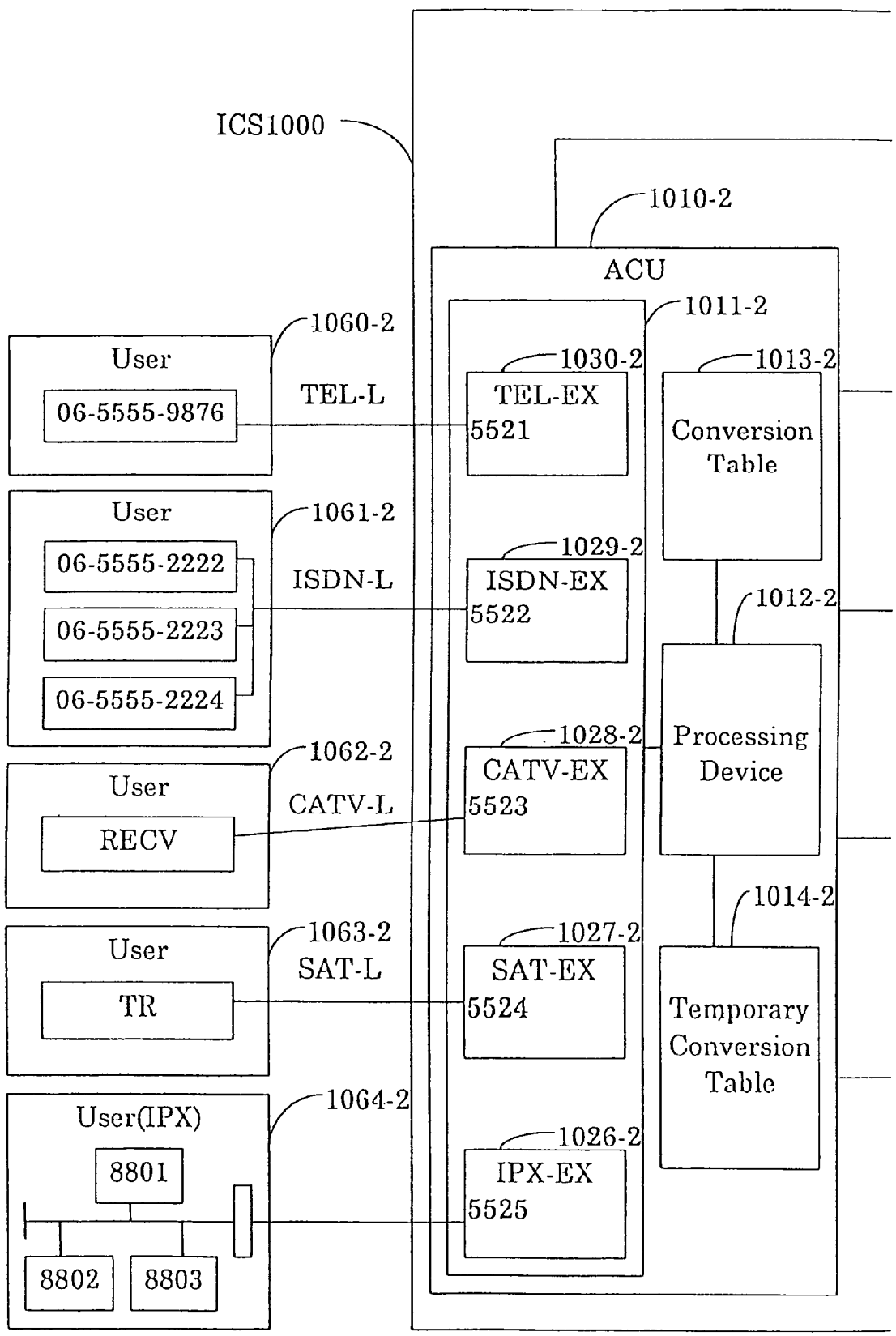
FIG. 49 is a portion of a constructional block diagram to show a tenth embodiment (transfer by X.25, FR, ATM, satellite communication, and containment of telephone line, ISDN line, CATV line, satellite line, IPX frame) according to the present invention.
Figure 50:
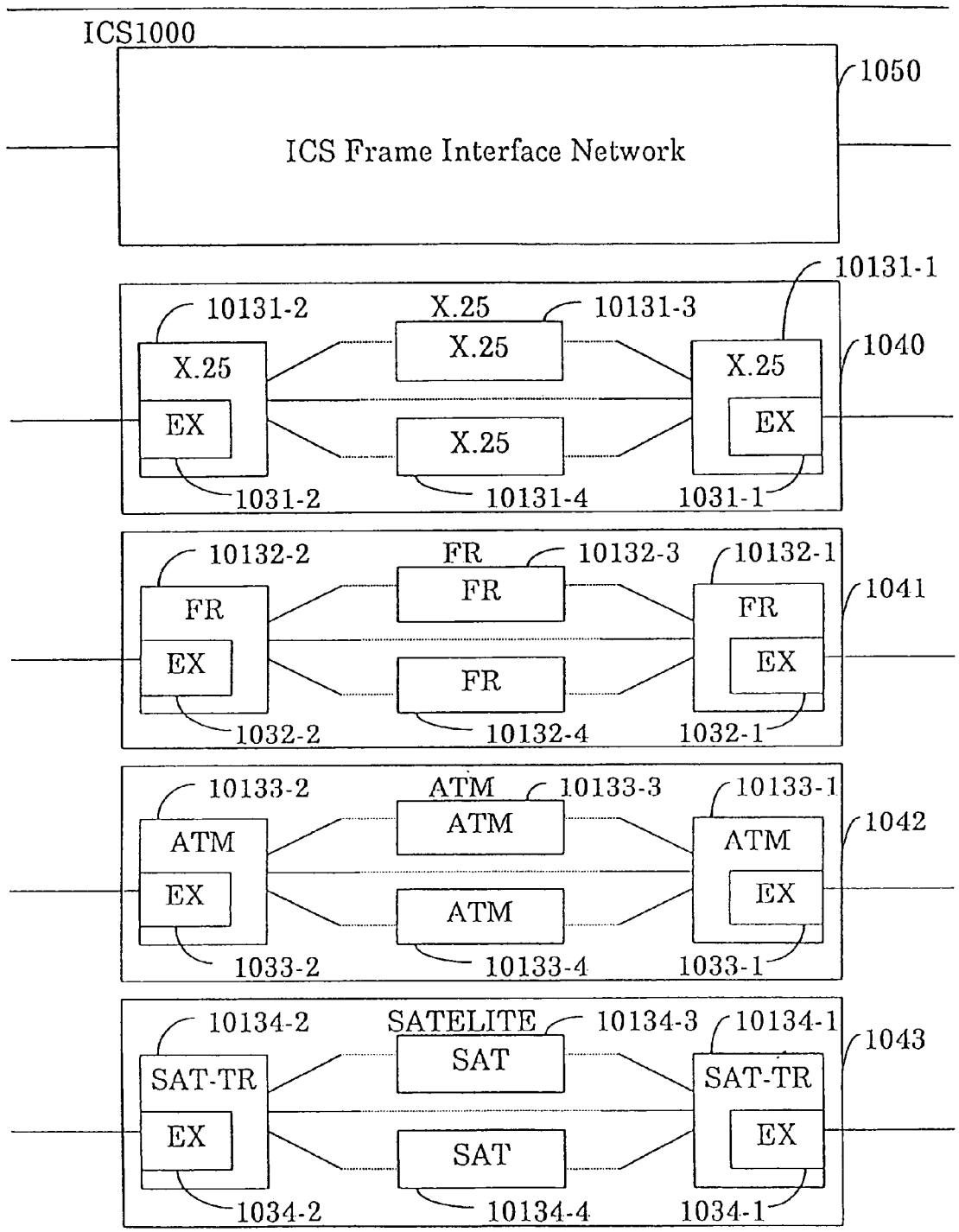
FIG. 50 is a portion of a constructional block diagram to show a tenth embodiment according to the present invention.
Figure 51:
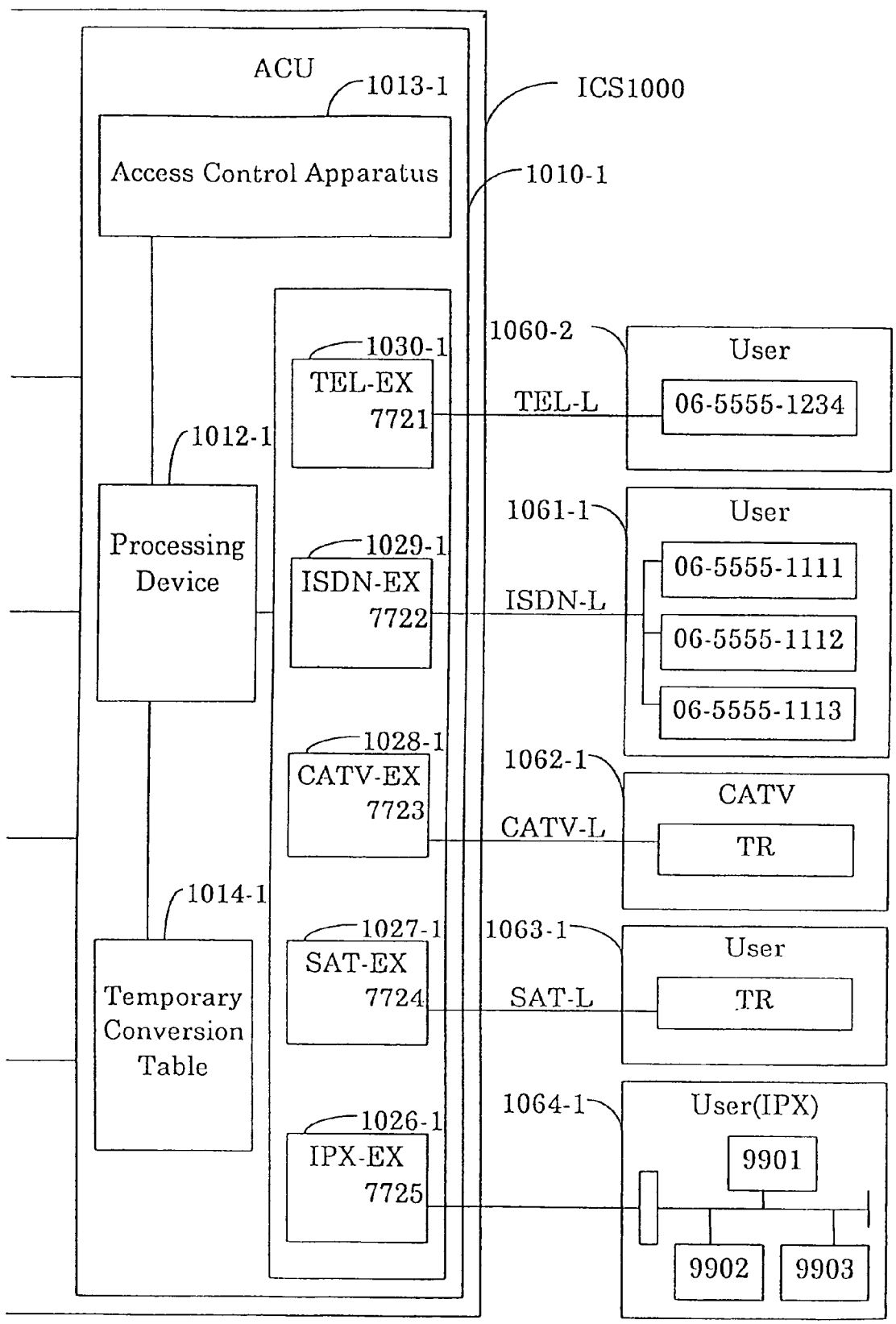
FIG. 51 is a portion of a constructional block diagram to show a tenth embodiment according to the present invention.

FIG. 49 through FIG. 51 are an example of interface conversion in an ICS 1000 according to the present invention, comprised of access control apparatuses 1010-1 and 1010-2, ICS frame interface network 1050, X.25 network 1040, FR network 1041, ATM network 1042, satellite communication network 1043, X.25/ICS network frame converting units 1031-1 and 1031-2, FR/ICS network frame converting units 1032-1 and 1032-2, ATM/ICS network frame converting units 1033-1 and 1033-2, satellite/ICS network frame converting units 1034-1 and 1034-2, telephone line converting units 1030-1 and 1030-2, ISDN line converting units 1029-1 and 1029-2, CATV line converting units 1028-1 and 1028-2, satellite line converting units 1027-1 and 27-2, and IPX converting units 1026-1 and 1026-2. An example of the conversion table 1013-1 in the access control apparatus 1010-1 is shown in FIG. 52.

The ICS frame interface network 1050 is a relay network which transfers the ICS network frame following the protocol of RFC 791 or RFC 1883 in the format that it is in. The X.25 network 1040 is a relay network for transferring frames of an X.25 format, and has as the input/output portion thereof X.25/ICS network frame converting units 1031-1 and 1031-2 for converting ICS network frames into frames of an X.25 format, and for performing reverse conversion. The FR network 1041 is a relay network for transferring frames of a frame relay format, and has as the input/output portion thereof FR/ICS network frame converting units 1032-1 and 1032-2 for converting ICS network frames into frames of an FR format, and for performing reverse conversion. The ATM network 1042 is a relay network for transferring frames of an ATM format, and has as the input/output portion thereof ATM/ICS network frame converting units 1033-1 and 1033-2 for converting ICS network frames into frames of an ATM format, and for performing reverse conversion. The satellite communication network 1043 is a relay network for transferring frames of a satellite communication format, and has as the input/output portion thereof satellite/ICS network frame converting units 1034-1 and 1034-2 for converting ICS network frames into satellite communication network interface, and for performing reverse conversion. The telephone line converting units 1030-1 and 1030-2 have the functions of converting a function equivalent to physical layer or data link layer (first and second layers of OSI communication protocol) between the telephone line and the access control apparatus, and for performing reverse conversion. The ISDN line converting units 1029-1 and 1029-2 have the functions of converting a function equivalent to physical layer or data link layer between the ISDN line and the access control apparatus, and for performing reverse conversion. The CATV line converting units 1028-1 and 1028-2 have the functions of converting a function equivalent to physical layer or data link layer between the CATV line and the access control apparatus, and for performing reverse conversion. The satellite line converting units 1027-1 and 1027-2 have the functions of converting a function equivalent to physical layer or data link layer between the satellite line and the access control apparatus, and for performing reverse conversion. The IPX line converting units 1026-1 and 1026-2 have the functions of converting a function equivalent to physical layer or data link layer between the IPX line and the access control apparatus, and for performing reverse conversion.

(1) Description will be made regarding a case wherein communication is performed between the access control apparatus 1010-1 and the access control apparatus 1010-2, via the X.25 network 1040.

Figure 53:
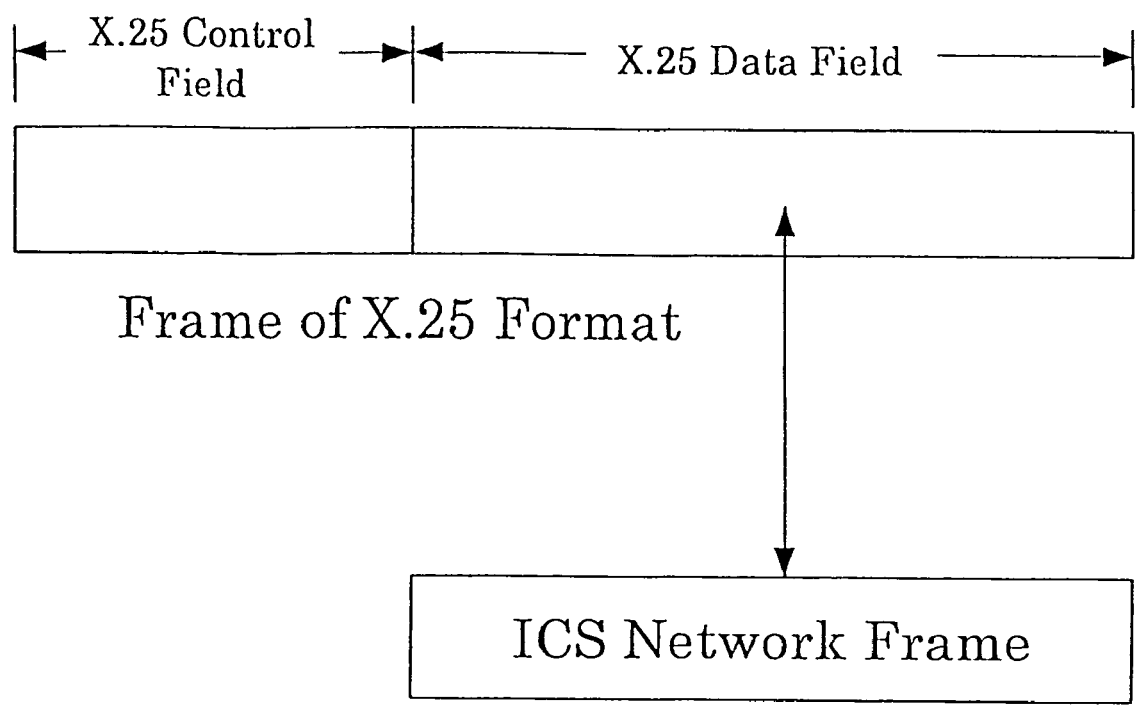
FIG. 53 is a diagram illustrating the manner of frame conversion of the ICS network frame and the X.25 format.

The access control apparatus 1010-1 sends the ICS network frame to the X.25 exchanger 10131-1. The X.25/ICS network frame converting unit 1031-1 within the X.25 exchanger 10131-1 converts the ICS network frame received from the access control apparatus 1010-1 into an X.25 format frame as shown in FIG. 53. Then, the X.25 exchanger 10131-1 sends the X.25 format frame into the X.25 network 1040. The X.25 format frame sent from the X.25 exchanger 10131-1 is transferred through the X.25 network 1040, and reaches the X.25 exchanger 10131-2. Next, the X.25/ICS network frame converting unit 1031-2 within the X.25 exchanger 10131-2 performs reverse conversion of the received X.25 format frame into ICS network frame format, and outputs to the access control apparatus 1010-2. The access control apparatus 1010-2 receives the ICS network frame. Network frames of the ICS 1000 sent from the access control apparatus 1010-2 to the X.25 exchanger 10131-2 are transferred to the access control apparatus 1010-1 in the same manner.

(2) Description will be made regarding a case wherein a communication is performed between the access control apparatus 1010-1 and the access control apparatus 1010-2, via the FR network 1041.

Figure 54:
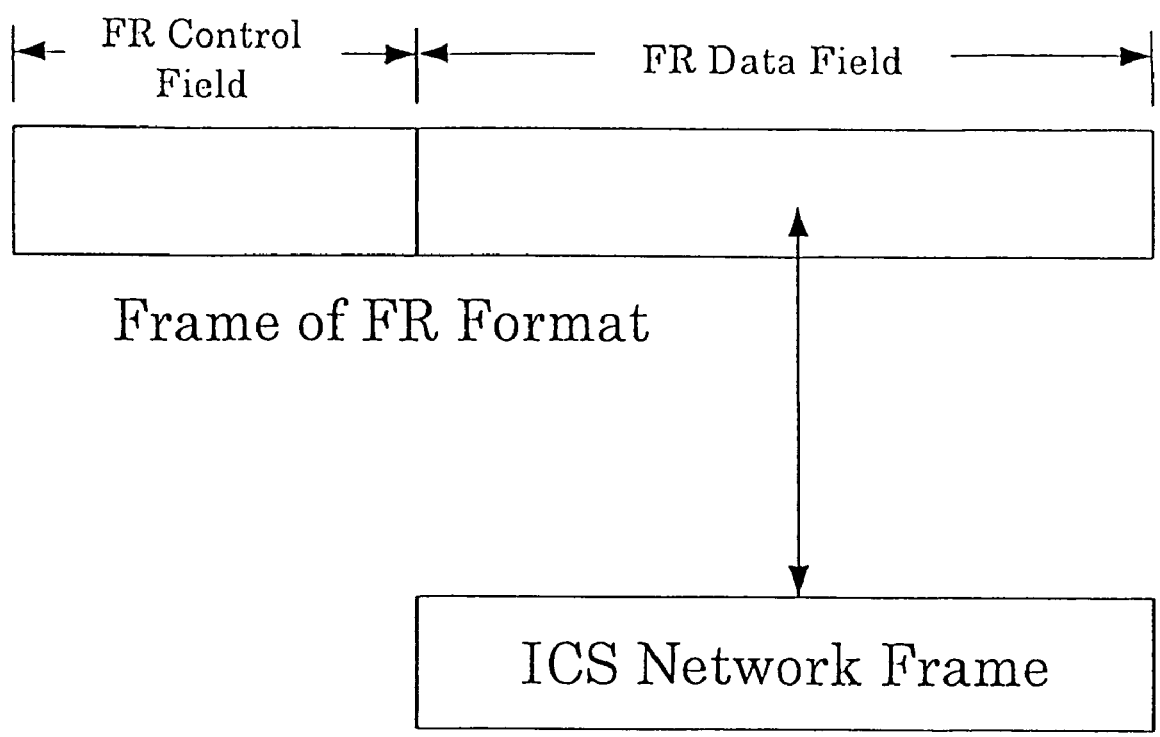
FIG. 54 is a diagram illustrating the manner of frame conversion of the ICS network frame and the FR format.

The access control apparatus 1010-1 sends the ICS network frame. The FR/ICS network frame converting unit 1032-1 within the FR exchanger 10132-1 converts the ICS network frame received from the access control apparatus 1010-1 into an FR format frame as shown in FIG. 54. Then, the FR exchanger 10132-1 sends the X.25 format frame into the FR network 1041. The FR format frame sent from the FR exchanger 10132-1 is transferred through the FR network 1041, and reaches the FR exchanger 10132-2. The FR/ICS network frame converting unit 1032-2 within the FR exchanger 10132-2 performs reverse conversion of the received FR format frame into ICS network frame format, and outputs to the access control apparatus 1010-2. The access control apparatus 1010-2 receives the ICS network frame. ICS network frames sent from the access control apparatus 1010-2 to the FR exchanger 10132-2 are transferred to the access control apparatus 1010-1 in the same manner.

(3) Description will be made regarding a case wherein a communication is performed between the access control apparatus 1010-1 and the access control apparatus 1010-2, via the ATM network 1042.

Figure 55:
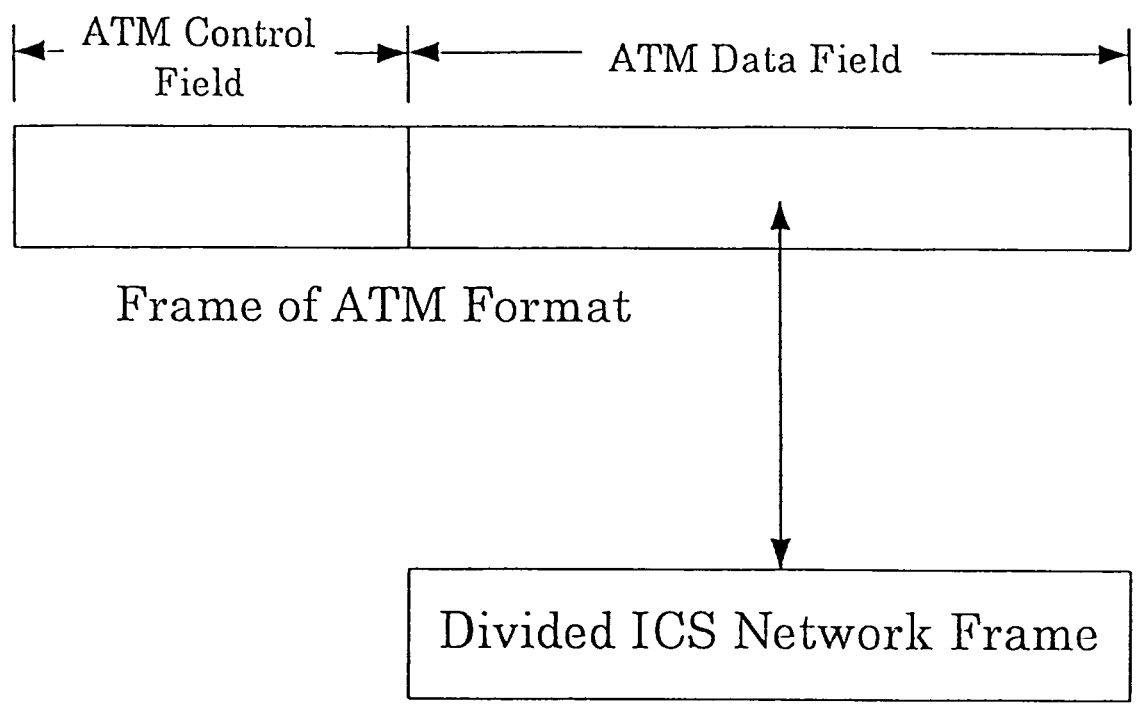
FIG. 55 is a diagram illustrating the manner of frame conversion of the ICS network frame and the ATM format.

The access control apparatus 1010-1 sends the ICS network frame to the ATM exchanger 10133-1. The ATM/ICS network frame converting unit 1033-1 within the ATM exchanger 10133-1 converts the ICS network frame received from the access control apparatus 1010-1 into an ATM format frame as shown in FIG. 55. Then, the ATM exchanger 10133-1 sends the ATM format frame into the ATM network 1042. The ATM format frame sent from the ATM exchanger 10133-1 is transferred through the ATM network 1042, and reaches the ATM exchanger 10133-2. Next, the ATM/ICS network frame converting unit 1033-2 within the ATM exchanger 10133-2 performs reverse conversion of the received ATM format frame into ICS network frame format, and outputs to the access control apparatus 1010-2. The access control apparatus 1010-2 receives the ICS network frame. ICS network frames sent from the access control apparatus 1010-2 to the ATM exchanger 10133-2 are transferred to the access control apparatus 1010-1 in the same manner.

(4) Description will be made regarding a case wherein a sear communication is performed between the access control apparatus 1010-1 and the access control apparatus 1010-2, via the satellite communications network 1043.

The access control apparatus 1010-1 sends the ICS network frame to the satellite receiver/transmitter 10134-1. The satellite/ICS network frame converting unit 1034-1 within the satellite receiver/transmitter 10134-1 converts the ICS network frame received from the access control apparatus 1010-1 into an interface within the satellite communications network 1043. Then, the satellite receiver/transmitter 10134-1 sends the ICS network frame converted into an interface within the satellite communications network 1043 into the satellite communications network 1043. The ICS network frame converted into an interface within the satellite communications network 1043 sent from the satellite receiver/transmitter 10134-1 is transferred through the satellite communications network 1043, and reaches the satellite receiver/transmitter 10134-2. The satellite/ICS network frame converting unit 1034-2 within the satellite receiver/transmitter 10134-2 performs reverse conversion of the received interface within the satellite communications network 1043 into ICS network frame format, and outputs to the access control apparatus 1010-2. The access control apparatus 1010-2 receives the ICS network frame. ICS network frames sent from the access control apparatus 1010-2 to the satellite receiver/transmitter 10134-2 are transferred to the access control apparatus 1010-1 in the same manner.

(5) Description will be made regarding a case wherein communication is performed with an interface of a telephone line between a user 1060-1 connected to a telephone line converting unit 1030-1 of an access control apparatus 1010-1, and a user 1060-2 connected to a telephone line converting unit 1030-2 of an access control apparatus 1010-2, the first user originating the call.

The user 1060-1 applies a telephone line connection to the VAN operator. The VAN operator specifies the access control apparatus 1010-1 connecting the user 1060-1, and decides on an ICS network address "7721" for the ICS logic terminal. Next, the VAN operator sets informations in the conversion table 1013-1 of the access control apparatus 1010-1, such as the transmitting ICS network address "7721", the receiving telephone number "06-5555-9876", the receiving ICS network address "5521", request identification and so forth. In the present embodiment, the request identification "5" indicates a telephone line connection. In the same way, the VAN operator sets informations in the conversion table 1013-2 of the access control apparatus 1010-2, such as the transmitting ICS network address "5521", the receiving telephone number "03-5555-1234", the receiving ICS network address "7721", request identification and so forth.

The user 1060 sends the telephone number "06-5555-9876". The telephone line converting unit 1030-1 converts the received telephone number into a format which can be read by the processing device 1012-1, and sends it to the processing device 1012-1. The processing device 1012-1 received the telephone number information from the telephone line converting unit 1030-1 with the ICS network address "7721" refers to the request identification of the transmitting ICS network address "7721" of the conversion table 1013-1, identifies it as a telephone line connection, and reads the receiving ICS network address "5521" from the receiving telephone number "06-5555-9876". The access control apparatus 1010-1 forms an ICS network frame having a network control field wherein the receiving ICS network address is set to "5521" and the transmitting ICS network address is set to "7721" and a network data field described information to notify that there is a telephone reception, and sends it into a network of ICS 1000. The ICS network frame sent from the access control apparatus 1010-1 is transferred through the network of the ICS 1000, and reaches the access control apparatus 1010-2. The access control apparatus 1010-2 received the ICS network frame having the network data field described information to notify that there is telephone reception, outputs a signal from the telephone line converting unit 1030-2 with the ICS network address "5521" to the user 1060-2 notifying the reception. Then, the user 1060-2 sends a response signal.

Upon receiving the response signal, the telephone line converting unit 1030-2 converts it into a format which can be transferred through the network of the ICS 1000. The access control apparatus 1010-2 forms an ICS network frame having a network control field wherein the receiving ICS network address is set to "7721" and the transmitting ICS network address is set to "5521", and a network data field described information to notify that there is reply of the telephone, and sends it into a network of the ICS. The ICS network frame sent from the access control apparatus 1010-2 is transferred through the network of the ICS, and reaches the access control apparatus 1010-1. The access control apparatus 1010-2 received the ICS network frame having the network data field described information to notify that there is a response, outputs a signal from the telephone line converting unit 1030-1 having the ICS network address "7721" to the user 1060-1, notifying the response. Thus, the user 1060-1 and the user 1060-2 begin full-duplex communication by analog signals (voice, etc.) and the user 1060-1 sends analog signals. The telephone line converting unit 1030-1 received the analog signals converts the analog signals into an analog information format which can be transferred through the ICS network.

The access control apparatus 1010-1 forms an ICS network frame having a network control field wherein the transmitting ICS network address is set to "7721" and the receiving ICS network address is set to "5521", and a network data field described analog information, and sends it into a network of the ICS 1000. The ICS network frame sent from the access control apparatus 1010-1 is transferred through the network of the ICS 1000, and reaches the access control apparatus 1010-2. The access control apparatus 1010-2 received the ICS network frame having network data field described the analog information outputs the analog information as analog signals converted into a telephone line interface from the telephone line converting unit 1030-2 having the ICS network address "5521" to the user 1060-2. The analog signals sent from the user 1060-2 are transferred to the user 1060-1 by means of the same procedure.

(6) Description will be made regarding a case wherein a communication is performed with an interface of an ISDN line between a user 1061-1 connected to an ISDN line converting unit 1029-1 of an access control apparatus 1010-1, and a user 1061-2 connected to an ISDN line converting unit 1029-2 of an access control apparatus 1010-2, the first user originating the call.

The user 1061-1 applies an ISDN line connection to the VAN operator. The VAN operator specifies the access control apparatus 1010-1 connecting the user 1061-1, and decides on an ICS network address "7722" for the ICS logic terminal. Next, the VAN operator set informations in the conversion table 1013-1 of the access control apparatus 1010-1, such as the transmitting ICS network address "7722", the receiving ISDN number "06-5555-2222", the receiving ICS network address "5522", request identification and so forth. In the present embodiment, the request identification "6" indicates a ISDN line connection. In the same way, the VAN operator sets informations in the conversion table 1013-2 of the access control apparatus 1010-2, such as the transmitting ICS network address "5522", the receiving ISDN number "03-5555-1111", the receiving ICS network address "7722", request identification and so forth.

The user 1061-1 sends the ISDN number "06-5555-2222". The ISDN line converting unit 1029-1 converts the received ISDN number into a format which can be read by the processing device 1012-1, and sends it to the processing device 1012-1. The processing device 1012-1 received the ISDN number information from the ISDN line converting unit 1029-1 with the ICS network address "7722" refers to the request identification of the transmitting ICS network address "7722" of the conversion table 1013-1, identifies it as an ISDN line connection, and reads the receiving ICS network address "5522" from the receiving ISDN number "06-5555-2222". The access control apparatus 1010-1 forms an ICS network frame having a network control field wherein the receiving ICS network address is set to "5522" and the transmitting ICS network address is set to "7722", and a network data field described information to notify that there is an ISDN reception, and sends it into a network of the ICS 1000.

The ICS network frame sent from the access control apparatus 1010-1 is transferred through the network of the ICS 1000, and reaches the access control apparatus 1010-2. The access control apparatus 1010-2 received the ICS network frame having the network data field described information to notify that there is a reception, outputs a signal from the ISDN line converting unit 1029-2 with an ICS network address "5522" to the user 1061-2, notifying the reception. Then, the user 1061-2 sends a response signal. Upon receiving the response signal, the ISDN line converting unit 1029-2 converts it into a format which can be transferred through the network of the ICS 1000. The access control apparatus 1010-2 forms an ICS network frame having a network control field wherein the receiving ICS network address is set to "7722" and the transmitting ICS network address is set to "5522", and a network data field described information to notify that there is a reply of the ISDN, and sends it into a network of the ICS 1000.

The ICS network frame sent from the access control apparatus 1010-2 is transferred through the network of the ICS 1000, and reaches the access control apparatus 1010-1. The access control apparatus 1010-2 received the ICS network frame having a network data field described information to notify that there is a response, outputs a signal from the ISDN line converting unit 1029-1 having the ICS network address "7722" to the user 1061-1, notifying the response. Thus, the user 1061-1 and the user 1061-2 begin full-duplex communication by digital signals (voice, etc.) and the user 1061-1 sends the digital signals. The ISDN line converting unit 1029-1 received the analog signal converts into a digital information format which can be transferred through the ICS 1000.

The access control apparatus 1010-1 forms an ICS network frame having a network control field wherein the receiving ICS network address is set to "5522" and the transmitting ICS network address is set to "7722", and a network data field described digital information, and sends it into a network of the ICS 1000. The ICS network frame sent from the access control apparatus 1010-1 is transferred through the network of the ICS 1000, and reaches the access control apparatus 1010-2. The access control apparatus 1010-2 received the ICS network frame having a network data field described the digital information, outputs the digital information as digital signals converted into a ISDN line interface from the ISDN line converting unit 1029-2 having the ICS network address "5522" to the user 1061-2. The digital signals sent from the user 1061-2 are transferred to the user 1061-1 by means of the same procedure.

(7) Description will be made regarding a case wherein a communication is performed with an interface of a CATV line between a CATV broadcasting station 1062-1 connected to a CATV line converting unit 1028-1 of an access control apparatus 1010-1, and a user 1062-2 connected to a CATV line converting unit 1028-2 of an access control apparatus 1010-2.

The CATV broadcasting station 1062-1 applies a CATV line connection with the user 1062-2 to the VAN operator. The VAN operator specifies the access control apparatus 1010-2 connecting the user 1062-2, and decides on an ICS network address "5523" for the ICS logic terminal. Next, the VAN operator sets informations to a portion of the conversion table 1013-1 of the access control apparatus 1010-1 corresponding to the transmitting ICS network address "7723", such as the receiving ICS network address "5523", request identification and so forth. In the present embodiment, the request identification "7" indicates a CATV line connection. In the same way, the VAN operator sets informations in the conversion table 1013-2 of the access control apparatus 1010-2, such as the transmitting ICS network address "5523", the receiving ICS network address "7723", request identification and so forth.

The CATV broadcasting station 1062-1 sends CATV analog signals. The CATV line converting unit 1028-1 converts the received CATV analog signals into a format which can be transferred through the ICS 1000. The access control apparatus 1010-1 forms an ICS network frame having a network control field wherein the receiving ICS network address is set to "5523" and the transmitting ICS network address is set to "7723", and a network data field described the CATV information, and sends it into a network of the ICS 1000. The ICS network frame sent from the access control apparatus 1010-1 is transferred through the ICS 1000, and reaches the access control apparatus 1010-2. The access control apparatus 1010-2 received the ICS network frame having network data field described the CATV information, outputs the CATV information from the CATV line converting unit 1028-2 with an ICS network address "5523" to the user 1062-2 as CATV analog signals converted to a CATV line interface. The CATV analog signals outputted from the user 1062-2 are transferred to the CATV broadcasting station 1062-1 with the same procedures.

(8) Description will be made regarding a case wherein a communication is performed with an interface of a satellite line between a user 1063-1 connected to a satellite line converting unit 1027-1 of an access control apparatus 1010-1, and a user 1063-2 connected to a satellite line converting unit 1027-2 of an access control apparatus 1010-2.

The user 1063-1 and the user 1063-2 applies a satellite line connection between the user 1063-1 and the user 1063-2 to the VAN operator. The VAN operator specifies the access control apparatus 1010-1 connecting the user 1063-1, and decides on an ICS network address "7724" for the ICS logic terminal. In the same way, the VAN operator specifies the access control apparatus 1010-2 connecting the user 1063-2, and decides on an ICS network address "5524" for the ICS logic terminal. Next, the VAN operator sets informations to a portion of the conversion table 1013-1 of the access control apparatus 1010-1 corresponding to the transmitting ICS network address "7724", such as the receiving ICS network address "5524", request identification and so forth. In the present embodiment, the request identification "8" indicates the satellite line connection. In the same way, the VAN operator sets informations in the conversion table 1013-2 of the access control apparatus 1010-2, such as the transmitting ICS network address "5524", the receiving ICS network address "7724", request identification and so forth.

The user 1063-1 sends satellite signals. The satellite line converting unit 1027-1 received interface satellite signals of the satellite line converts the satellite signals into an information format which can be transferred through the ICS 1000. The access control apparatus 1010-1 forms an ICS network frame having a network control field wherein the receiving ICS network address is set to "5524" and the originating ICS network address is set to "7724", and a network data field describing satellite signal information, and sends this into the ICS 1000 network. The ICS network frame sent from the access control apparatus 1010-1 is transferred through the ICS network 1000, and reaches the access control apparatus 1010-2. The access control apparatus 1010-2 received the ICS network frame having a network data field described the satellite information, outputs satellite signal information from the satellite line converting unit 1027-2 with an ICS network address "5524" to the user 1063-2 as satellite signals converted to a satellite line interface. The satellite line interface satellite signals outputted from the user 1063-2 are also transferred to the user 1063-1 with the same procedures.

(9) Description will be made regarding a case wherein a communication is performed with an IPX interface between a terminal having an IPX address "9901" of a user 1064-1 and a terminal having an IPX address "8801" of a user 1064-2.

The users 1064-1 and 1064-2 apply an IPX connection between a terminal having an IPX address "9901" of the user 1064-1 and a terminal having an IPX address "8801" of the user 1064-2 to the VAN operator. The VAN operator specifies the access control apparatus 1010-1 connecting the user 1064-1 and the IPX converting unit 1026-1 with an ICS network address "7725". In the same say, the VAN operator specifies the access control apparatus 1010-2 connecting the user 1064-2 and the IPX converting unit 1026-2 with an ICS network address "5525". Next, the VAN operator sets informations to a portion of the conversion table 1013-1 of the access control apparatus 1010-1 corresponding to the transmitting ICS network address "7725", such as the sender IPX address "9901", the receiver IPX address "8801", the receiving ICS network address "5525", request identification and so forth. In the present embodiment, the request identification "9" indicates an IPX connection. In the same way, the VAN operator sets informations to a portion of the conversion table 1013-2 of the access control apparatus 1010-2 corresponding to the transmitting ICS network address "5525", such as the sender IPX address "8801", the receiver IPX address "9901", the receiving ICS network address "7725", request identification and so forth.

The terminal having an IPX address "9901" of the user 1064-1 sends an IPX frame with the sender IPX address set to "9901" and the receiver IPX address set to "8801". The IPX converting unit 1026-1 of the access control device receives the IPX frame, and reads the sender IPX address "9901" and the receiver IPX address "8801", and then reads the receiving network address "5525" of the receiver IPX address "8801" of the sender IPX address "9901" of the transmitting ICS network address "7725", from the conversion table 1013-1. The access control apparatus 1010-1 forms an ICS network frame having a network control field wherein the transmitting ICS network address is set to "5525" and the receiving ICS network address is set to "7725", and a network data field described IPX frame information, and sends it into a network of the ICS 1000.

The ICS network frame sent from the access control apparatus 1010-1 is transferred through the network of the ICS 1000, and reaches the access control apparatus 1010-2. The access control apparatus 1010-2 received the ICS network frame having a network data field described the ICS network frame information, outputs IPX frame information from the IPX converting unit 1026-2 with an ICS network address "5525" to the user 1064-2, in the form of IPX frame converted into IPX interface. The terminal having the IPX address "8801" of the user 1064-2 receives the IPX frame. On the other hand, the IPX frame set in the sender IPX address "8801" and the receiver IPX address "9901" sent from the terminal having the IPX address "8801" of the user 1064-2 is also transferred to the user 1064-1 with the same procedures.

Embodiment-11

Figure 56:
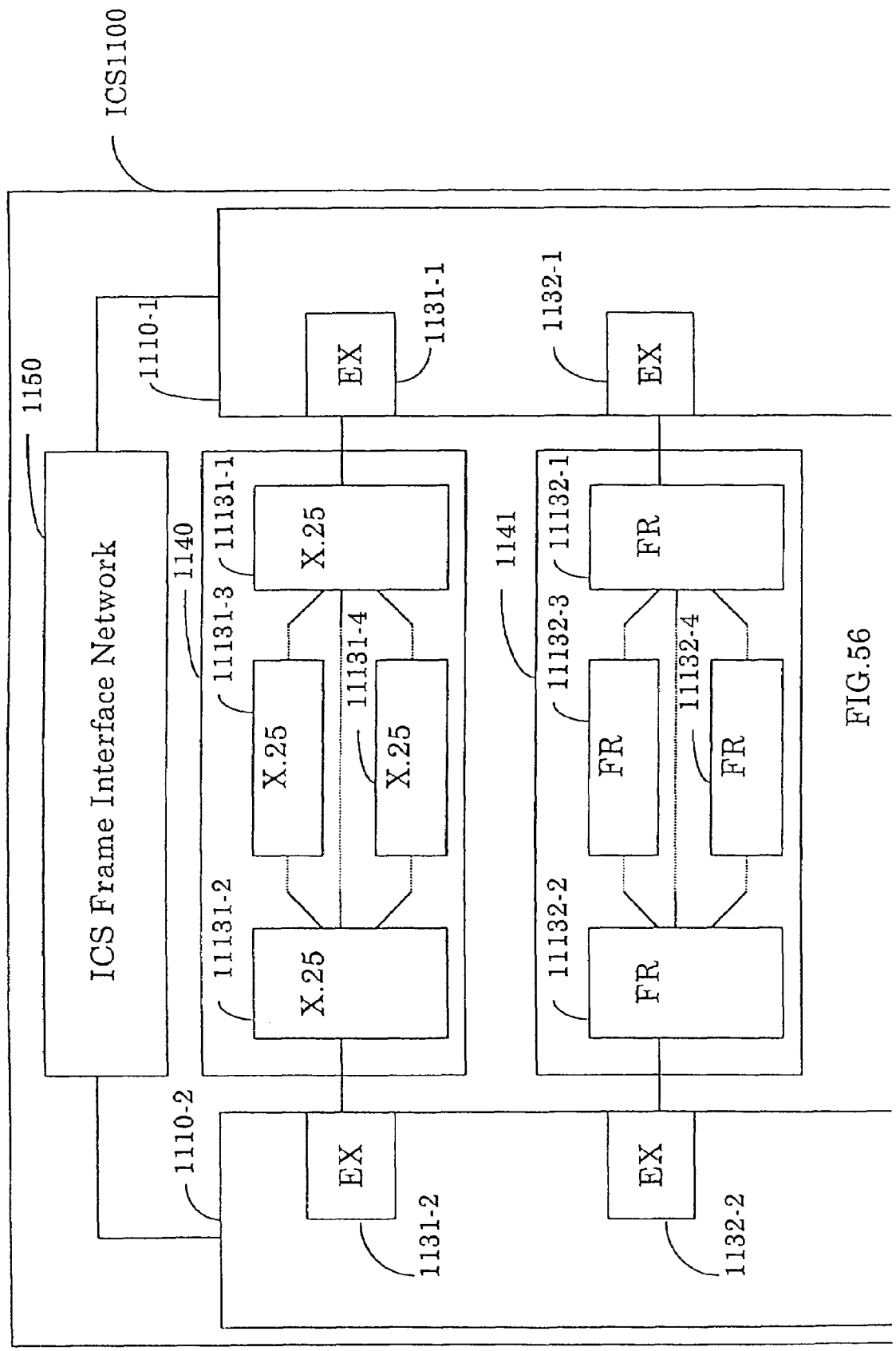
FIG. 56 is a portion of a constructional block diagram to show an eleventh embodiment (transfer by X.25, FR, ATM, satellite communication, and containment of telephone line, ISDN line, CATV line, satellite line, IPX frame) according to the present invention.
Figure 57:
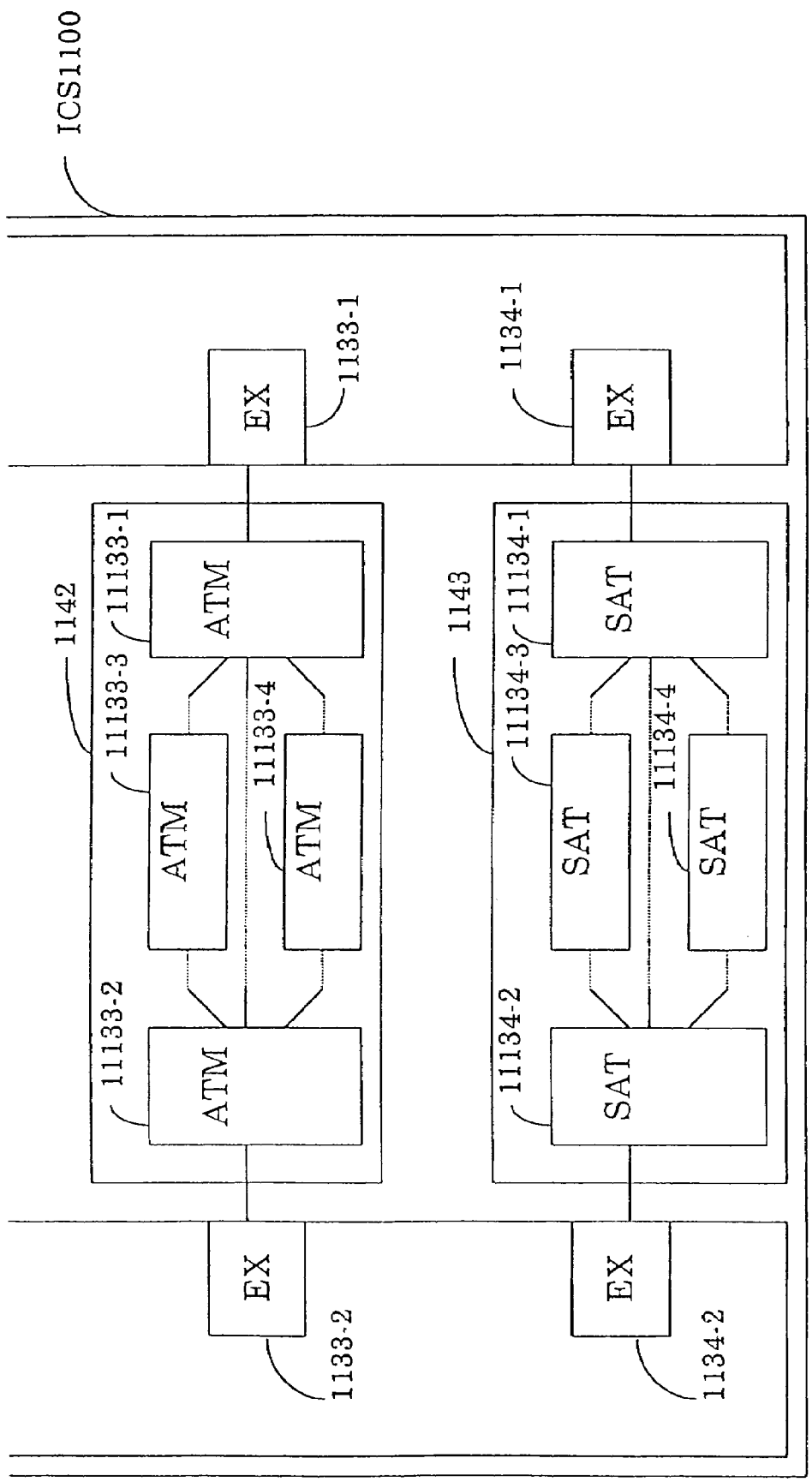
FIG. 57 is a portion of a constructional block diagram to show an eleventh embodiment according to the present invention.

Transfer by X.25, FR, ATM, Satellite Communication, and Containment of Telephone Line, ISDN Line, CATV Line, Satellite Line In the above Embodiment-10, the X.25/ICS network frame converting units 1031-1 and 1031-2, FR/ICS network frame converting units 1032-1 and 1032-2, ATM/ICS network frame converting units 1033-1 and 1033-2, satellite/ICS network frame converting units 1034-1 and 1034-2 are each located within relay networks, i.e., within the X.25 network 1040, FR network 1041, ATM network 1042 and satellite communication network 1043. Conversely, as shown in FIGS. 56 and 57, with the Embodiment-11, the X.25/ICS network frame converting units 1131-1 and 1131-2, FR/ICS network frame converting units 1132-1 and 1132-2, ATM/ICS network frame converting units 1133-1 and 1133-2, satellite/ICS network frame converting units 1134-1 and 1134-2 are each located within the access control apparatuses 1110-1 and 1110-2. That is, while with Embodiment-10, the received ICS network frames are converted and reverse-converted into formats which can be transferred on the side of each of the relay networks (X.25 network 1040, FR network 1041, ATM network 1042, satellite communication network 1043), the conversion being performed by the relay networks, with the Embodiment-11, conversion and reverse conversion into formats which can be transferred in each of the relay networks is performed on the side of the access control apparatuses.

Embodiment-12

Containment of Access Control Apparatuses Within Relay Networks

Figure 58:
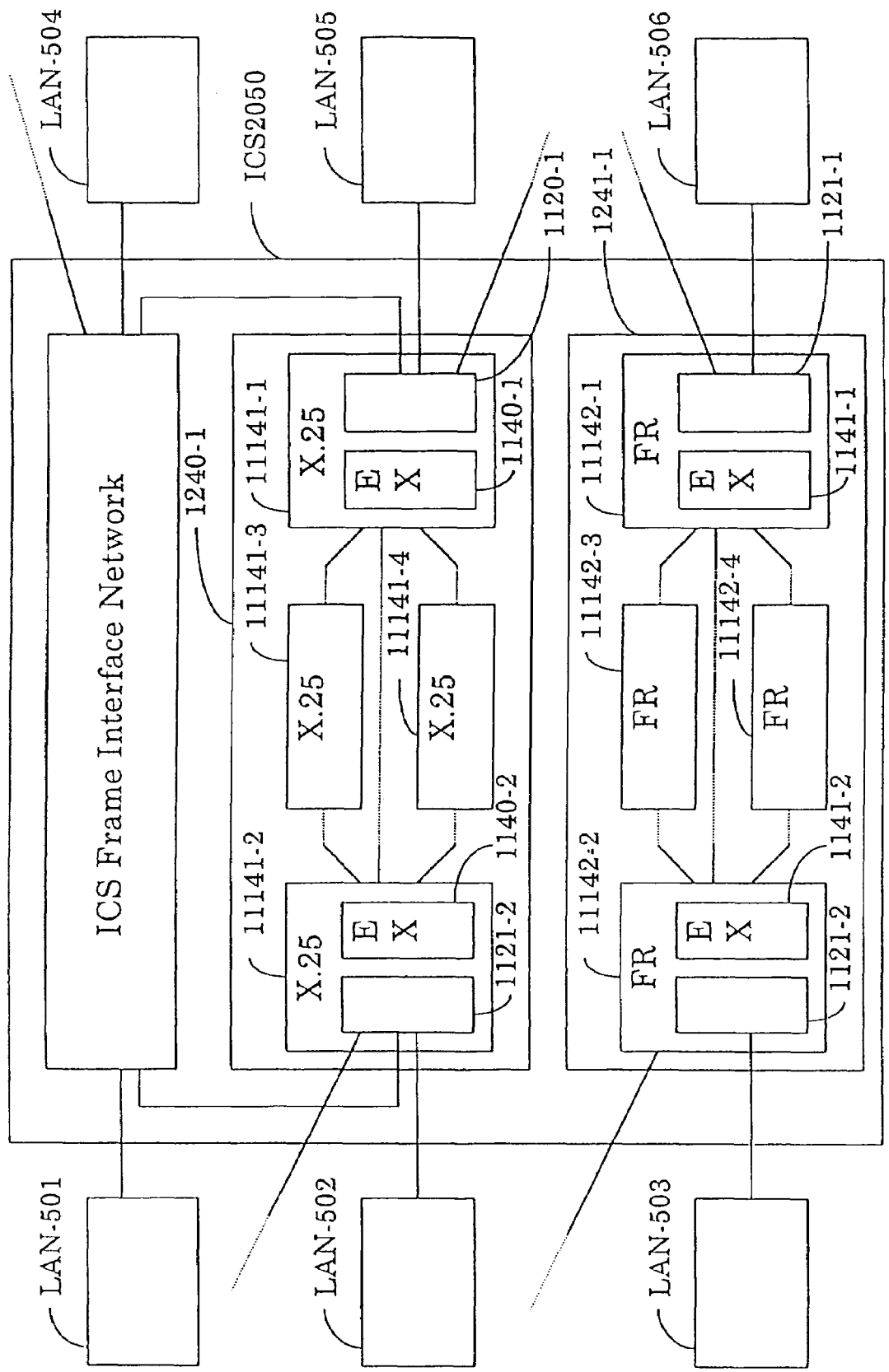
FIG. 58 is a portion of a constructional block diagram to show a twelfth embodiment (containment of the access control apparatus within the X.25 network and FR network) according to the present invention.
Figure 59:
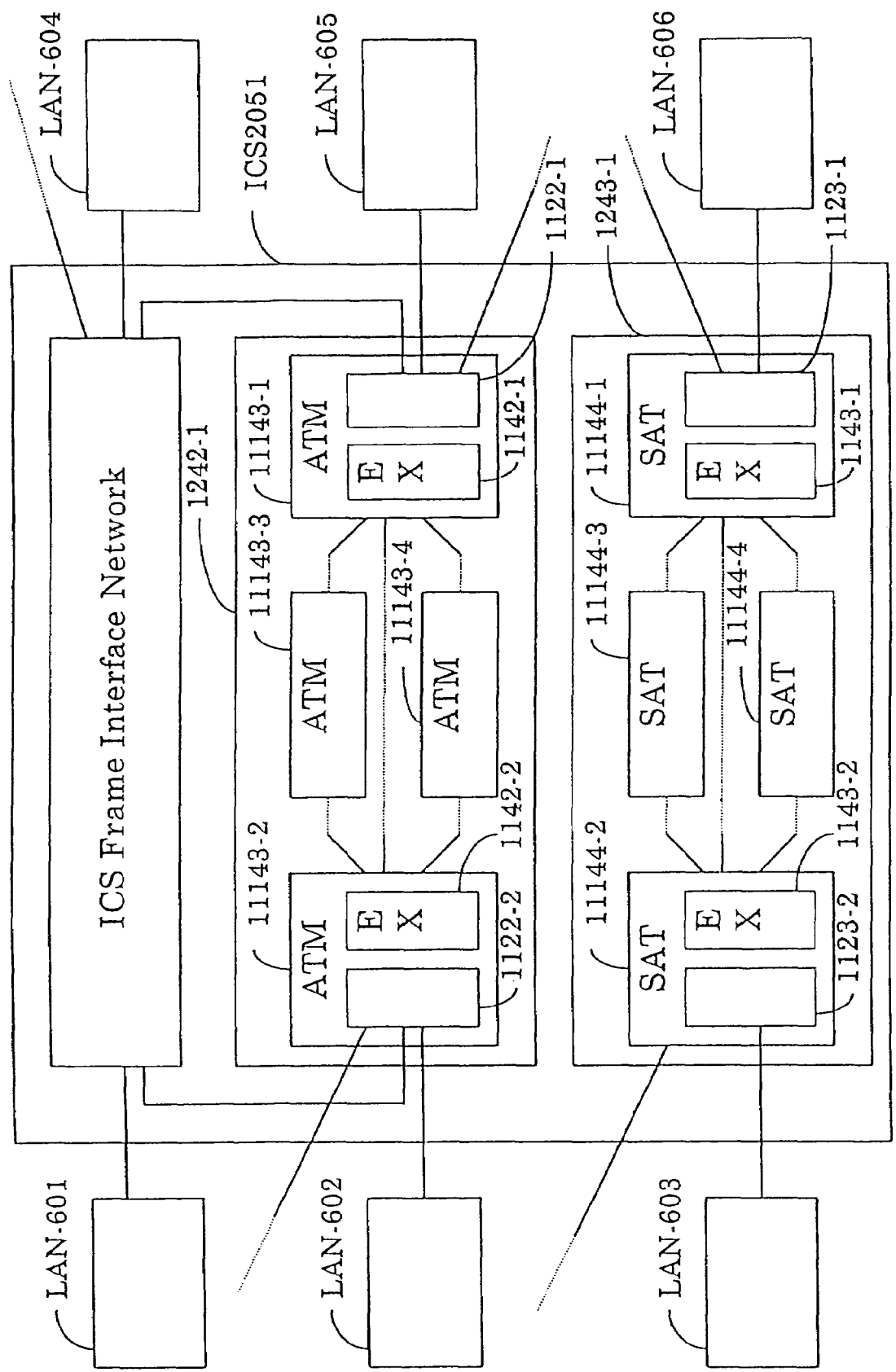
FIG. 59 is a portion of a constructional block diagram to show a twelfth embodiment according to the present invention.

In the above Embodiment-10, the X.25/ICS network converting units 1031-1 and 1031-2, FR/ICS network converting units 1032-1 and 1032-2, ATM/ICS network converting units 1033-1 and 1033-2, satellite communication network/ICS network converting units 1034-1 and 1034-2 are each located within relay networks, i.e., within the X.25 network 1040, FR network 1041, ATM network 1042 and satellite communication network 1043, with the access control apparatuses 1010-1 and 1010-2 not being provided within the X.25 network, FR network, ATM network and satellite communication network. Conversely, as shown in FIGS. 58 and 59, with the Embodiment-12, the access control apparatuses 1120-1, 1120-2, 1121-1, 1121-2, 1122-1, 1122-2, 1123-1 and 1123-2 are each located within the relay networks, i.e., within the X.25 network 1240-1, FR network 1241-1, ATM network 1242-1 and satellite communication network 1243-1. That is, while with the Embodiment-10, a conversion from the ICS user frames to the ICS network frames and a reverse conversion thereof based on the administration by the conversion table was performed within the access control apparatuses set outside of each relay network, in the present example, a conversion from the ICS user frames to the ICS network frames (ICS encapsulation) and a reverse conversion thereof (ICS reverse encapsulation) based on the administration by the conversion table is performed within each of the aforementioned networks, i.e., within the X.25 network 1040, within the FR network 1041, within the ATM network 1042 and within the satellite communication network 1043.

Embodiment-13

Connection of Relay Network to Relay Apparatus

Figure 60:
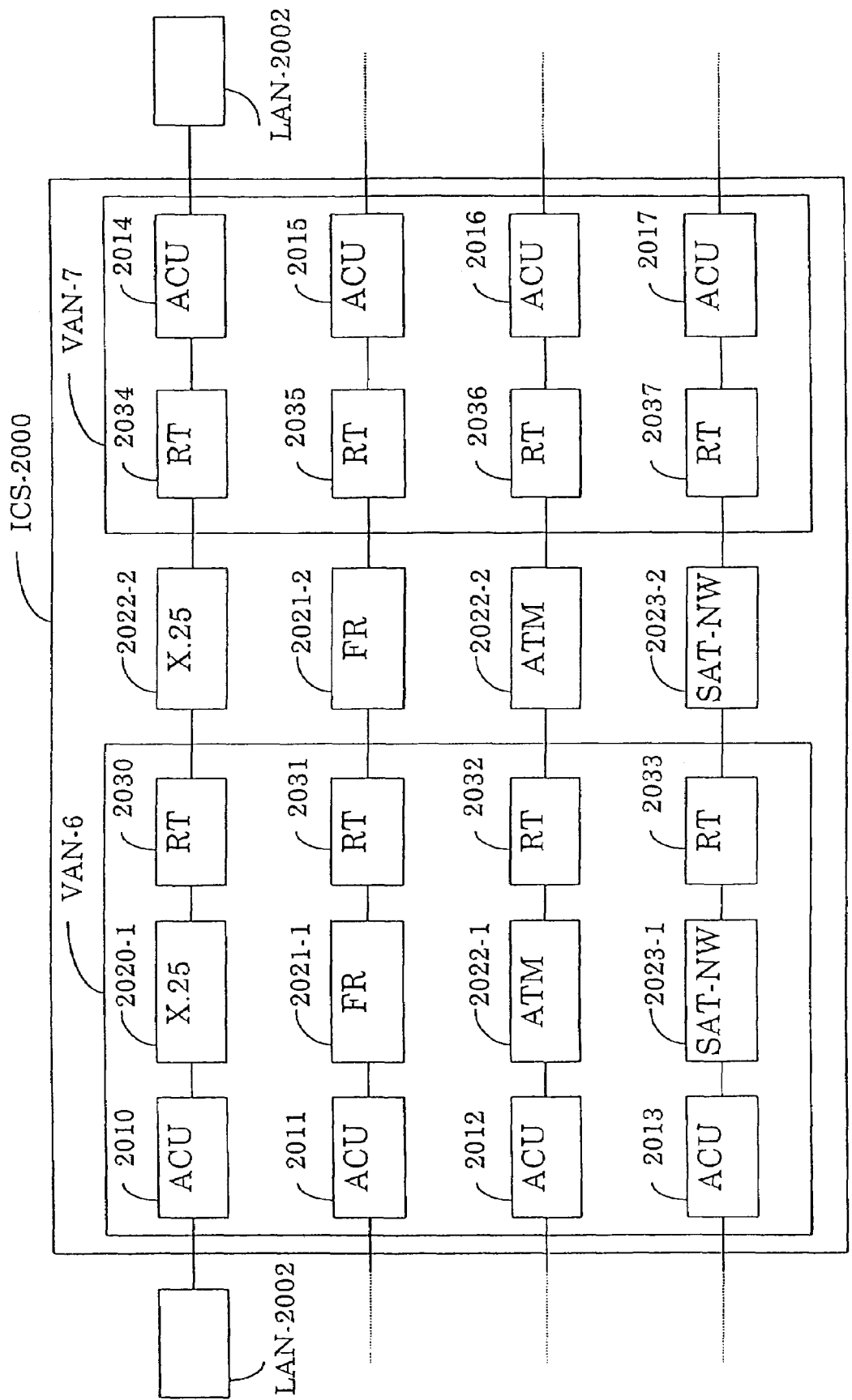
FIG. 60 is a portion of a constructional block diagram to show a thirteenth embodiment (the access control apparatus connected with the relay network) according to the present invention.

In the above Embodiment-10, the X.25 network 1040, FR network 1041, ATM network 1042 and satellite communication network 1043 are each connected to the access control apparatuses 1010-1 and 1010-2, but are not connected to relay apparatuses. Conversely, as shown in FIG. 60, with the Embodiment-13, the X.25 network 2020-1 is connected to the access control apparatus 2010 and the relay apparatus 2030, the FR network 2021-1 is connected to the access control apparatus 2011 and the relay apparatus 2031, the ATM network 2022-2 is connected to the access control apparatus 2012 and the relay apparatus 2032, and the satellite communications network 2023-1 is connected to the access control apparatus 2013 and the relay apparatus 2033, and, further, the X.25 network 2020-1 is connected to the relay apparatuses 2030, 2034 and 2035, the FR network 2021-2 is connected to the relay apparatuses 2031 and 2035, the ATM network 2022-2 is connected to the relay apparatuses 2031, 2032 and 2036, and the satellite communications network 2023-2 is connected to the relay apparatus 2033, 2036 and 2037. That is, in the present embodiment, the access control apparatuses are arranged such that the X.25 network 2020-1 and 2020-2, the FR network 2021-1 and 2021-2, the ATM network 2022-1 and 2022-2, and the satellite communication network 2023-1 and 2023-2 are each connected to relay apparatuses.

Embodiment-14

Case where the Access Control Apparatus is Provided Outside of the ICS

Figure 61:
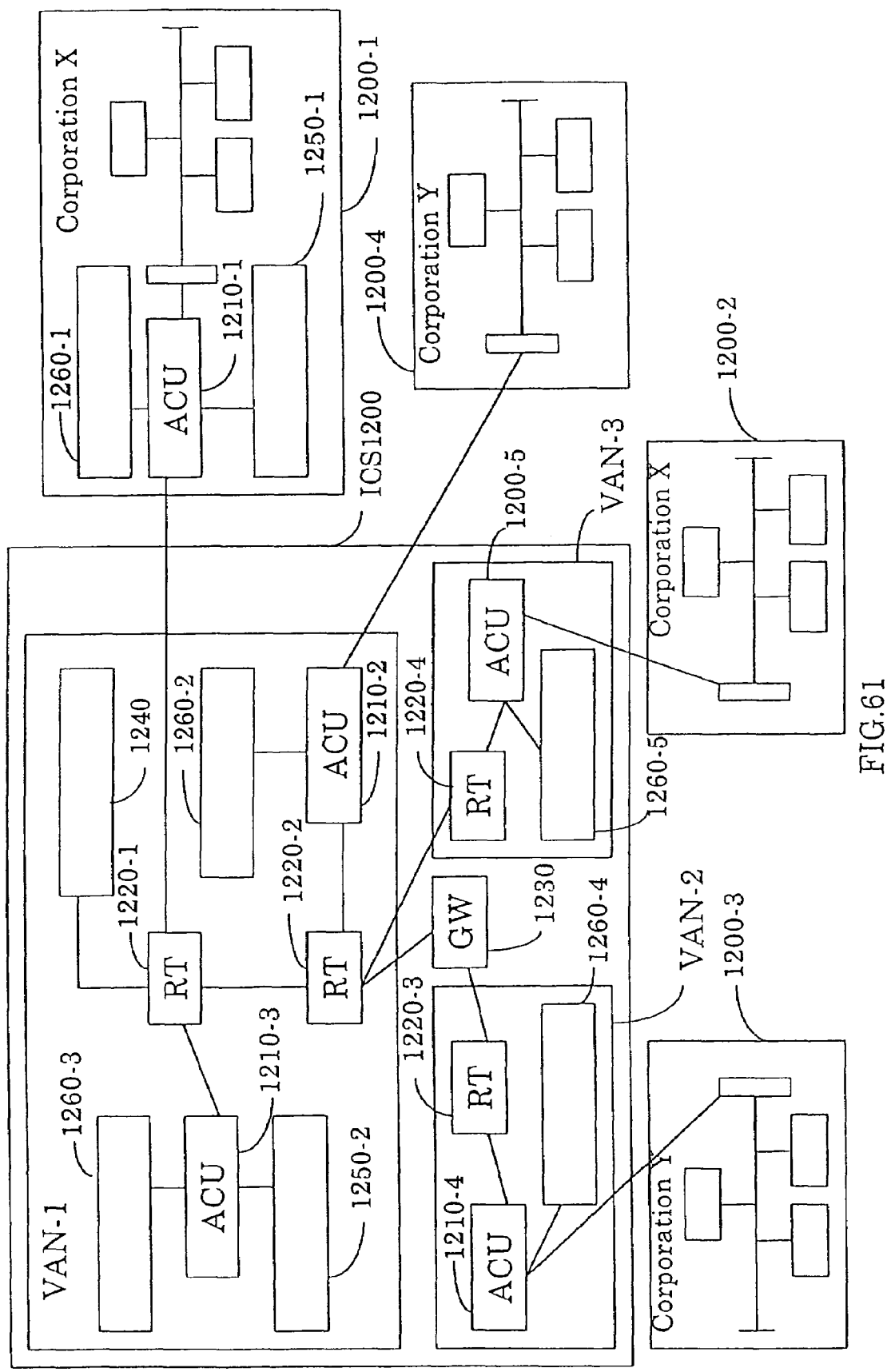
FIG. 61 is a portion of a constructional block diagram to show a fourteenth embodiment (provision of access control apparatuses outside of the ICS) according to the present invention.

FIG. 61 shows a 14th embodiment according to the present invention, with the access control apparatus 1210-1 being provided outside of the ICS 1200, i.e., within the LAN-1200 of the corporation X. Accordingly, the ICS address administration server 1250-1 and the ICS network server 1260-1 are also located outside of the ICS 1200, i.e., within the LAN 1200-1. The access control apparatus integrating administration server 1240 is located inside of the ICS 1200, The access control apparatus integrating administration server 1240 has functions of communicating and exchanging information with the access control apparatus 1210-1, the ICS network administration server 1250-1 and the ICS network server 1260-1, using the ICS network communication function. At a time that the VAN operator enters into contract with the corporation X, and connects the user communication line to the ICS 1200, the functions of the access control apparatus integrating administration server 1240 are used to write data in the conversion table within the access control apparatus 1210-1. Also, the ICS address administration server 1250-1 and the ICS network server 1260-1 can each use respective ICS network server communication function to communicates with the ICS address administration server 1250-2 and the ICS network server 1260-2 within the ICS 1200. Since the present invention is configured thus, a user terminal within the LAN 1200 can perform the intra-corporation communication and the inter-corporation communication, as described with the above Embodiment-1. Also, it is clearly understood that the intra-corporation communication and the inter-corporation communication can be conducted with the user terminal as described above, even in the event that the ICS address administration server 1250-1 and the ICS network server 1260-1 are located within the ICS 1200.

Embodiment-15

Speed Class and Degree of Priority

<<Configuration>>

Figure 62:
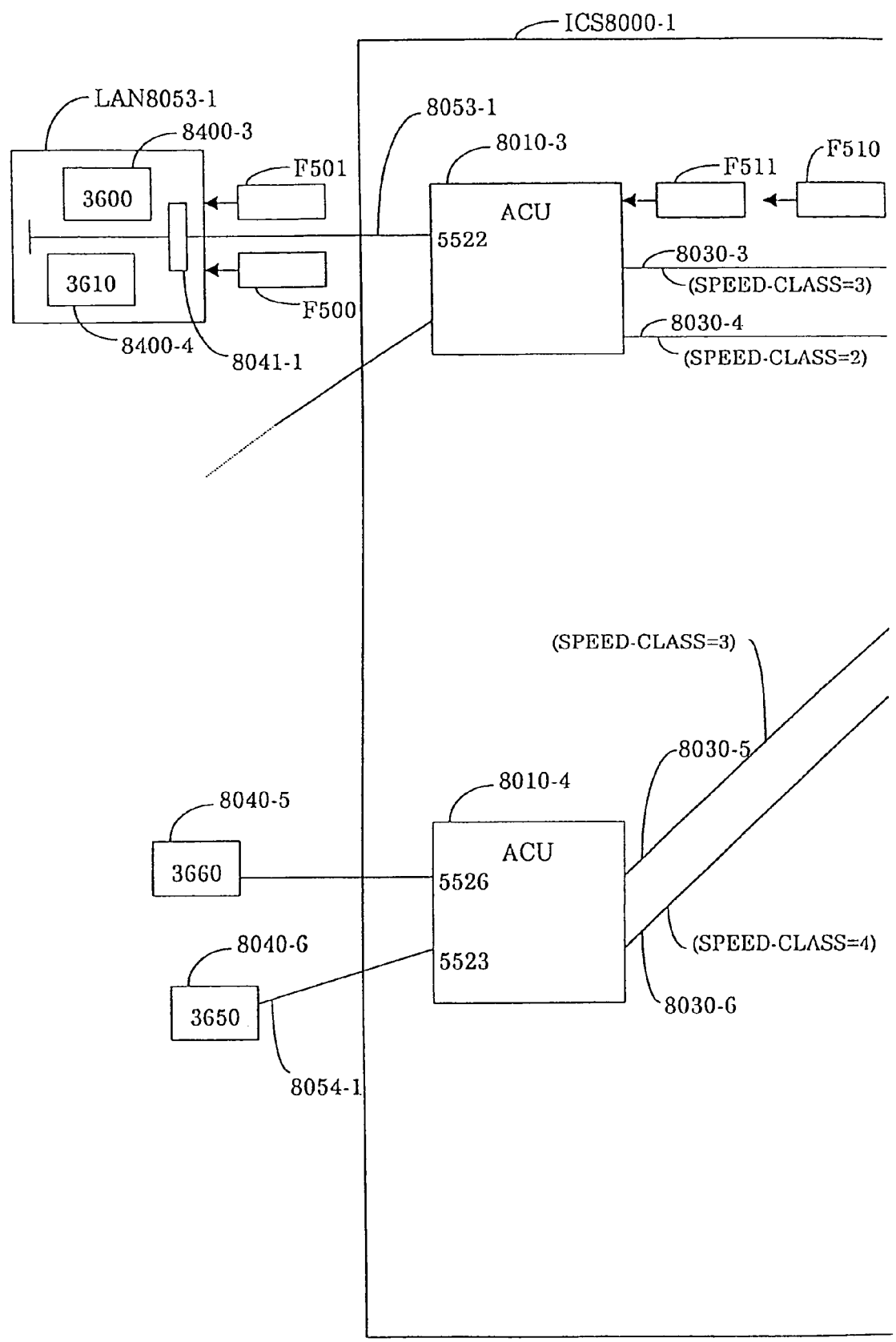
FIG. 62 is a portion of a construction block diagram to show a fifteenth embodiment according to the present invention.
Figure 63:
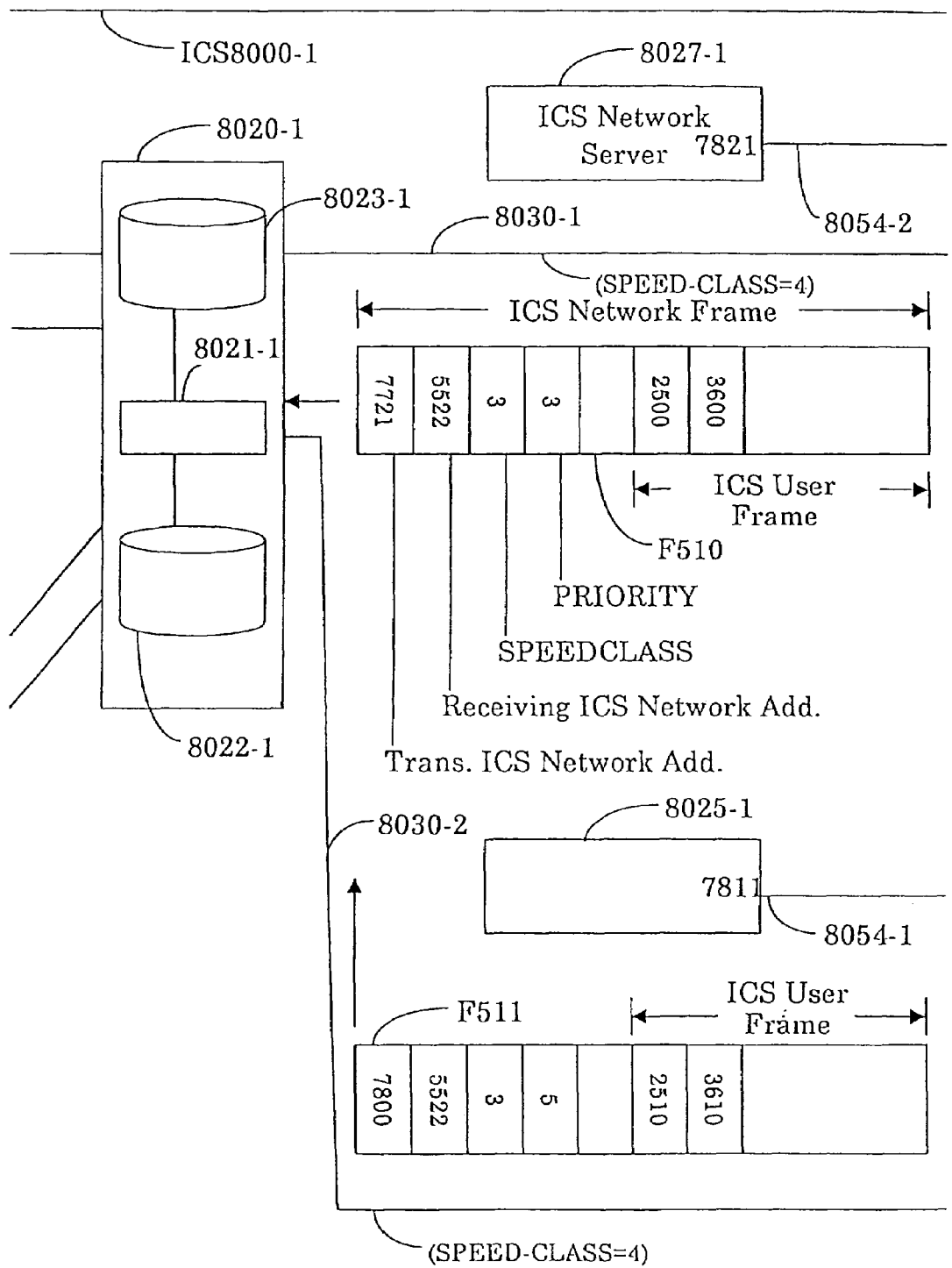
FIG. 63 is a portion of a construction block diagram to show a fifteenth embodiment according to the present invention.
Figure 64:
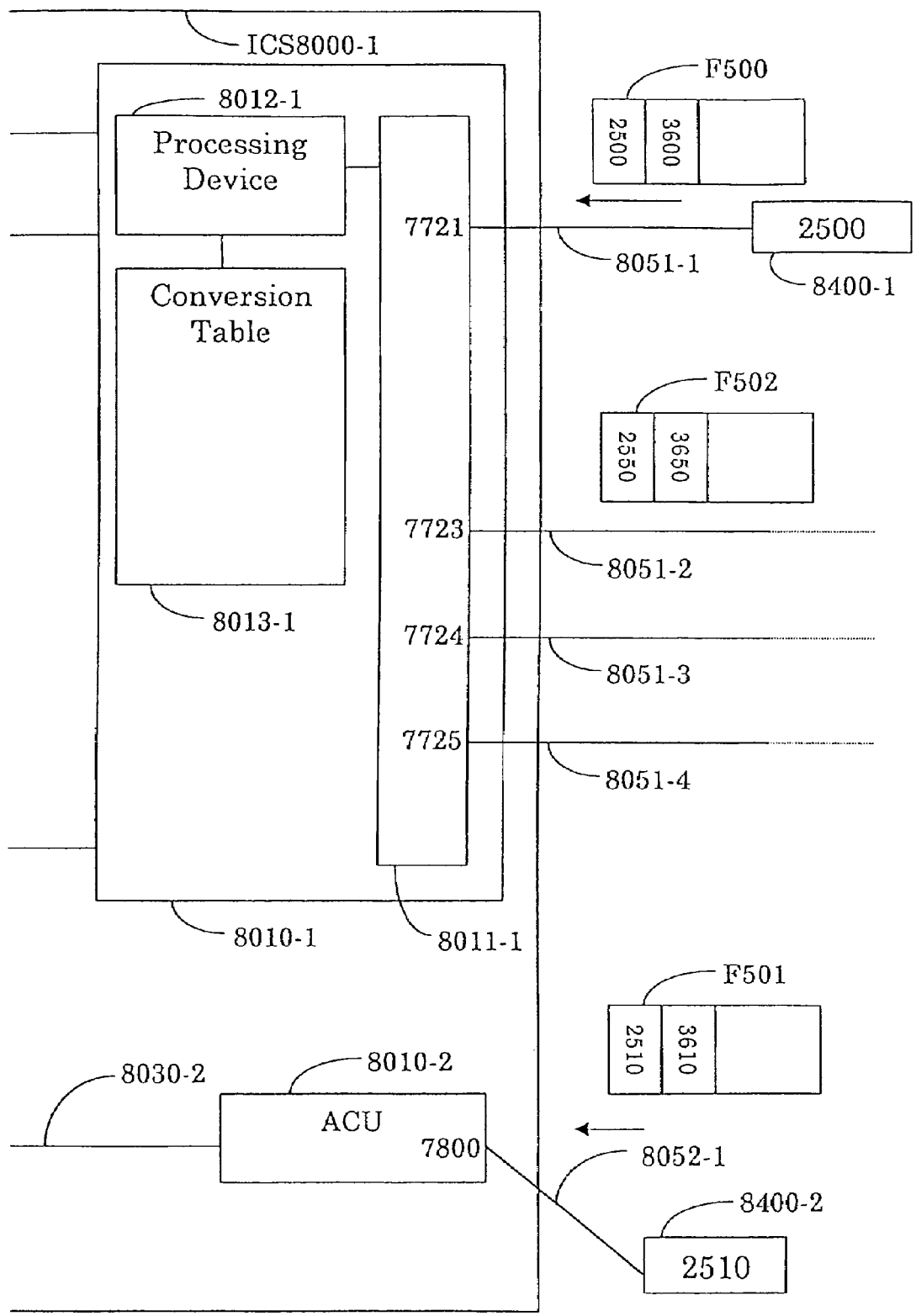
FIG. 64 is a portion of a construction block diagram to show a fifteenth embodiment according to the present invention.

As shown in FIG. 62 through FIG. 64, the ICS 8000-1 includes access control apparatuses 8010-1, 8010-2, 8010-3 and 8010-4, relay apparatus 8020-1, ICS address administration server 8025-1 and ICS network server 8027-1, these apparatuses being connected by ICS network communication lines 8030-1, 8030-2, 8030-3, 8030-4, 8030-5 and 8030-6 which transfer ICS network frame. The line unit 8011-1, processing device 8012-1 and conversion table 8013-1 are all provided within the access control apparatus 8010-1. Connected to the plurality of ICS logic terminals in the line unit 8011-1 are ICS logic communication lines 8051-1, 8051-2, 8051-3 and 8051-4, these each being provided with ICS network addresses "7721", "7723", "7724" and "7725". Speed classes are given to the ICS communication lines within the ICS 8000-1, indicating the speed of transferring the ICS network frames. For example, the speed class of the ICS communication lines 8030-1, 8030-2 and 8030-6 are all "4", the speed class of the ICS communication lines 8030-3 and 8030-5 are each "3", and the speed class of the ICS communication line 8030-4 is "2". An example of the conversion table 893-1 is shown in FIG. 65. The speed class is determined by a standard with in the same as the speed class registered within the conversion table 8013-1. An ICS network address "7811" is provided to the ICS address administration server 8025-1, and an ICS network address "7821" is provided to the ICS address administration server 8027-1, these being connected to the access control apparatus 8010-1 by the ICS network communication lines 8054-1 and 8054-2.

The user 8400-1 which is an ICS communication terminal has an ICS user address "2500", is connected to the line unit 8011-1 via the ICS logic communication line 8051-1; the user 8400-2 which is an ICS communication terminal has an ICS user address "2510", is connected to the line unit 8010-2 via the ICS logic communication line 8052-1; the user 8400-3 which is an ICS communication terminal has an ICS user address "3600", and the user 8400-4 which is an ICS communication terminal has an ICS user address "3610", these being connected to the line unit 8010-3 via the gateway 8041-1 and the ICS logic communication line 8053-1, respectively.

The method for registering the ICS network address and the ICS user address with the conversion table 8013-1 is the same as with the aforementioned Embodiments-1 and -2, with the points differing therewith being as follows: the speed registered in the conversion table 113-1 in the Embodiment-1 is deleted, and instead, a speed class and degree of priority are registered; and the speed class and degree of priority are stored in the address administrating server 8025-1 along with the corresponding the ICS user address, as part of the address-related information.

The speed class is a system where the communication speed is represented with numeric values or the like, instead of with units of speed. For example, the communication speed of 64 Kbps is Class 1, the communication speed of 128 Kbps is Class 2, and so forth, with the communication speed of 500 Mbps being Class 7. The greater the number for the communication class is, the greater the speed. FIG. 66 shows an example of correlation between the communication speed and the speed class, but there is no need to make the speed class system a 7-class system from "1" to "7". This may be, for example, finely divided into a 20-class system, in accordance with progress in technology. Also, there is not need for the communication speed to accurately match the physical communication speed of the ICS network lines within the ICS 8000-1, rather, the system may be made to correspond with 25% of the physical communication speed, giving some leeway with the communication speed. The degree of priority is represented in numeric values, on an 8-tiered system, for example, representing the order of priority compared within a single speed class for when sending the ICS network frames from the access control apparatus or the relay apparatus to the ICS network communication line. The greater numeric value representing the degree of priority, the higher the priority. For example, in the event that the relay apparatus receives two ICS network frames F510 and F511 at almost the same time, and the speed class of the two frames is the same value "3", the degree of priority of the ICS network frame F510 is "3", and the degree of priority of the ICS network frame F511 is "5", the system sends the ICS network frame F511 with higher priority first.

In the present Embodiment-15, e.g., the ICS network communication lines 8030-3 and 8030-4 are "in the same communication channel" from the relay apparatus 8020-1 toward the access control apparatus 8010-3, and the ICS network communication lines 8030-5 and 8030-6 are "in the same communication channel" from the relay apparatus 8020-1 toward the access control apparatus 8010-4. The communication line may be headed toward the relay apparatus from the access control apparatus, or may be headed from one relay apparatus toward another relay apparatus connected with the ICS network communication line. A plurality of ICS network communication lines of the same speed class may be set within the same channel, and in this case, the same speed class may be in the same ICS network communication line.

<<Operation>>

Figure 67:
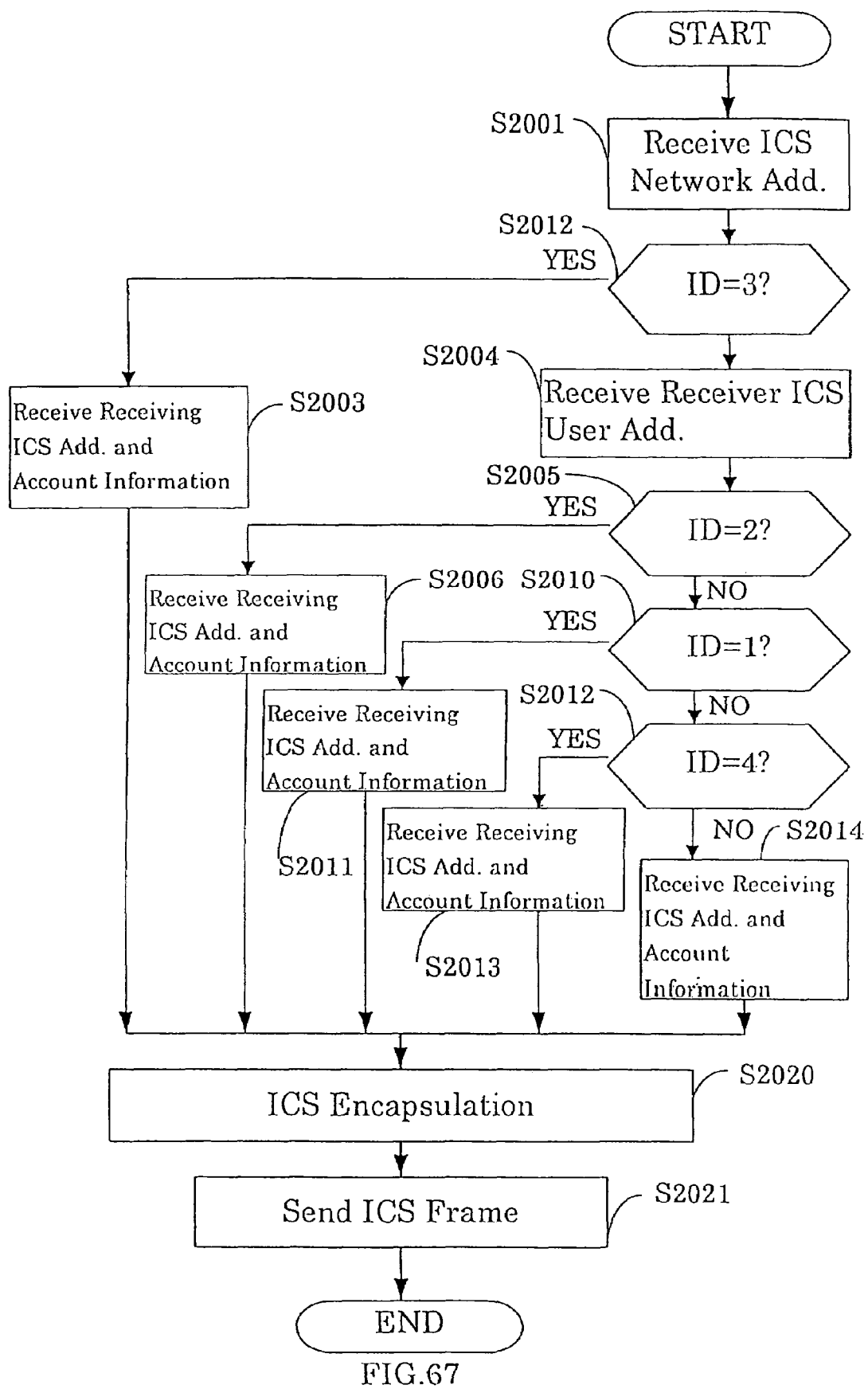
FIG. 67 is a flowchart to show an example of operation of the fifteenth embodiment.
Figure 68:
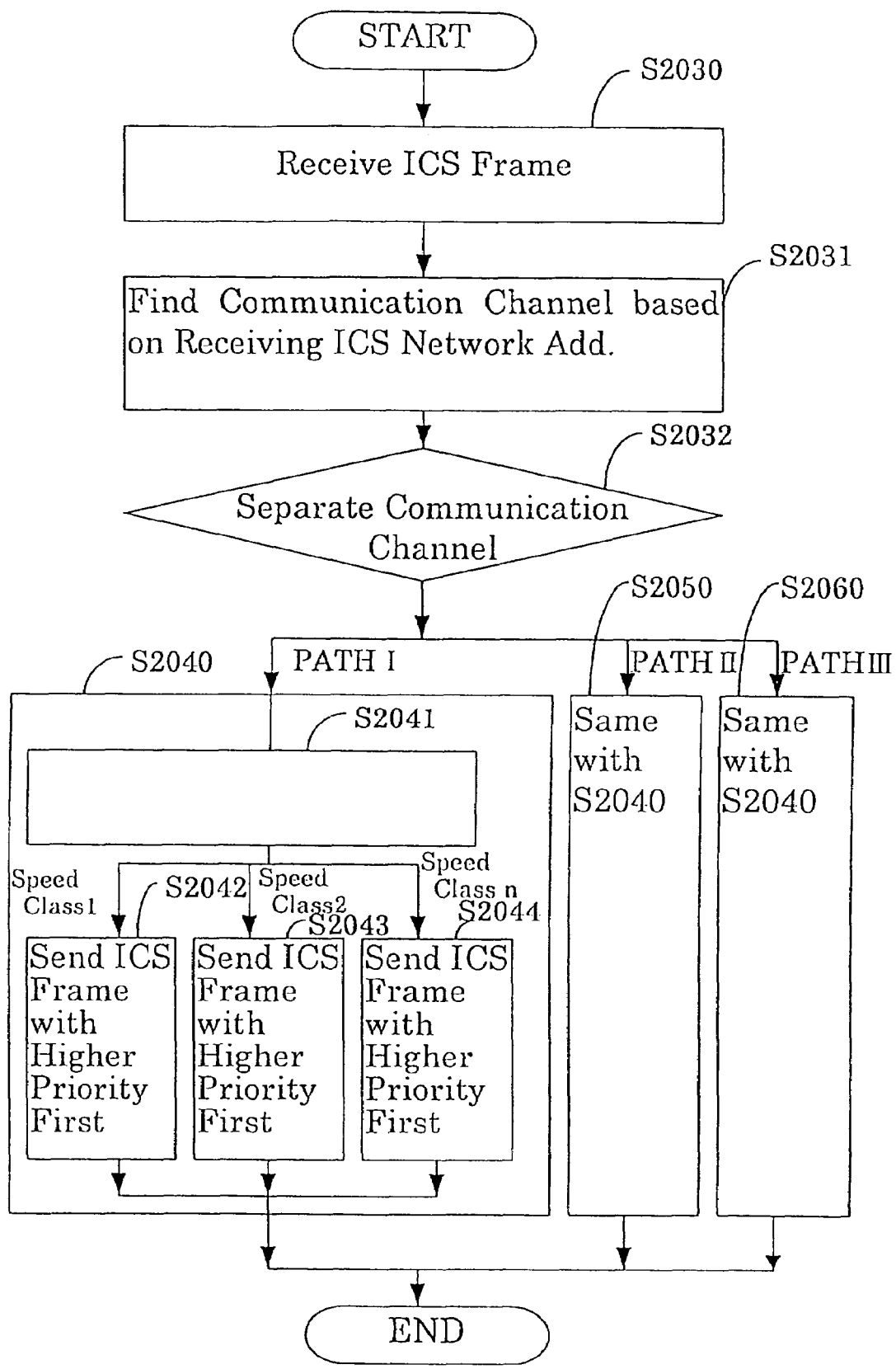
FIG. 68 is a flowchart to show an example of operation of the fifteenth embodiment.

This operation will now be described with reference to the flowcharts in FIGS. 67 and 68.

The user 8400-1 sends the ICS user frame F500 with the sender ICS user address "2500" and the receiver ICS user address "3600" to the ICS logic communication line 8051-1. The processing device 8012-1 of the access control apparatus 8010-1 receives the ICS user frame F500 from the ICS logic terminal with the ICS network address "7721" of the line unit 8011-1, and at the same time, obtains the ICS network address "7721" (Step S2001), and checks whether the ICS network address "7721" has the request identification thereof registered in the conversion table 8013-1 as "3" (virtual dedicated line connection) or not (Step S2002). In this case, the registration has not been made as such, so next, the receiver ICS network address "3600" written in the ICS user frame F500 is obtained in accordance with the ICS network address "7721" (Step S2004), and checks whether the ICS network address "3600" has the request identification thereof registered in the conversion table as "2" (inter-corporation communication) or not (Step S2005). In this case, the registration has been made, so next, the receiving ICS network address "5522" is obtained from the conversion table 8013-1 as preparation to perform the ICS encapsulation, and accounting-related information, namely "speed class "3" and "degree of priority "3", is obtained from the conversion table 8013-1 (Step S2006). Next, the ICS encapsulation is performed by generating an ICS network frame F510 written therein with "speed class "3" and degree of priority "3" (Step S2020), which is sent to the ICS network communication line 8030-1 (Step S2021).

Although the above explanation has been made with regard to the inter-corporation communication wherein the request identification of the ICS network frame is set at "2" (inter-corporation communication), in the event that the request identification thereof is "3" (virtual dedicated line connection), the receiving ICS network address, speed class, degree of priority and the like are obtained from the conversion table 8013-1, and further, information relating to account is obtained (Step S2003). In the event that the request identification thereof is "1" (intra-corporation communication), the receiving ICS network address, speed class, degree of priority and the like are obtained from the conversion table 8013-1, and further, information relating to account is obtained (Step S2011). In the event that the request identification thereof is "4" (communication to an ICS network server), the receiving ICS network address and the like are obtained from the conversion table 8013-1, and further, information relating to account is obtained (Step S2013), following which this is sent to the ICS network server 8027-1 after encapsulation.

The ICS network frame F510 formed thus reaches the relay apparatus 8020-1 via the ICS network communication line 8030-1. Let us say that now, another ICS network frame F511 reaches the relay apparatus 8020-1 via the ICS network communication line 8030-2, at almost the same time. This ICS network frame F511 has been sent from the user 8400-2 as an ICS user frame F501, has arrived at the access control apparatus 8010-2 via the ICS logic communications line 8052-1, been ICS encapsulated at that point to become the ICS network frame F511 there, and reached the relay apparatus 8020-1 by being sent via the ICS network communication line 8030-2. Upon receiving the ICS network frame F510 and the ICS network frame F511 (Step S2030), the relay apparatus 8020-1, under the administration of the processing device 8021-1, first checks the relay table 8022-1 to decide which network communication line to use for the ICS network frames F510 and F511, i.e., finds communication channels (Step S2031), and separates these by channel (Step S2032). With the present Embodiment-15, both of the two ICS network frames F510 and F511 have a transmission destination of the communication channel from the relay apparatus 8020-1 to the control apparatus 8010-3, and two ICS network communication lines exist, namely, the ICS network communication line 8030-3 and 8030-4. Next, the relay apparatus 8020-1 reads the speed class described in the control field of the two ICS network frames F510 and F511, and separates the ICS network frames by speed class (Step S2041). Hereafter, the procedures are performed separately for each separated speed class.

In the case of the present Embodiment-15, the speed class of the two ICS network frames F510 and F511 are both "3". Next, with the ICS frames of the same speed class, the degree of priority described in the control portion of the two ICS network frames is read for each, and the ICS frame with the higher priority is sent first (Step S2042). If the degree of priority is the same, either may be sent first. As a result of the above process, the relay apparatus 8020-1 sends the ICS network frame F511 first over the ICS network communication line 8030-3, and subsequently sends the ICS network frame F510 over the ICS network communication line 8030-3.

Incidentally, in the above procedures, in the event that the only ICS network communication lines available are of a communication speed slower than the speed class described in the control field of the ICS network frame F510, information regarding slower service due to slower speeds, i.e., the sender ICS user address and the receiver ICS user address to be described in the relevant ICS network frame, the time to communications service (year, month, day, hour, minute, second), etc., are described in the relay operating file 8023-1. The recorded contents of the relay operating file 8023-1 are notified to the user according to requests of the ICS 8000-1.

According to the above procedures, of the two ICS network frames F511 and F510, the ICS network frame F511 with the higher priority leads time-wise, and reaches the access control apparatus 8010-3, having been transferred through the ICS network communication line 8030-3. The ICS network frame F511 is subjected to the ICS reverse-encapsulation, becomes the ICS network frame F501, and reaches the user 8400-4 with the ICS user address "3610" via the ICS logic communication path 8053-1. The ICS network frame F510 is subjected to the ICS reverse-encapsulation, becomes the ICS network frame F500, and reaches the user 8400-3 with the ICS user address "3600" via the ICS logic communication path 8053-1.

Next, options will be described regarding how to user the degree of priority. In the event that the speed class and the degree of priority recorded in the conversion table 8013-1 are to be copied to the ICS network frame at the point of the ICS encapsulation, the processing device 8012-1 checks the length written in the ICS user frame control field which is to be processed, and only in the event that the ICS user frame is equal to or shorter than the predetermined value (e.g., 256 bytes) for example, a value with value representing the degree of priority incremented by "1" is copied to the ICS network frame. Thus, in the limited case of short ICS user frames, the ICS user frames can be transferred within the ICS 8000-1 with priority. This, the ICS 8000-1 operator is able to easily realizes service wherein the priority of short ICS user frames is raised, i.e., the communication service with raised communication charges. As for the users, the short ICS user frames increases the surety of throughput. Whether or not the option is used is determined separately for each access control apparatus, for example.

A method may be employed wherein only the speed class is implemented, and the above method is executed without the degree of priority, i.e., with all ICS user frames at the same degree of priority. With other embodiments, the conversion table 8013-1 does not include the sender ICS user address (intra-corporation and inter-corporation). In these cases as well, there is no change, since the flowchart shown in FIG. 67 does not refer to the sender ICS user address, anyway.

Embodiment-16

Assignment of Electronic Signature to ICS User Frame

An embodiment will now be described wherein ICS user frames are electronically signed, and wherein there is proof that an ICS user frame has passed through an access control apparatus. Also, the embodiment will now be described wherein the ICS user frames are encrypted upon request. First, description will be made regarding the electronic signature technology used in the present embodiment.

In order for an electronic signature to be used, there is a signer to form the electronic signature and a verifier to verify the electronic signature. The signer simultaneously forms a pair of keys, signature key KSa and verification key KPa. The signer keeps the signature key KSa undisclosed, and discloses the verification key KPa one way or another. The signer "a" uses the secret signature key KSa held by the signer "a" lone to form an electronic signature a which dependent on data m and the signature key KSa. This is shown in the following expression (1)

$$\sigma = \text{SIGN}(KSa, h(m)) \tag{1}$$

Now, "SIGN" is a signature function representing the function of the signature, with the function y=h (m) being a hash function for electronic signing having a function for compressing the data m into short data. The verifier "b" uses the disclosed verification key KPa and verifies the authenticity of the electronic signature σ, according to the following:

$$v = \text{TEST}(\sigma, KPa, h(m)) \tag{2}$$

Then in the event that v=1, this indicates that the electronic signature σ and the data m are both correct, that the electronic signature σ and the data m have not been re-written following generation of the electronic signature a, and that there are been no unauthorized tampering. In the event that v=0, this indicates that the either one or both of the electronic signature σ and the data m are not correct. The verification key KPa is widely disclosed by a public key information service forms which performs services such as operational reports and information of public keys, or by general advertisements. The art for forms the signature function SIGN which makes calculation of the signature key KSa practically impossible even with disclosure of the verification key KPa, is of public knowledge.

Next, the procedure for assigning an electronic signature to the ICS user frame will be described. The objects of the electronic signature are the following: a "time/location parameter P1" representing conditions relating to the time or place of providing the electronic signature, i.e., the year/month/day/hour/minute/second of electronic signing, the operator of the access control apparatus, or the identification code of the access control apparatus, and the "signature function parameter P2" representing the signature function SIGN, the type of the hash function h(m), or the length of the signature key. In a numerical expression, this is expressed in the following expression (2):

$$\sigma=SIGN(KSa, h(m)) \quad (3)$$

wherein m=UF||P1||P2.

Figure 69:
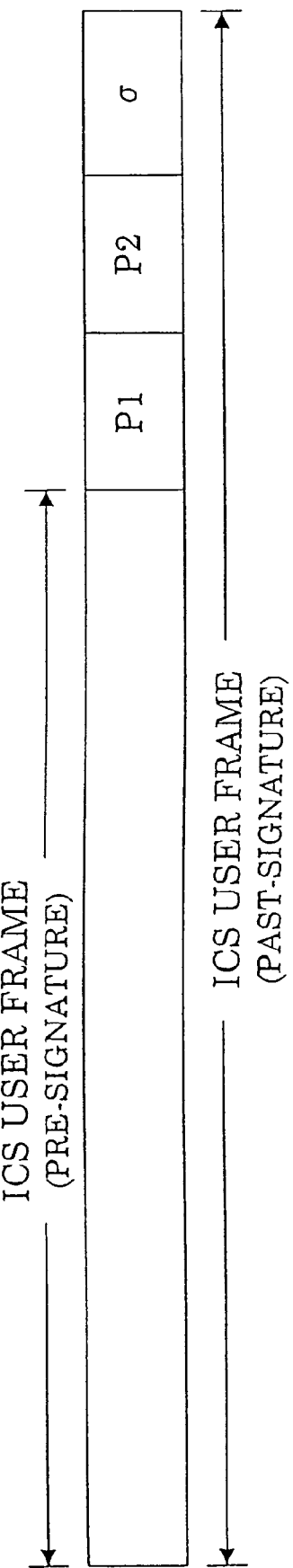
FIG. 69 is a diagram to show the ICS user frame after the electronic signature assignment.
Figure 70:
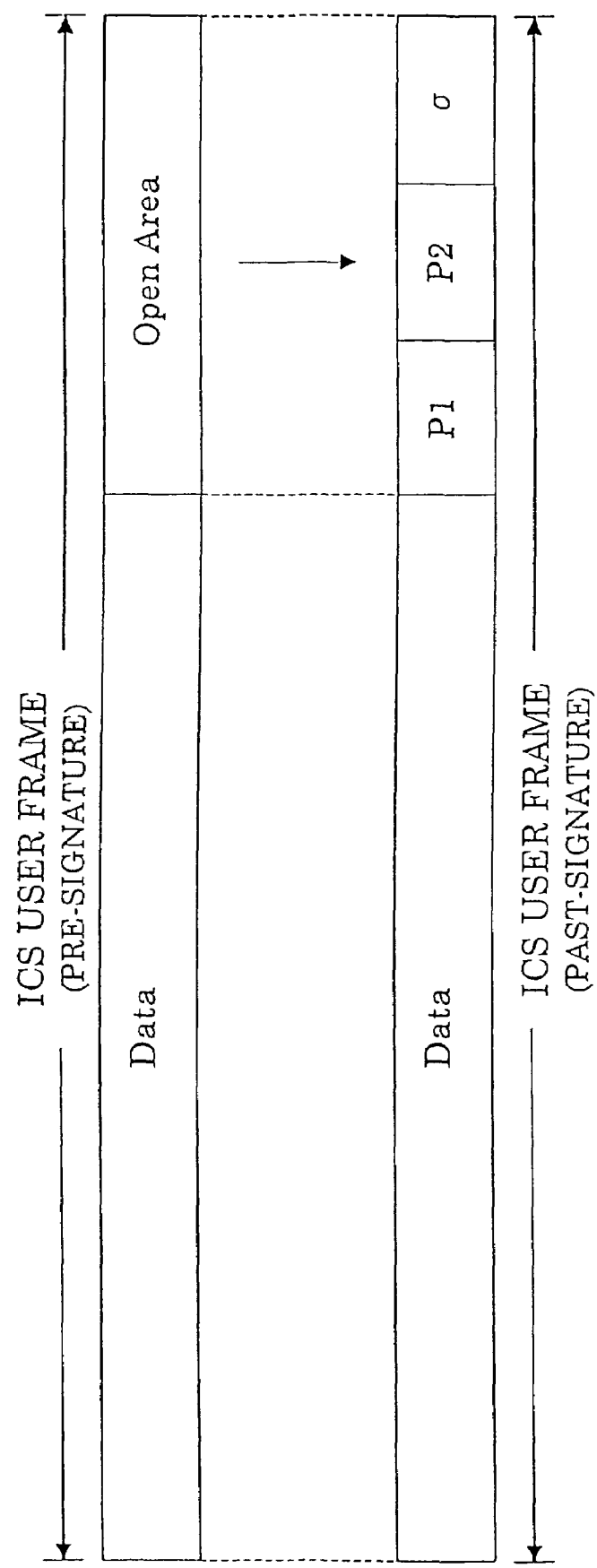
FIG. 70 is a diagram to show the ICS user frame before the electronic signature assignment.

Now, UF represents the ICS user frame before the ICS encapsulation, or the ICS user frame restored to the original form after the ICS reverse-encapsulation. The user on the receiving side receives the ICS user frame UF, the time/location parameter P1, the signature function parameter P2, and electronic signature σ to the ICS user frame on the receiving side as UF||P1||P2||σ. This is illustrated in FIG. 69. Further, there is a method wherein the area for writing the parameters P1 and P2, and the electronic signature σ within the ICS user frame UF is left blank, as shown in FIG. 70. In this case, the electronic signature σ is generated such as can be represented as follows, with the open area in the ICS user frame UF represented by "Data":

$$\sigma=SIGN(KSa, h(m)) \quad (4)$$

wherein m=Data||P1||P2.

Verification of the signature is performed as follows:

$$v=TEST(\sigma, KPa, h(m)) \quad (5)$$

wherein m=Data||P1||P2.

Further, in the event of the ICS user frame UF is 2048 bytes in length, for example, and the length of UF||P1||P2||σ is 2448 bytes (2048 bytes+400 bytes), there arises the necessity to re-write the field representing the frame length within the control field of the ICS user frame UF (e.g., the total-length field shown in FIG. 3) from 2048 bytes to 2448 bytes. Thus, the re-written ICS user frame is represented as FU'. In the event that such an embodiment is employed, the electronic signature σ is represented as follows:

$$\sigma=SIGN(KSa, h(m)) \quad (6)$$

wherein m=UF'||P1||P2.

Verification of the signature is performed as follows:

$$v=TEST(\sigma, KPa, h(m)) \quad (7)$$

wherein m=UF'||P1||P2.

In the present Embodiment-16, UF, P1 and P2 may be re-organized regarding the order thereof, so as to calculate, e.g., the electronic signature σ=SIGN (KSa, h (m)) as m=P1||P2||UF, and set P1||P2||UF||σ within the ICS user frame of the receiving side. In the present embodiment, the encrypting function is represented as y=ENC (K1, x), and the decrypting function is represented as x=DEC (K2, y). Here, "x" represents plaintext data, "y" represents ciphertext data, ENC represents an encryption function, DEC represents a decryption function, K1 represents an encryption key, and K2 represents a decryption key. The art of electronic signature is also called digital signature, and is described in, e.g., "New Direction in Cryptography" (paper by W. Diffie and M. E. Hellman, IEEE IT. Vol. IT-22 No. 6, pp. 644-654, 1976), and "Encryption and Information Security" (Shigeo Tsujii, 1990, Shokodo, pp. 127-138).

<<Configuration>>

Figure 71:
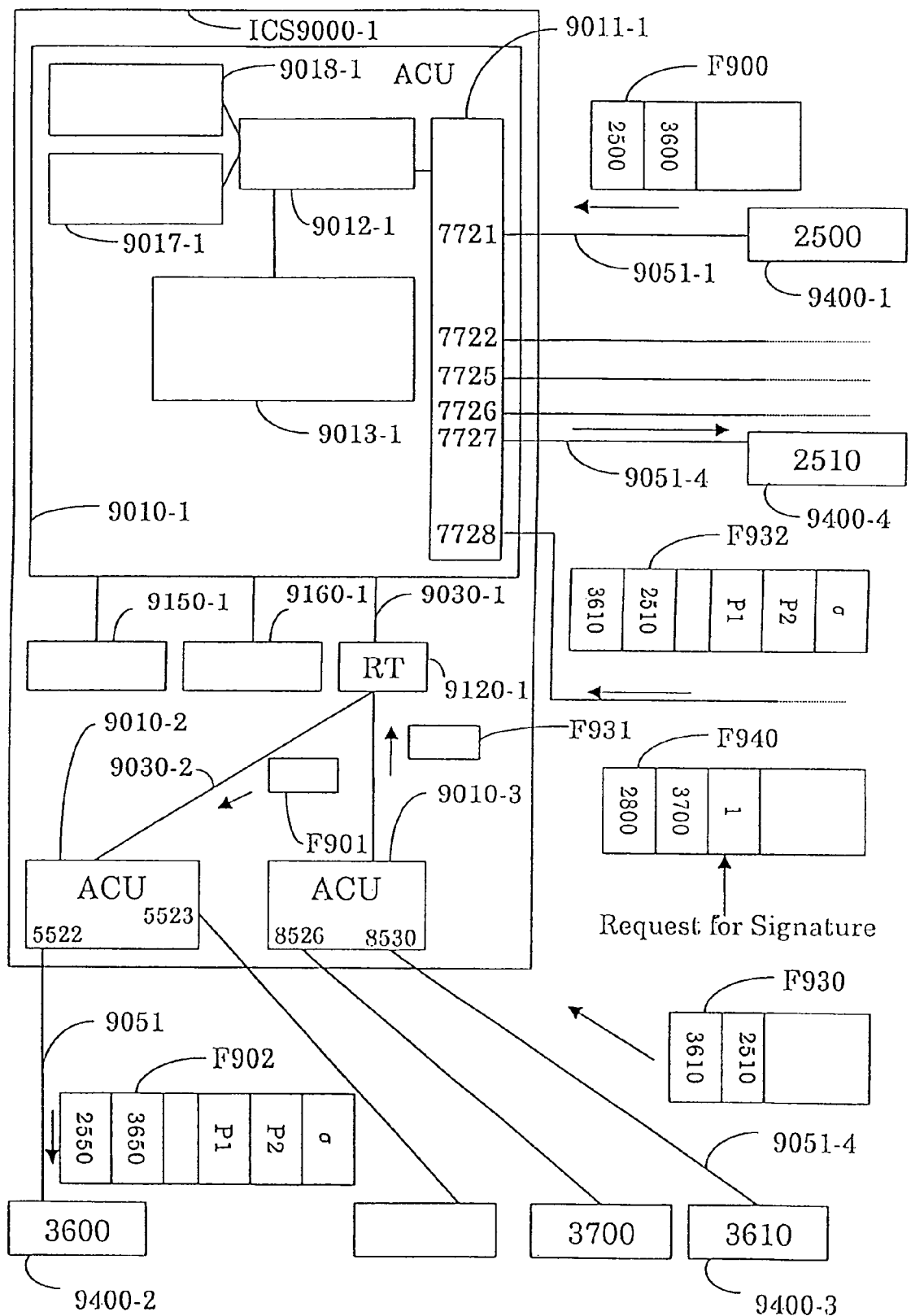
FIG. 71 is a construction block diagram to show a sixteenth embodiment according to the present invention.

As shown in FIG. 71, the ICS 9000-1 includes access control apparatuses 9010-1, 9010-2 and 9010-3, and relay apparatus 9120-1, these apparatuses being connected by ICS network communication lines 9030-1, 9030-2 and 9030-3 which transfer ICS network frames. The line unit 9011-1, the processing device 9012-1, the conversion table 9013-1 and the electronic signature unit 9017-1 are all provided within the access control apparatus 9010-1. Provided within the electronic signature unit 9017-1 are the following: program modules for realizing the signature key KSa, the verification key KPa, the electronic signature function SIGN and the hash function h (m), the time/location parameter P1, and the signature function parameter P2. Now, the signature key KSa is a secret value held by the access control apparatus 9010-1, and the electronic signature unit has the secret signature key therewithin, so there is the necessity to prevent the secret signature key from leaking out. For example, the electronic key unit may be stored inside a physically strong box, structured such that the signature key cannot be read from the outside. The plurality of ICS logic terminals of the line unit 9011-1 are provided with the ICS network addresses "7721", "7722", "7725", "7726", "7727" and "7728". An example of the conversion table 9013-1 is shown in FIG. 72.

The encryption/decryption means 9018-1 includes encryption functions, and holds the encryption key K1 and the decryption key K2. When an ICS user frame UF1 is inputted, the ciphertext UF2 is generated as UF2=ENC (K1, UF1), and when the ciphertext UF2 is inputted, the plaintext thereof is obtained as UF1=DEC (K2, UF2).

<<Operation>>

Figure 73:
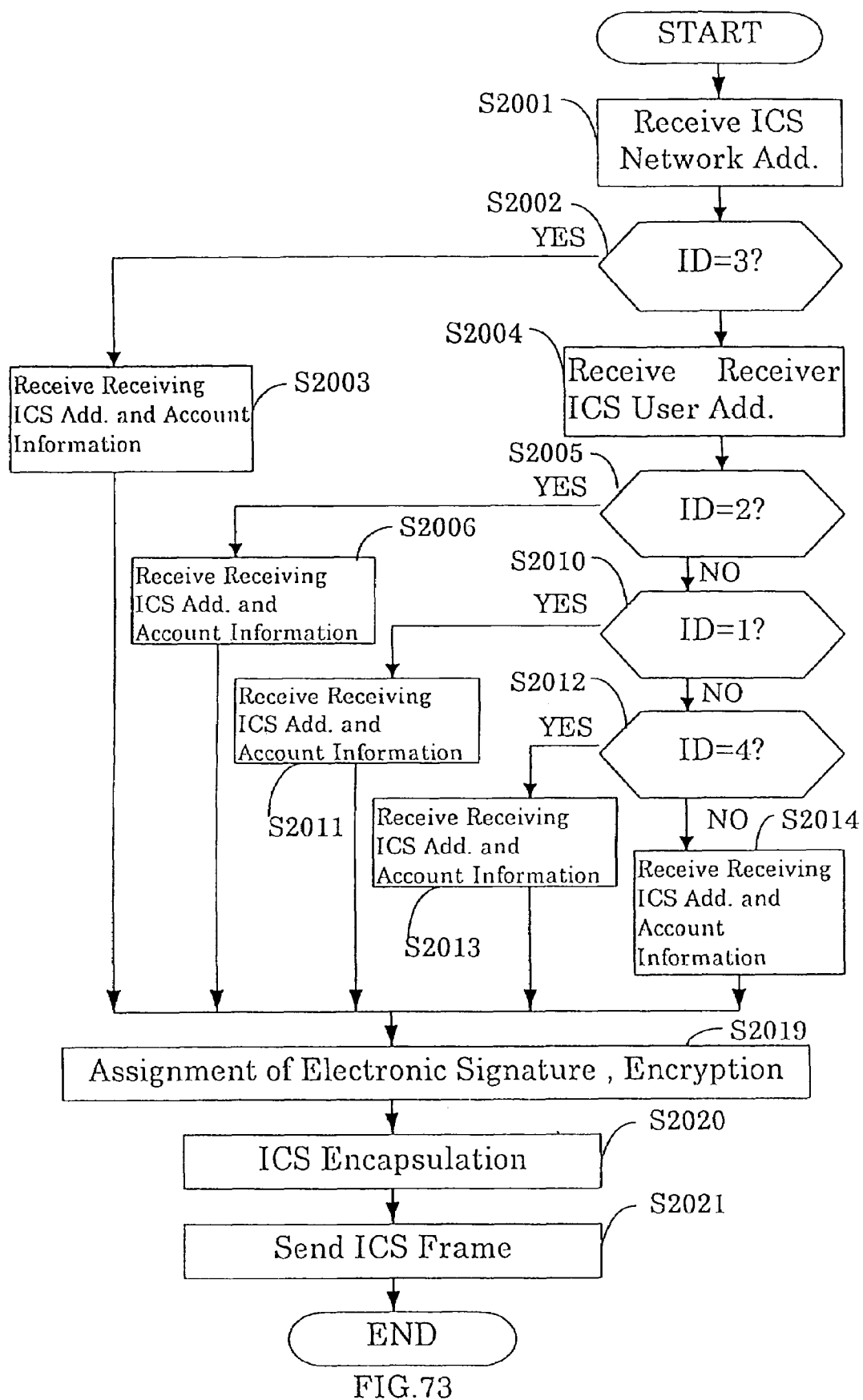
FIG. 73 is a flowchart to show an example of operation of the sixteenth embodiment.

This operation is described with reference to the flowchart shown in FIG. 73. The user 9400-1 sends the ICS user frame F900 with the receiver ICS user address "3600" to the ICS logic communication line 9051-1. The processing device 9012-1 of the access control apparatus 9010-1 receives the ICS user frame F900 from the ICS logic terminal with the ICS network address "7721" of the line unit 9011-1, and at the same time, obtains the ICS network address "7721" (Step S2001) and checks whether the ICS network address "7721" has the request identification thereof registered in the conversion table 9013-1 as "3" (virtual dedicated line connection) or not (Step S2002). In this case, the registration has not been made as such, so next, the receiver ICS network address "3600" written in the ICS user frame F900 is obtained in accordance with the ICS network address "7721" (Step S2004), and checks whether the ICS network address "3600" has the request identification thereof registered in the conversion table as "2" (inter-corporation communication) or not (Step S2005). In this case, the registration has been made, so next, the receiving ICS network address "5522" is obtained from the conversion table 9013-1 as preparation to perform the ICS encapsulation.

Next, information related to accounting for the speed class and the degree of priority is obtained from the conversion table 9013-1 (Step S2006). The value "1" is specified in the signature space in the conversion table 9013-1, and also "YES" is recorded in the space for electronic signature transmission, so the processing device 9012-1 uses the program modules for realizing the electronic signature function SIGN and the hash function h (m), the time/location parameter P1, and the signature function parameter P2 stored in the electronic signature unit 9017-1, and using the electronic signature method described above, generates an electronic signature for the ICS user frame F900, and forms a new ICS user frame (represented by UF2) (Step S2019). This is represented in an expression (8) as follows:

$$UF2 = m \| \sigma \qquad (8)$$

wherein m=F900‖P1‖P2,

σ=SIGN (KSa, h (m)).

In the above procedures, even if "1" is specified in the signature space in the conversion table 9013-1, if "NO" is recorded in the space for electronic signature transmission, the electronic signature unit 9017-1 does not operate and an electronic signature is not provided.

Next, since the encryption class is specified as "1", the ICS user frame UF2 is encrypted by the encryption/decryption means 9018-1 to form a new user frame UF3 (=ENC (K1, UF2)). In the event that the encryption class is "0", encryption is not performed.

Next, the ICS encapsulation is performed by generating an ICS network frame F901 written therein with the speed class, the degree of priority and the encryption class (Step S2020), which is sent to the ICS network communication line 9030-1 within the ICS 9000-1 (Step S2021). Although the above explanation has been made with regard to the inter-corporation communication wherein the request identification of the ICS network frame is set at "2" (inter-corporation communication), in the event that the request identification is "3" (virtual dedicated line connection), the receiving ICS network address, information relating to account and the like are obtained from the conversion table 9013-1 (Step S2003). In the event that the request identification is "1" (intra-corporation communication), the receiving ICS network address, information relating to account and the like are obtained from the conversion table 9013-1 (Step S2011), and, in the event that the request identification is "4" (communication to an ICS network server), the receiving ICS network address, information relating to account and the like are obtained from the conversion table 9013-1 (Step S2013).

The ICS network frame F901 thus generated by the above procedures reaches the access control apparatus 9010-2 through the ICS network communication line 9030-1 and the relay apparatus 9120-1, is subjected to the ICS reverse-encapsulation, becomes the ICS network frame F902, and reaches the user 9400-4 with the ICS user address "3600" via the ICS logic communication path 9051-3. Here, F902=m‖σ, m=UF1‖P1‖P2, UF1 represents the ICS user frame F900 before sending, P1 is the time/location parameter, P2 is the electronic signature parameter, a represents the electronic signature, with σ=SIGN (KSa, h (m)) holding.

<<Electronic Signature and a Decryption in ICS Reverse-Encapsulation>>

The user 9400-3 sends an ICS user frame F930 with a sender ICS user address "3610" and a receiver ICS user address "2510" to the ICS logic communication line 9051-4. The access control apparatus 9010-3 receives the ICS user frame F930, performs the ICS encapsulation using the internal conversion table, generates an ICS network frame F931 and sends it to the ICS network communication line 9030-3. The ICS network frame F931 reaches the access control apparatus 9010-1 through the ICS network communication line 9030-1 and the access control apparatus 9020-1, is subjected to the ICS reverse-encapsulation under administration of the conversion table 9013-1, and becomes the ICS user frame UF1. Since the value "1" is specified in the signature space in the conversion table 9013-1, the ICS user frame (UF1) obtained by the ICS reverse encapsulation is deciphered using the encryption/decryption means 9018-1, thus obtaining an ICS user frame UF1'. Here, UF1'=DEC (K2, UF1) holds, and in the event that the encryption class is "0", encryption is not performed.

Next, since the value "1" is specified in the signature space in the conversion table 9013-1, and also "YES" is recorded in the space for the electronic signature transmission, so the electronic signature unit 9017-1 operates, and provides the ICS user frame with the parameters P1 and P2 and the electronic signature σ, thus forming a new ICS user frame F932. This is represented as follows:

F932=m‖σ, m=UF1‖P1‖P2

$$\text{electronic signature } \sigma = \text{SIGN}(KSa, h(m)) \qquad (9)$$

and in the event that the aforementioned encryption has been performed, UF1' is used instead of UF1. In the above procedures, even if the value "1" is specified in the signature space in the conversion table 9013-1, if "NO" is recorded in the space for electronic signature transmission, an electronic signature is not provided. The ICS user frame F932 reaches the user 9400-4 with the ICS user address "2510" via the line unit 9011-1 and the ICS logic communication path 9051-4.

<<In the Case of Signature Request>>

In the event that an ICS user frame F940 with a sender ICS user address "2800" and a receiver ICS user address "3700" is inputted from the line unit 9011-1, the request identification corresponding to the ICS network address "7728" is "2", the value "0" is specified in the signature space in the conversion table 9013-1 corresponding to the receiver ICS user address "3700", and at the same time "YES" is recorded in the space for the electronic signature transmission. Then, since the value "1" is specified in the signature request space in the ICS user frame F940, the electronic signature unit 9017-1 operates, and forms a new ICS user frame provided with the parameters P1 and P2 and the electronic signature σ.

In a case that the signature space in the conversion table 9013-1 is either "0" or "1"and "NO" is recorded in the space for the electronic signature transmission, an electronic signature is not provided before the ICS encapsulation, even if the value "1" is specified in the signature request space in the ICS user frame F940. In the same way, in a case that the signature request space in the conversion table 9013-1 is either "0" or "1" and "NO" is recorded in the space for the electronic signature reception of the ICS user frame, an electronic signature is not provided after the ICS reverse encapsulation, even if the value "1" is specified in the signature space in the conversion table 9013-1.

Figure 74:
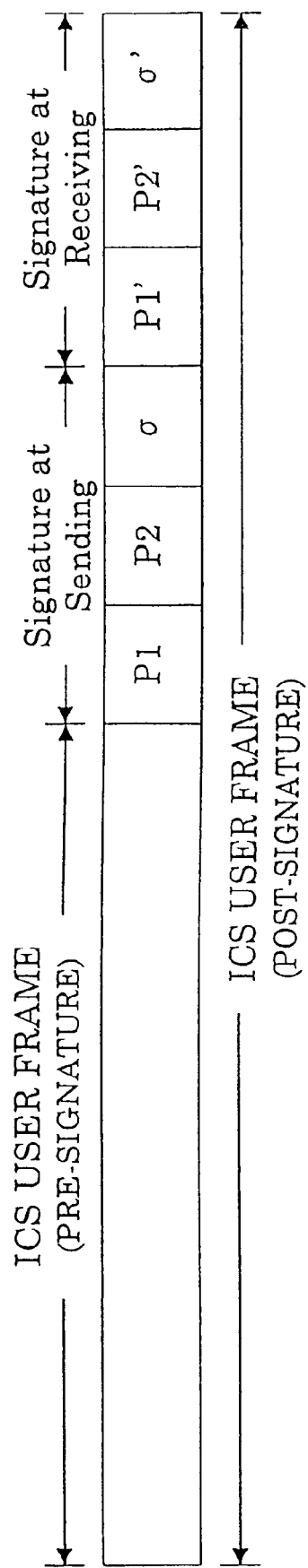
FIG. 74 is a diagram to explain the electronic signature at sending and receiving times.

On the other hand, in the event that the ICS user frame is to receive the electronic signature at the time of sending by the transmitting side access control apparatus, and further is to receive the electronic signature by the receiving side access control apparatus, an transmitting electronic signature and a receiving electronic signature are assigned, as shown in FIG. 74. Also, there are other examples wherein the value of the verification key KPa is included in the signature function parameter P2. Thus, the trouble of the ICS user frame receiver obtaining the verification key KPa from the public key information center or the like can be omitted. Further, in the event that the contents of the ICS user frame is an electronic bill (order slip, receipt, etc.), an electronic signature is attached to the electronic bill, along with the identification code of the access control apparatus through which the electronic bill has passed. In the event that either the sender (former) of the electronic bill, of the receiver (recipient) tampers with the electronic bill, the tampering can be discovered by means of the electronic signature principle. Accordingly, as long as the electronic signature key is a secret value, i.e., as long as the operator of the access control apparatus which holds the signature key therein ensures that the signature key is a secret value, the electronic signature can be used as a tamper-proof public system.

Embodiment-17

Electronic Signature Server and Encryption Server

Figure 75:
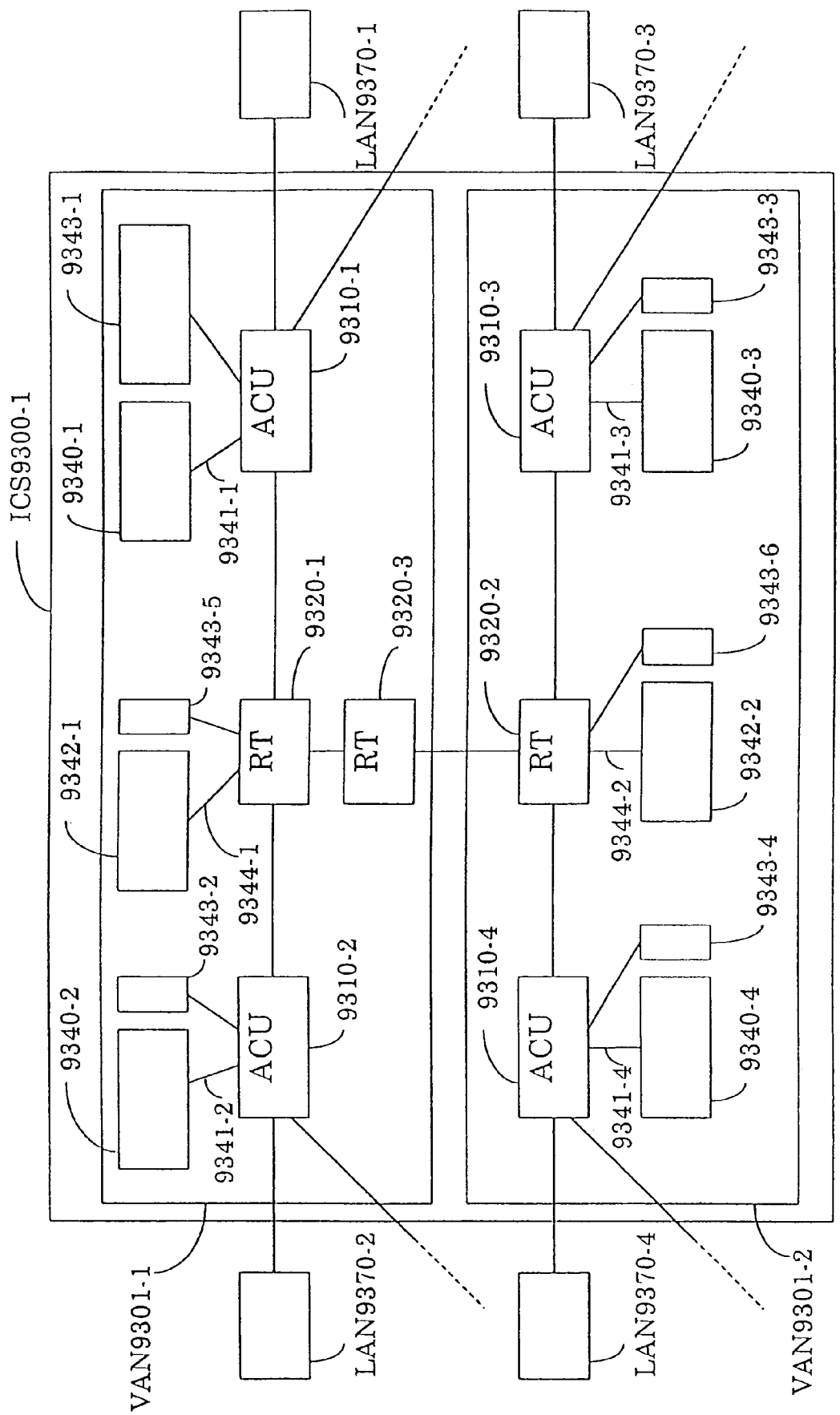
FIG. 75 is a construction block diagram to show a seventeenth embodiment according to the present invention.

As shown in FIG. 71 of Embodiment-16, the electronic signature unit 9017-1 and the encryption/decryption means 9018-1 are situated within the access control apparatus 9010-1. Conversely, with the present embodiment, as shown in FIG. 75, the access control apparatuses 9310-1, 9310-2, 9310-3 and 9310-4 do not include an electronic signature unit therewithin. Instead, electronic signature servers 9340-1, 9340-2, 9340-3 and 9340-4 and ICS network communication lines 9341-1, 9341-2, 9341-3 and 9341-4 are connected, respectively. Each electronic signature server includes the functions of the electronic signature unit described in the Embodiment-16, and the manner of operation wherein electronic signatures are provided before the ICS encapsulation or providing electronic signature after the ICS reverse encapsulation in cooperation with the access control apparatus is the same as the function of the electronic signature unit 9017-1 described in the Embodiment-16, with signature key, verification key, electronic signature function, program module for realizing the hash function, time/location parameter and signature function parameter. The electronic signature servers 9342-1 and 9342-2 are connected to the relay apparatuses 9320-1 and 9320-2 via the ICS network communication lines 9344-1 and 9344-2, respectively. The electronic signature server has an ICS network addresses unique in the entire ICS network, and has the function of communication with other electronic signature servers or access control apparatuses using the ICS network server communication function, thereby mutually exchanging the information that each has. The electronic signature server 9342-1 is an electronic signature server representing the VAN 9301-1, which communicates with the electronic signature servers 9340-1 and 9340-2 within the VAN 9301-1 using the ICS network server communication function, and is capable of obtaining information held by the electronic signature servers. Also, the electronic signature server 9340-1 is capable of obtaining information relating to electronic signature held by the electronic signature server 9340-2 (such as a verification key), via the electronic signature server 9342-1. The electronic signature server 9342-1 is capable of communicating with the electronic signature server 9342-2 which represents another VAN 9301-2 using the ICS network server communication function, thereby mutually exchanging the information relating to electronic signature that each has. The electronic signature servers do not exchange information regarding the secret signature keys held therewithin, and tightly guard the secrecy of the signature keys.

Further, with the present embodiment, as shown in FIG. 75, the access control apparatuses 9310-1, 9310-2, 9310-3 and 9310-4 do not include encryption/decryption means therein. Instead, a connection is made with the encryption servers 9343-1, 9343-2, 9343-3 and 9343-4, via respective ICS network communication lines. Each encryption server has the functions of the aforementioned encryption/decryption means 9018-1, and the manner of operation wherein the encryption of the ICS use frames is provided before the ICS encapsulation or the decryption of the encrypted ICS user frames after the ICS reverse encapsulation in cooperation with the access control apparatus is the same as the function of the encryption/decryption means 9018-1, with program module for realizing the encryption function and the decryption function, the encryption key and the decryption key. The encryption servers 9343-5 and 9343-6 are connected to the relay apparatuses 9320-1 and 9320-2 via the ICS network communication lines. Each encryption server has an ICS network addresses unique in the entire ICS network, and has the function of communication with other encryption servers or the access control apparatuses using the ICS network server communication function, thereby mutually exchanging the information that each has. The encryption server 9343-5 is an encryption server representing the VAN 9301-1, which communicates with the encryption servers 9343-1 and 9343-2 within the VAN 9301-1 using the ICS network server communication function, and is capable of obtaining the information held by the encryption servers. Also, the encryption server 9343-1 is capable of obtaining the information relating to the encryption held by the encryption server 9343-2 (such as an encryption key), via the encryption server 9342-5. The encryption server 9343-5 is capable of communicating with the encryption server 9343-6 which represents another VAN 9301-2 using the ICS network server communication function, thereby mutually exchanging the information that each has.

Embodiment-18

Open Connection

Description will now be made regarding the ICS open connection, i.e., preparatory procedures performed by the user and the VAN operator operated in order to change the other party and conduct the inter-corporation communication.

<<User Application>>

The user applies to the VAN operator for an ICS name and an ICS user address, and at the same time, shows ICS connection conditions, a user identification and a payment method (address, corporation name, paying bank account, etc.). If there is the ICS user address for intra-corporation communications that the user has decided, this is also shown, but not if there is none. The VAN operator follows common rules decided upon beforehand with other VAN operators, and decides upon the ICS name and the ICS user address and informs the user thereof. The items for the ICS connection conditions include ICS name conditions, communication band conditions, accounting conditions, electronic signature conditions, encryption conditions, open-zone conditions and dynamic conditions, with the contents of these conditions being as describe below.

The ICS name conditions specify only the left portion of the ICS name. For example, in the event that the ICS name is "USR#1.ACS#1.DIS#1.VAN#1.JP.AS", the user specifies only the leftmost "USR#1" (the VAN operator decides upon the remaining right portion). The communication band conditions are speed class and degree of priority. The accounting conditions are determined regarding charges for a fixed amount for a certain time span, charges for network usage (network accounting), or charges for the contents of information sent and received via electronic communication (information account), in relation to communication band conditions, signature conditions, encryption conditions, etc. The electronic signature conditions specify whether or not to provide an electronic signature which can prove with the date and time the face that the ICS user frame has passed through the access control apparatus. The encryption conditions specify whether or not the encryption is performed when the ICS user frame is transferred. The open-zone conditions specify whether or not to reject at the access control apparatus, an ICS frame received from an unknown sender not registered in the conversion table, or whether to form a temporary conversion table and receive, etc. The dynamic alteration conditions specify the functions which can be changed upon request by the user via ICS frames, regarding the above-described conditions. The dynamic alteration conditions are set so that the signature conditions or the encryption conditions can be changed, but items important for VAN operation cannot, such as ICS addresses or accounting.

<<ICS Address Administration Server and ICS Name Server>>

Figure 76:
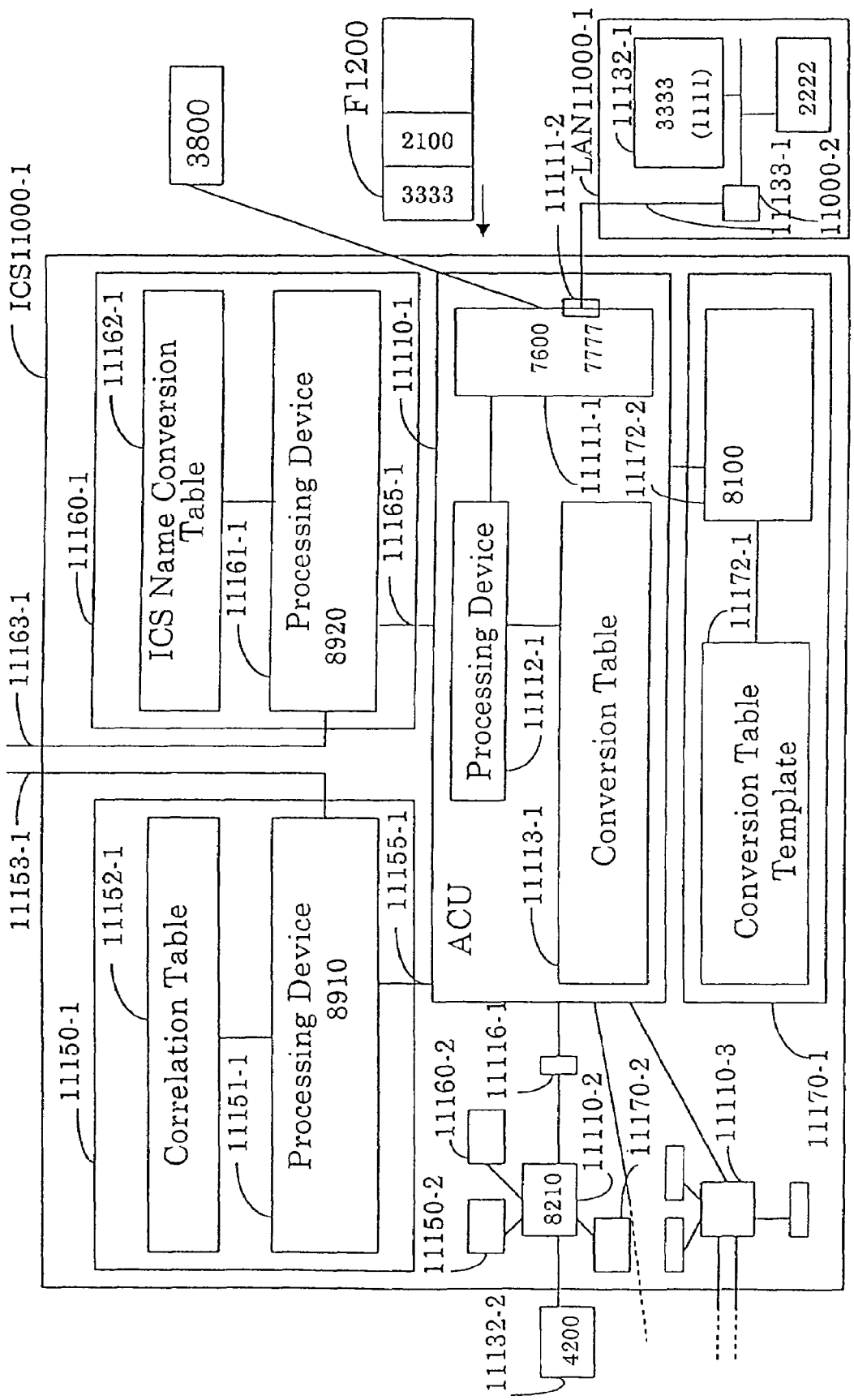
FIG. 76 is a construction block diagram to show a eighteenth embodiment according to the present invention.

Describing with reference to FIG. 76 and FIG. 77 to show the conversion table 11113-1, FIG. 78 to show the conversion table template, FIG. 79 to show the correlation table and FIG. 80 to show the ICS name server, according to the present embodiment, inside the ICS 11000-1 are provided the following: access control apparatuses 11110-1, 11110-2 and 11110-3, relay apparatus 11116-1, ICS address administration servers 11150-1 and 11150-2, ICS name servers 11160-1 and 11160-2, ICS conversion table servers 11170-1 and 11170-2, and users 11132-1 and 11132-2. The ICS address administration server 11150-2 has in the correlation table contained therein the ICS network address "8210", ICS user address "4200", and user address related information, of the user 11132-2. The ICS name server 111602 has in the ICS name conversion table contained therein the ICS name "USR#3.ACS#3.DIS#3.VAN#3.JP.AS" and the ICS user address "4200", of the user 11132-2. The VAN operator decides upon an ICS network address ("7777") to use in accordance with the ICS user address "3333" of the user 11132-1, provides it to the ICS logic terminal 11111-2 of the access control apparatus 11110-1, and connects the ICS logic communication path 11133-1 which connects the user 11132-1 via the gateway 11000-2. The ICS network address "7777" is a non-disclosed value, so the user is not notified of it.

Next, the VAN operator directly writes the following items in the correlation table 11152-1 within the ICS address administration server 11150-1, and in the conversion table 11152-1 via the data path 11153-1 and the processing device 11151-1: the ICS network address "7777" determined by the method described above, the ICS user address (inter-corporation) "3333", the ICS user address indicated by the user (intra-corporation) "1111", and user address related information, i.e., communication band conditions, account conditions, electronic signature conditions, encryption conditions, open-zone conditions, dynamic alteration conditions, user identification, payment method, etc. The VAN operator further directly writes the following in the ICS name conversion table 11162-1 in the ICS name server 11160-1, via the data path 11163-1 and processing device 11161-1: the ICS name "USR#1.ACS#1.DIS#1.VAN#1.JP.AS" decided as described above, the ICS user address "3333", and type "1" (indicating that the ICS user address "3333" is registered in the ICS name conversion table 11162-1). The above results expressed are as shown by the correlation table 11152-1 and the ICS name conversion table 11162-1

At the point that the above-described writing of the various types of information to the new user is completed, the ICS address administration server 11150-1 and the ICS name server 11160-1 use the ICS network ICS communication functions to communicate with the respective network addresses "8910" and "8920" to notify the ICS conversion table server 11170-1 that information has been obtained regarding the ICS address and the ICS connection conditions of a new user. Now, the ICS conversion table server 11170-1 is a type of the ICS network server, and in the present embodiment has an ICS network address "8100" and an ICS user address "2100".

<<ICS Conversion Table Server>>

The ICS conversion table server 11170-1 reads the information described in the correlation table 11152-1 of the ICS address administration server 11150-1 using the ICS network communication functions, and writes it in the conversion table template 11172-1. That is, "7777" is written to the space for the transmitting ICS network address (intra-corporation), "1111" is written to the space for the sender ICS user address (inter-corporation), and "3333" is written to the space for the sender ICS user address (inter-corporation). In the event that there is no ICS user address for the intra-corporation communication, the space for the sender ICS network address (intra-corporation) is left blank. The request identification number is set at "2" which indicates inter-corporation communication. The other settings for the present embodiment are as follows: the communication band conditions are set to the speed class of "3" and the degree of priority "3", the electronic signature conditions are set to "1", the transmitting signature specification is "YES", the receiving signature specification is "NO", and the account conditions are accounting class "4", the present embodiment using an example of fixed charging system. The encryption conditions are the encryption class "1", with the present embodiment being arranged so as to specify the encryption of the ICS network frames within the ICS. The open-zone class of the present embodiment is "0". The dynamic alteration class "6" in the present embodiment allows for the transmitting signature item to be changed upon request by the user.

<<Usage of the ICS Conversion Table Server (User)>>

The user 11132-1 writes "3333" as the sender ICS user address and the ICS user address "2100" of the ICS conversion table server 11170-1 as the receiver ICS user address, and sends the ICS user frame F1200 written with the receiver information (receiver ICS user address or receiver ICS name) written to a user data portion of the ICS user frame. The ICS conversion table server 11170-1 receives the ICS user frame F1200 via the access control apparatus 11110-1, and obtains the receiving ICS network address for the inter-corporation communication according to whether the receiver information in the user data portion is a receiver ICS user address of a receiver ICS name, using the method described below. Further, in the event that the receiver ICS name has been specified, the receiver ICS user address is also obtained.

(In the event there is specification of receiver ICS user address):

In the event that the aforementioned receiver information is the receiver ICS user address "3800". the ICS conversion table sever 11170-1 by using the ICS network communication function inquires the ICS address administration server 11150-1 connected to the access control apparatus 11110-1, and obtains the ICS network address "7600" (receiving ICS network address) corresponding to the ICS user address "3800". Also, in the event that the receiver ICS user address is not found in the correlation table 11152-1 (failure to find the ICS network address), the ICS conversion table server 11170-1 receives a "notification of failure to find the ICS network address" from the ICS address administration server 11150-1.

(In the event that the receiver ICS name is specified):

In the event that the above receiver information is the receiver ICS name "USR#3.ACS#3.DIS#3.VAN#3.JP.AS", the ICS conversion table server 11170-1 by using the ICS network communication function sends the ICS name "USR#3.ACS#3.DIS#3.VAN#3.JP.AS" to the ICS name server 11160-1 connected to the same access control apparatus 11110-1. The ICS name server 11160-1 holds the ICS network addresses of other ICS name servers in a form corresponding to the ICS name (the portion of the ICS name after removing the leftmost portion "USR#n"), and in the present embodiment, the ICS name server 11160-1 searches the ICS name conversion table 11162-1, finds the ICS network address "8930" of the ICS name server 11160-2 administrating "ACS#3.DIS#3.VAN#3.JP.AS" and inquires regarding the address "8930", using the ICS network communication functions, and obtains the ICS user address "4200" (receiver ICS user address) and the ICS network address "8210" (receiving ICS network address) corresponding to the aforementioned ICS name "USR#3.ACS#3.DIS#3.VAN#3.JP.AS". In the above procedures, the ICS name server 11160-2 has contacted the ICS address administration server 11150-2 regarding the ICS network address of the user 11132-2, and obtained the address "8210".

(Completion of the conversion table 11113-1):

In the event that the receiver ICS user address is specified, the ICS conversion table server 11170-1 adds the receiver ICS user address "3800" and the receiving ICS network address "7600" to the conversion table 11113-1, thus completing the portion of the conversion table 11113-1 corresponding to the receiving user. In the event that the receiver ICS name is specified, the ICS conversion table server 11170-1 adds the receiver ICS user address "4200" and the receiving ICS network address "8210" to the conversion table 11113-1, thus completing the portion of the conversion table 11113-1 corresponding to the receiving user. Also, in the event that a "notification of failure to find the ICS network address" is received from the ICS address administration server 11150-1 or the ICS name server 11160-1, the ICS conversion table server 11170-1 sends an ICS frame indicating failure to add to the conversion table, to the requesting user 11132-1.

<<Other Usage of the ICS Conversion Table Server (User)>>

The user 11132-1 requests a notification of the user-specific information to the user, by means of sending an ICS user frame written with a request for the notification of the contents of user-specific information in the conversion table 11113-1 to the ICS conversion table server 11170-1. Further, the user can use a dynamic alteration class which has been agreed on beforehand with the VAN operator to re-write a part of the conversion table 11113-1. The dynamic alteration class is decided upon as 1, 2, . . . , and the contents thereof being as follows: the dynamic alteration class 1 is a specification for increasing the user-specific degree of priority by "1", the dynamic alteration class 2 is a specification for decreasing the user-specific degree of priority by "1", and the dynamic alteration class 3 sets the transmitting signature to "YES", and at the same time, specifies changing the encryption class to "2".

<<Usage of the Conversion Table>>

The method of using the conversion table formed according to the above procedures has been described in the Embodiment-1 and so forth. Although in the Embodiment-1, description was made regarding the method of forming a temporary conversion table if there is no conversion table at the time that the access control apparatus receives the ICS network frame and is to perform the ICS reverse encapsulation thereof, but with the present embodiment, the open-zone class of the conversion table will be used. That is, at the time that the access control apparatus receives the ICS network frame and is to perform the ICS reverse encapsulation thereof, in the event that the received "pair of receiving ICS network address and tansmitting ICS network address contained in the network control field of the ICS network frame" has not been registered in the conversion table as a "pair of transmitting ICS network address and receiving ICS network address", a temporary conversion table is set in the same manner as with the aforementioned embodiment in the event that the open-zone class is set to "2", but in the event that the open-zone class is set to "1", a temporary conversion table is not set. Further, in the event that the open-zone class is set to "0", not only is a temporary conversion table not set, but the received ICS network frame is discarded. In this case, the ICS user frame is not delivered to the user. That is, in the event that the open-zone class is set to "0", reception of an unknown sender not registered in the conversion table is rejected, thus realizing what is called a "closed connection". Incidentally, in the above, in the event that the request identification is "4", the open-zone class is always handled as being set to "1", i.e., a temporary conversion table is not set.

<<Variations of the Embodiment>>

The method for the VAN operator to use the data path 11153-1 and the data path 11163-1 to input the ICS addresses, the ICS connection conditions and the like to the ICS address administration server 11150-1 and the ICS name server 11160-1 has been described with regard to the above embodiment. Instead, the arrangement may be such that the VAN operator does not use these data paths, but rather forms a special ICS network server within the ICS 11000-1, so as to directly input the ICS addresses, the ICS connection conditions and the like to the ICS address administration server 11150-1 and the ICS name server 11160-1, using the ICS network communication function, thus re-writing the contents of the conversion table 11152-1 and the ICS name conversion table.

Embodiment-19

Separation of Functions of the Access Control Apparatus

Figure 81:
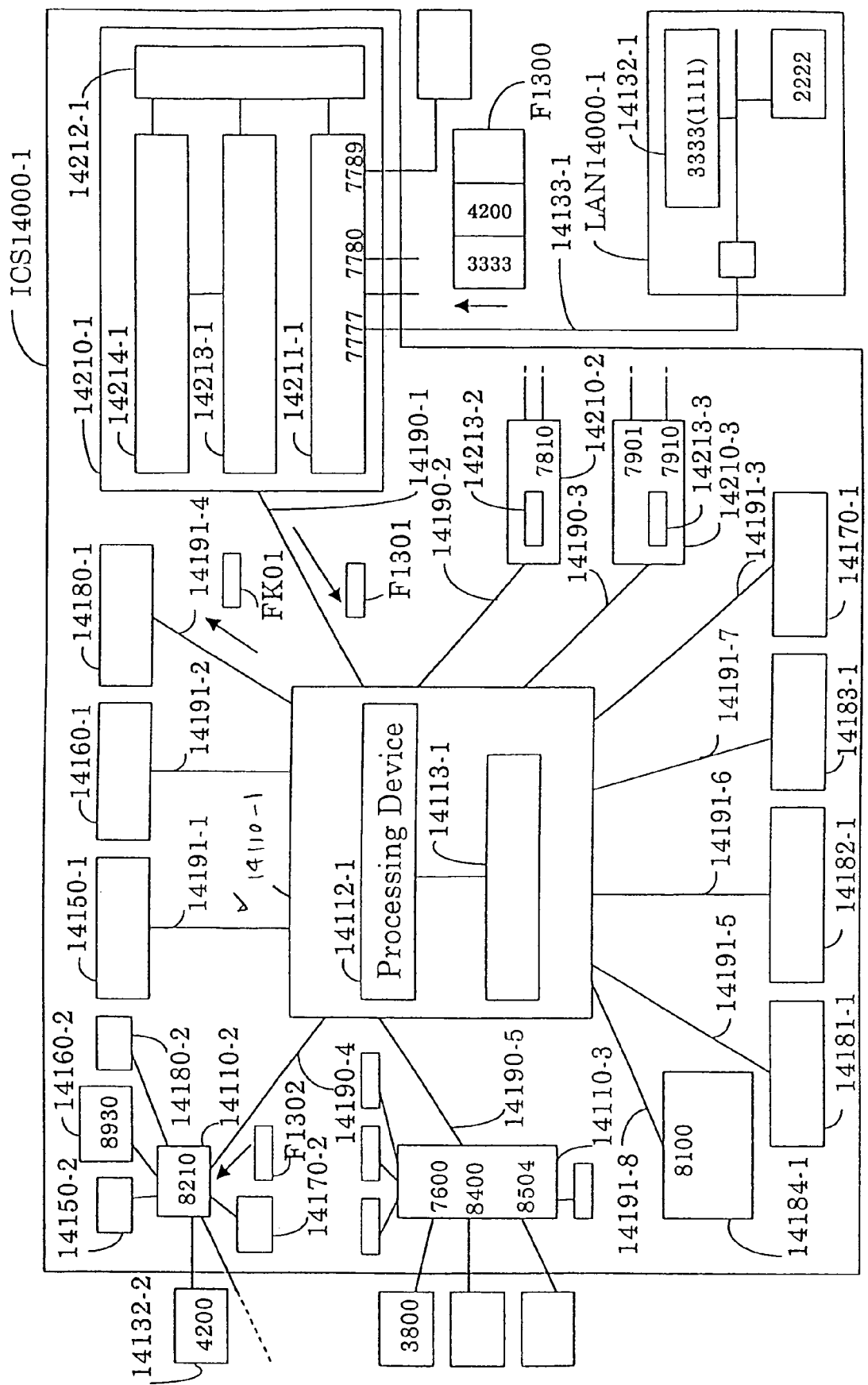
FIG. 81 is a construction block diagram to show a nineteenth embodiment according to the present invention.

As shown in FIG. 76 of the Embodiment-18, the ICS address administration server 11150-1, the ICS name server 11160-1, and the ICS conversion table server 11170-1 are each connected to the access control apparatus 11110-1, with the ICS encapsulation and the ICS reverse encapsulation being performed within the access control apparatus 11110-1 using the conversion table 11113-1. Conversely, with the present embodiment, the functions of the access control apparatus 11110-1 are separated into an aggregation access control apparatus 14110-1 and a plurality of simplified access control apparatuses 14210-1, 14210-2 and 14210-3. That is, as shown in FIG. 81, the access control apparatus 11110-1 is connected to the simplified access control apparatuses 14210-1, 14210-2 and 14210-3, via respective ICS network communication lines 14190-1, 14190-2 and 14190-3. The ICS address administration server 14150-1, the ICS name server 14160-1, the ICS conversion table server 14170-1, the ICS accounting server 14180-1, the electronic signature server 14181-1, the encryption server 14182-1, the operation administration server 14183-1 and the ICS network server 14184-1 are connected with the aggregation access control apparatus 14110-1 via the respective ICS network communication lines 14191-1, 14191-2, 14191-3, 14191-4, 14191-5, 14191-6,

14191-7 and 14191-8. Further, the conversion table 11113-1 within the access control apparatus 11110-1 is separated into an aggregation conversion table 14113-1 and a plurality of simplified conversion tables 14213-1, 14213-2 and 14213-3. An example of the aggregation conversion table 14113-1 is shown in FIG. 82 and an example of the simplified conversion table 14213-1 is shown in FIG. 83.

However, part of the aggregation conversion table and simplified conversion tables overlap. That is, the following four items are contained in both conversion tables: transmitting ICS network address, request identification, speed class and degree of priority. There is no fundamental difference between the temporary partial conversion table 14214-1 with the temporary conversion table described with the Embodiment-1 and otherwise, with the items contained in the temporary partial conversion table 14214-1 being the same as the items contained in the simplified conversion table 14213-1. The line unit 14211-1 within the simplified access control apparatus 14210-1 has the same functions as the line unit 11111-1 within the access control apparatuses 11110-1.

Figure 84:
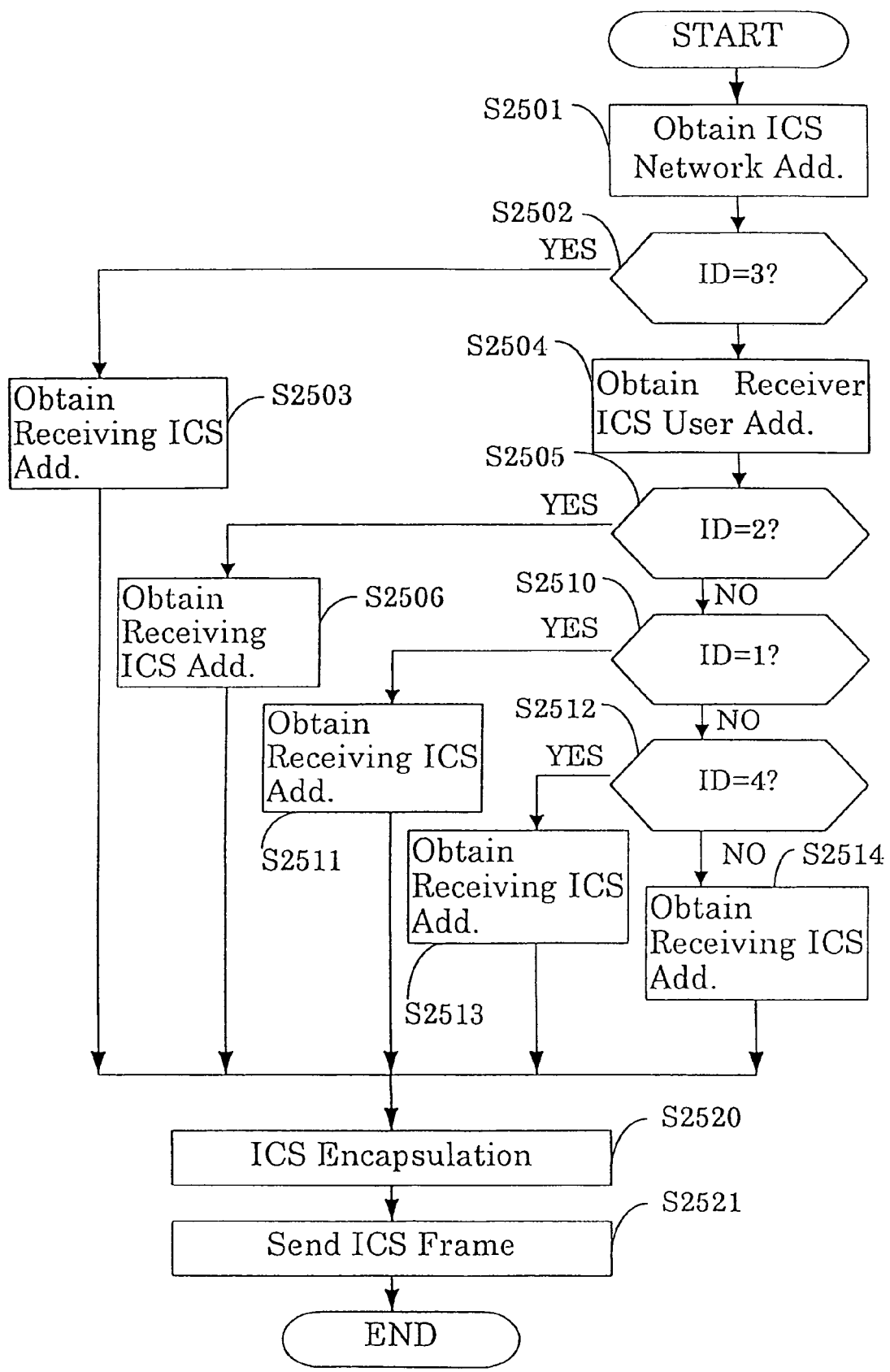

The simplified access control apparatus 14210-1 uses the simplified conversion table 14213-1 to perform the ICS encapsulation at a time of sending and the ICS reverse encapsulation at a time of receiving, and the aggregation access control apparatus 14110-1 uses the aggregation conversion table 14113-1 to perform processing relating to the electronic signature and the account, as described above. Also, by means of the plurality of simplified access control apparatuses 14210-1, 14210-2 and 14210-3 functioning together with the aggregation access control apparatus 14110-1, the combined, functions are the same as those of the access control apparatus 11110-1. The user 14132-1 sends an ICS user frame F1300 with a sender ICS user address "3333" and a receiver ICS user address "4200" to the ICS logic communication line 14133-1. As shown in the flowchart in FIG. 84, the processing device 14212-1 of the simplified access control apparatuses 14210-1 receives the ICS user frame F1300 from the ICS logic terminal within ICS network address "7777" of the line unit 14211-1, and at the same time obtains the ICS network address "7777" (Step S2501), and checks whether or not the address "7777" is registered in the simplified conversion table 14213-1 with the request identification thereof being "3", indicating a virtual dedicated line connection (Step S2502). In this case, the registration has not been made, so the receiver ICS user address "4200" written on the ICS user frame F1300 is obtained corresponding to the ICS network address "7777" (Step S2504), and it is further checked whether the address "4200" is registered in the simplified conversion table 14213-1 with the request identification thereof being "2", indicating inter-corporation communication (Step S2505). In this case, the registration has been made, so in preparation for the ICS encapsulation, the receiving ICS network address "8210" is obtained from the simplified conversion table 14213-1 (Step S2506).

The simplified access control apparatus 14210-1 next performs the ICS encapsulation by means of generating in the ICS network frame an ICS network frame F1301 inscribed with the speed class and the degree of priority obtained from the simplified conversion table 14213-1 (Step S2520), and sending it to the aggregation access control apparatus (Step S2521). Now, as described above, the speed class "3", the degree of priority "3" and the encryption class "0" which are items of the simplified conversion table 14213-1 are written to the expansion portion of the ICS network controlling unit.

The aggregation access control apparatus 14110-1 receives the ICS network frame F1301 from the simplified access control apparatus 14210-1, and based on the face that the ICS network frame F1301 passes through the aggregation access control apparatus 14110-1, forms an account information frame FK01 and sends it to the accounting server 14180-1. The information such as the request identification, the speed class, the degree of priority, the account class and the encryption class which are registered in the aggregation conversion table 14113-1 are referred to in order to form the account information frame FK01. The signature, transmitting signature and receiving signature of the aggregation conversion table 14113-1 items are used for providing the electronic signature, and as described in other embodiments, the electronic signing is performed by applying for the electronic signature to the electronic signature server 14181-1. In the same way, in the event that the encryption class specification is "1" which indicates the encryption, the encryption is performed by applying the encryption to the encryption server 14182-1. Once the above processing has been completed, the aggregation access control apparatus 14110-1 sends the ICS network frame F1302 to another access control apparatus 14110-2 and other aggregation access control apparatuses, via the ICS network communication line 14190-4. Incidentally, the format of the ICS network frame F1302 changes in content in the event that the electronic signature server or the encryption server operate, due to an addition of the electronic signatures or a conversion to the ciphertext as described above, but if neither the electronic signature server nor the encryption server have operated, the ICS network frame F1302 is the same as the ICS network frame F1301. Not only can the simplified access control apparatus 14210-1 be realized with practically no changes to the existing router, but there are other economic advantages such as the number of users contained in the simplified access control apparatus 14210-1 not being great, and in the event that the users are scattered over a wide geographic area, the total number of each of ICS address administration servers, ICS name servers, ICS conversion table servers, account severs, electronic signature severs and encryption servers can be reduced.

The operating administration server 14183-1 is provided with an ICS network address, is connected to the aggregation access control apparatus 14110-1 and the relay apparatuses, and performs exchange with other operation administration servers, access control apparatuses, ICS address administration servers, etc. regarding information regarding communication conditions within the ICS (communication traffic, etc.) or trouble, using the ICS network communication functions.

Now, the item open-zone class included in the simplified conversion table 14213-1 of the simplified access control apparatus 14210-1 is used for the same processing as the processing of the open-zone class registered in the conversion table of the access control apparatus, as described above. That is, at the time that the simplified access control apparatus 14210-1 receives the ICS network frame and is to perform the ICS reverse encapsulation thereof, in the event that the received "pair of receiving ICS network address and transmitting ICS network address contained in the network control field of the ICS network frame" has not been registered in the simplified conversion table 14213-1 as a "pair of transmitting ICS network address and the receiving ICS network address", a temporary partial conversion table 14214-1 is set in the aforementioned manner in the event that the open-zone class is set to "2", but in the event that the open-zone class is set to "1", a temporary partial conversion table is not set. Further, in the event that the open-zone class is set to "0", not only is a temporary partial conversion table not set, but the received ICS network frame is discarded. In this case, the ICS user frame is not delivered to the user. In this arrangement, "0"

indicates that reception of an unknown sender not registered in the conversion table is to be rejected, thus realizing what is called a "closed connection".

As described in the above embodiment, the ICS address administration server and ICS name server may be integrated into a single ICS address name administration server, with the aggregation access control apparatus being used being connected to the ICS address name administration server and ICS network communication line. Also, an arrangement may be employed in the above embodiment wherein items of the speed class and the degree of priority are not provided in the simplified conversion table 14213-1, with a "0" being written at the point of the ICS encapsulation to the expansion portion of the ICS network controlling unit for the speed class and the degree of priority, indicating that there is no specification. In the same way, an arrangement may be employed wherein specification of the open-zone class is not provided in the simplified conversion table 14213-1, with a "0" being written to the expansion portion of the ICS network controlling unit for the speed class and the degree of priority, indicating that there is no specification.

Thus, according to the present invention, administration of information communication is performed with a unified address system, and various services can be provided, without using dedicated lines or the Internet, thus enabling structuring a large-scale communication system with high security and with relatively low costs. Also, inter-corporation communication can be performed between individual corporations (including government organizations, universities, and so forth) which had conventionally been services separately with practically no change to the address system for computer communications. Further, since the network administrator holds the network control authority, the overall administration of the network becomes clear, increasing ease of securing reliability and also markedly improving security.

What is claimed is:

1. An IP transfer network comprising:
an access control apparatus;
a plurality of terminals each having a user address;
a plurality of logic terminals each having a network address;
a plurality of communication lines connecting the plurality of terminals to the plurality of logic terminals; and
a conversion table having a plurality of records, each of the plurality of records being set in advance and containing a network address, a source user address, a destination user address, and a receiver network address,
wherein a user frame having a source user address and a destination user address is communicated from one of the plurality of terminals to a connected logic terminal and the user frame is inputted from the connected logic terminal into the access control apparatus, and the access control apparatus searches the plurality of records of the conversion table for a record having the network address of the connected logic terminal, the source user address, and the destination user address, and
wherein, if the access control apparatus locates the record in the conversion table, the access control apparatus obtains the receiver network address from the record, and forms a network frame having the user frame and the obtained receiver network address, the network frame is communicated to a logic terminal having the receiver network address where the user frame is retrieved from the network frame and communicated from the logic terminal having the receiver network address to a connected terminal.

2. An IP transfer network according to claim 1, further comprising a domain name server,
wherein the one of the plurality of terminals transmits to the domain name server a user frame having a domain name and the domain name server indicates the destination user address of a terminal connected to the logic terminal having the obtained receiver network address.

3. An IP transfer network according to claim 1, further comprising a certification unit,
wherein the one of the plurality of terminals communicates the user frame and a password to the certification unit, the certification unit determines whether or not the password is correct with respect to the user frame, and the certification unit indicates whether or not the password is correct.

4. An IP transfer network according to claim 1, further comprising an encryption/decryption unit,
wherein the encryption/decryption unit encrypts the user frame before the network frame is formed and decrypts the user frame after it is retrieved from the network frame.

5. An IP transfer network according to claim 1, further comprising an electronic signature unit,
wherein the electronic signature unit electronically signs the network frame when the network frame is formed.

6. An IP transfer network according to claim 1, further comprising an electronic signature unit,
wherein the electronic signature unit electronically signs the user frame when the user frame is restored from the network frame.

7. An IP transfer network comprising:
a plurality of terminals;
a plurality of access control apparatuses, each access control apparatus including a plurality of logic terminals each having a network address, and
a conversion table having a plurality of records, each of the plurality of records being set in advance and containing a sender network address, a source user address, a destination user address, and a receiver network address;
a plurality of communication lines connecting the plurality of terminals to the plurality of logic terminals,
wherein a user frame having a source user address and a destination user address is communicated from one of the plurality of terminals to a connected logic terminal of a first access control apparatus, and the first access control apparatus searches the plurality of records of the conversion table for a record having the network address of the connected logic terminal, the source user address, and the destination user address, and
wherein, if the first access control apparatus locates the record in the conversion table, the first access control apparatus obtains the receiver network address from the record, and forms a network frame having the user frame and the obtained receiver network address, the network frame is communicated to a logic terminal of a second access control apparatus having the receiver network address where second access control apparatus retrieves the user frame from the network frame and communicates the retrieved user frame from the logic terminal of the second access control apparatus to a connected terminal.

8. An IP transfer network comprising:
a plurality of terminals;
a plurality of access control apparatuses, each access control apparatus including
a plurality of logic terminals each having a network address, and a conversion table having a plurality of records, each of the plurality of records being set in advance and containing a network address, a source user address, a destination user address, and a receiver network address;

a plurality of communication lines connecting the plurality of terminals to the plurality of logic terminals, wherein a user frame having a source user address and a destination user address is communicated from one of the plurality of terminals to a connected logic terminal of a first access control apparatus, and the first access control apparatus searches the plurality of records of the conversion table for a record having the network address of the connected logic terminal, the source user address, and the destination user address, and wherein, if the first access control apparatus locates the record in the conversion table, the first access control apparatus obtains the receiver network address from the record, and forms a network frame having the user frame and the obtained receiver network address, the network frame is communicated to a logic terminal of a second access control apparatus having the receiver network address where second access control apparatus retrieves the user frame from the network frame and communicates the retrieved user frame from the logic terminal of the second access control apparatus to a connected terminal.

9. An IP transfer network according to claim 8, further comprising:

a domain name server; and a conversion table server, wherein the user frame sent from one of the plurality of terminals to the connected logic terminal of the first access control apparatus includes a domain name and is communicated to the domain name server, wherein the domain name server forms a user frame having a pair of user addresses and a network address corresponding to the domain name and the domain name server created user frame is transmitted to the conversion table server, wherein the conversion table server rewrites the conversion table using the pair of user addresses and the network address obtained from the domain name server created user frame.

10. An access control apparatus comprising:

a plurality of external logic terminals each having a network address;

one or more internal logic terminals each having a network address;

a conversion table having a plurality of records, each of the plurality of records being set in advance and containing a sender network address, a source user address, a destination user address, and a receiver network address; and an access control unit, wherein a first user frame having a source user address and a destination user address is communicated from a first external logic terminal to the access control unit, and the access control unit searches the plurality of records of the conversion table for a record having the sender network address of the first external logic terminals that communicated the user frame, the source user address, and the destination user address, wherein, if the access control unit locates the record in the conversion table, the access control unit obtains the receiver network address from the record, and forms a network frame having the first user frame and the obtained receiver network address, the network frame is communicated to one of the one or more internal logic terminals having the receiver network address, and wherein, if a second user frame communicated from a second external logic terminal to the access control unit has a source user address and a destination user address identical to the source user address and the destination user address of the first user frame communicated from the first external logic terminal, the access control unit forms separate first and second network frames for the respective first and second user frames.

* * * * *